United States Patent
Miyachi et al.

(10) Patent No.: US 7,327,433 B2
(45) Date of Patent: Feb. 5, 2008

(54) DISPLAY ELEMENT, DISPLAY DEVICE, AND MANUFACTURING METHOD OF DISPLAY ELEMENT

(75) Inventors: Koichi Miyachi, Soraku-gun (JP); Seiji Shibahara, Tenri (JP); Iichiro Inoue, Tenri (JP); Shoichi Ishihara, Katano (JP); Takako Koide, Kashihara (JP)

(73) Assignee: Sharp Kabushiki Kaisha, Osaka (JP)

(*) Notice: Subject to any disclaimer, the term of this patent is extended or adjusted under 35 U.S.C. 154(b) by 476 days.

(21) Appl. No.: 11/035,401

(22) Filed: Jan. 14, 2005

(65) Prior Publication Data
US 2005/0185131 A1    Aug. 25, 2005

(30) Foreign Application Priority Data
Jan. 15, 2004  (JP)  ............................. 2004-008444
Aug. 31, 2004  (JP)  ............................. 2004-253425
Jan. 14, 2005  (JP)  ............................. 2005-007497

(51) Int. Cl.
C09K 19/02 (2006.01)
G02F 1/1337 (2006.01)
G02F 1/136 (2006.01)

(52) U.S. Cl. ........................ 349/169; 349/170; 349/124; 349/129; 349/44

(58) Field of Classification Search ................ 349/169, 349/170, 124, 129, 44
See application file for complete search history.

(56) References Cited

U.S. PATENT DOCUMENTS

| 4,009,934 | A * | 3/1977 | Goodwin et al. ............. 349/36 |
| 6,014,194 | A | 1/2000 | Kuo et al. |
| 6,046,791 | A | 4/2000 | Kobayashi et al. |
| 6,221,443 | B1 | 4/2001 | Kubota et al. |
| 6,266,109 | B1 | 7/2001 | Yamaguchi et al. |
| 6,355,314 | B1 | 3/2002 | Kubota et al. |
| 6,355,315 | B1 | 3/2002 | Kubota et al. |
| 6,365,239 | B1 | 4/2002 | Kubota et al. |
| 6,368,680 | B1 | 4/2002 | Kubota et al. |
| 2002/0090470 | A1 | 7/2002 | Kubota et al. |
| 2005/0062927 | A1 | 3/2005 | Nakamura et al. |
| 2007/0080370 | A1 * | 4/2007 | Miyachi et al. ............. 257/107 |

FOREIGN PATENT DOCUMENTS

JP    2001-249363 A    9/2001

OTHER PUBLICATIONS

Saito et al, "Thermodynamics of a Unique Thermo-Tropic Liquid Crystal Having Optical Isotropy", Ekisho, Vo. 5, No. 1, 2001, pp. 20-27 w/partial English Translation.

(Continued)

Primary Examiner—Mike Qi
(74) Attorney, Agent, or Firm—H. Warren Burnam, Jr.

(57) ABSTRACT

Each of a pair of substrates respectively comprises an electrode and a rubbed alignment film on one surface, while the other surface is provided with a polarizer. The substrates are placed so that the surfaces provided with the alignment films are opposed to each other, and the area between the substrates is filled with a medium to form a material layer. Then, a medium made of a negative-type liquid crystalline compound sing a photopolymerizable monomer and a polymerization initiator is injected into the material layer held between the substrates. Further, ultra violet irradiation is performed with the medium exhibiting a liquid crystal phase, so that the photopolymerized monomer is polymerized, thus forming a polymer chain. In this manner, obtained is a display element, that causes change in degree of optical anisotropy in response to application of electric (external) field, which display element can be driven by a lower intensity electric (external) field.

147 Claims, 20 Drawing Sheets

OTHER PUBLICATIONS

Yamamoto, "Liquid Crystal Micro Emulsion", Ekisho, vol. 4, No. 3, 2000, pp. 248-254 (partial English Translation).

Shiraishi et al, "Kobunshi Ronbunshu", vol. 59, No. 12, Dec. 2002, pp. 753-759 (partial English Translation).

Demus et al, Handbook of Liquid Crystals, vol. 1: Fundamentals, 1998, pp. 484-485 & 530.

Yoneya, "Examining Nano-Structured Liquid Crystal Phase by Molecule Simulator", Ekisho, vol. 7, No. 3, 2003, pp. 238-245 (partial English Translation).

Demus et al, "Handbook of Liquid Crystals Low Molecular Weight Liquid Crystal", Wiley-VCH, vol. 2B, 1998, pp. 887-900.

Yamamoto, "First Lecture of Liquid Crystal Science Experiment: Identification of Liquid Crystal Phase", Lyotropic Liquid Crystal, Ekisho, vol. 6, No. 1, 2002, pp. 72-83 (partial English Translation).

Grelet et al, "Structural Investigations on Smectic Blue Phases", Physical Review Letters, vol. 86, No. 17, pp. 3791-3794.

Matsumoto et al, Fine Droplets of Liquid Crystals in a Transparent Polymer and Their Response, Appl. Phys. Lett., 69, 1996, pp. 1044-1046.

Mizoshita et al, "Fast and High-Contrast Electro-Optical Switching of Liquid-Crystalline Physical Gels Formation of Oriented Microphase-Separated Structures", Adv. Funct. Mater., vol. 13, No. 4, Apr. 2003, pp. 313-317.

Chandrasekhal, Liquid Crystals second edition, Chapters 4, 8, Sep. 25, 1995, pp. 330-335 (partial English Translation).

Baifukan, "Dictionary of Physics" edited by the Dictionary of Physics Editors Commission, 1986, pp. 633-635 (partial English Translation).

* cited by examiner

FIG. 4

| | REGION A (ALIGNMENT a) | REGION B (ALIGNMENT b) | | |
|---|---|---|---|---|
| MOLECULES AND POLARIZATION DIRECTION | ⬭← | ⬭← | ⬭← | ⭘← |
| ELECTRIC FIELD DIRECTION | ← | ↑ → ← | | |
| RUBBING DIRECTION | ↑ | | | |
| THE MOLECULES AND DIPOLES VIEWED FROM ELECTRIC FIELD DIRECTION | ⬭• | ⬭• | ⬭• | ⬭• |

FIG. 11
| TOTAL UNION | PACKING PARAMETER | SPATIAL PACKING AND PHASES | |
|---|---|---|---|
| 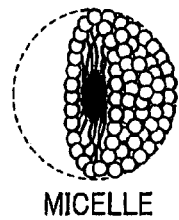 MICELLE |  <1/3 | (a) 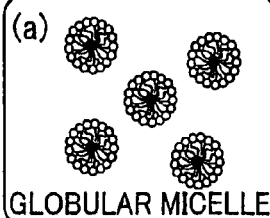 GLOBULAR MICELLE | (b) 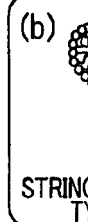 STRING-TYPE/ELLIPSE-TYPE MICELLE |
| 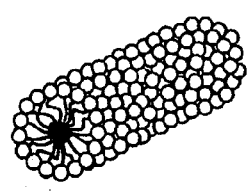 STICK-TYPE MICELLE |  <1/2 | (c) 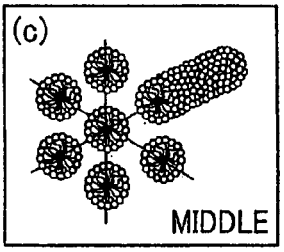 MIDDLE | (d) 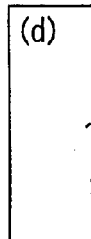 CUBIC |
| | | (e) 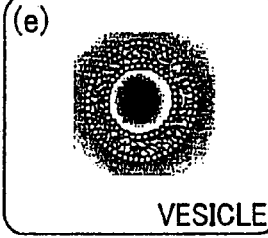 VESICLE | (f) SPONGE |
| 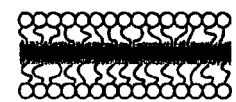 BILAYER MEMBRANE |  ~1 | (g) 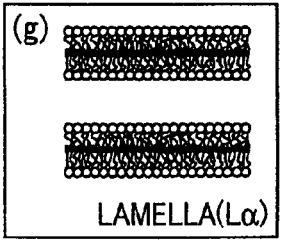 LAMELLA(Lα) | (h)  LAMELLA(Lβ) |
| | | (i) 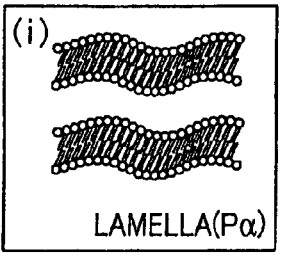 LAMELLA(Pα) | (j)  CUBIC |
| 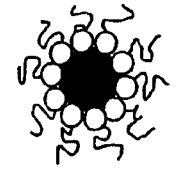 REVERSED MICELLE |  >1 | (k) 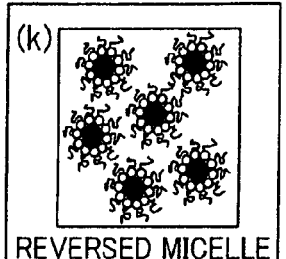 REVERSED MICELLE | (l) 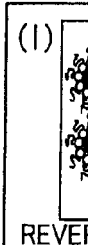 REVERSED MICELLE (ORDER PHASE) |

CLUSTER

FIG. 18 (a)    V=0
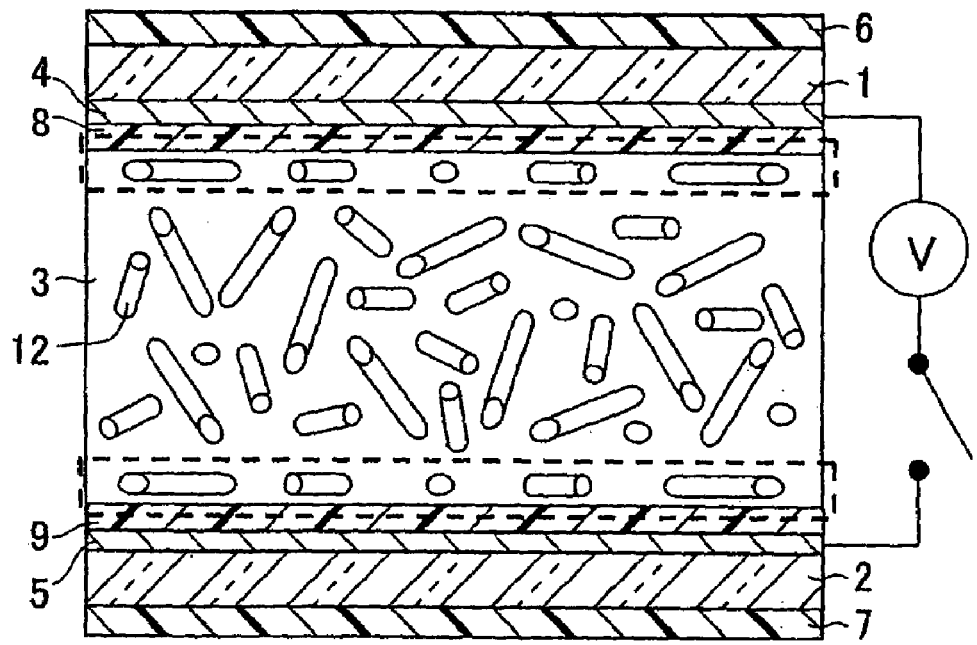
FIG. 18 (b)    V > Vth
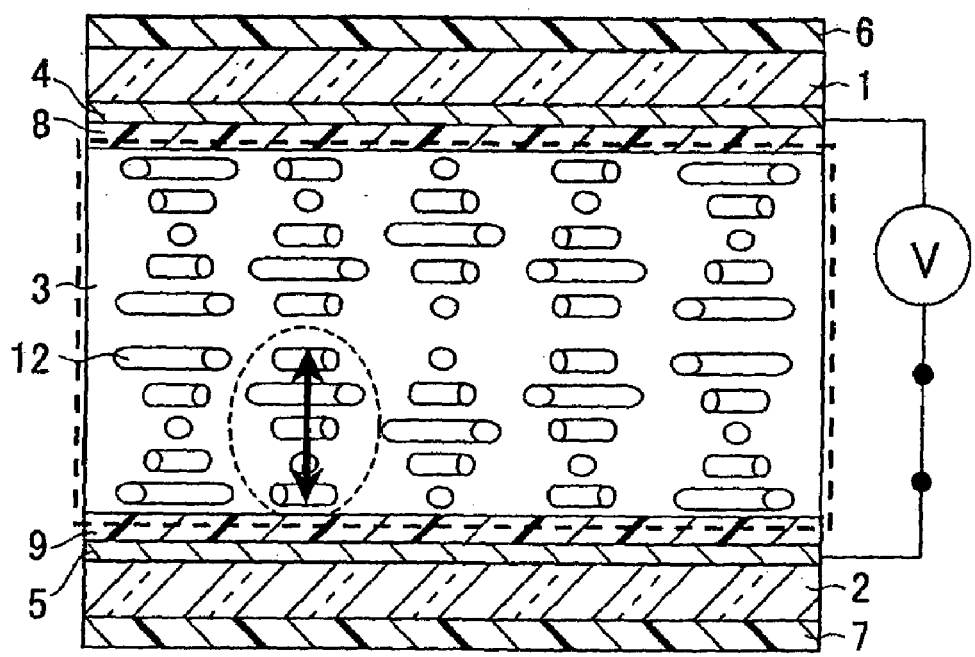

BLUE PHASE

Double Twist Cylinder (DTC)

FIG. 20 OPTICAL ACTIVITY

DISPLAY ELEMENT, DISPLAY DEVICE, AND MANUFACTURING METHOD OF DISPLAY ELEMENT

This Nonprovisional application claims priority under 35 U.S.C. § 119(a) on Patent Application No. 2004/008444 filed in Japan on Jan. 15, 2004, No. 2004/253425 filed Japan on Aug. 31, 2004, and No. 2005/007497 filed in Japan on Jan. 14, 2005, the entire contents of which are hereby incorporated by reference.

FIELD OF THE INVENTION

The present invention relates to a display element and a display device with high speed response and wide viewing angle, which display element and device can be driven by a low-intensity external field. The present invention also relates to a manufacturing method of the display element.

BACKGROUND OF THE INVENTION

A liquid crystal display element has advantages over other display element in terms of thinness, lightness in weight, and small power consumption, and is therefore widely used for image display devices such as a television and a monitor, and image display devices provided on: OA (Office Automation) equipments such as a word processor, and a personal computer; and information terminals such as a video camera, a digital camera, and a mobile phone.

There are conventionally well-known liquid crystal display modes for the liquid crystal display element, such as the TN (twisted Nematic) mode using Nematic liquid crystal, the display mode using FLC (ferroelectric liquid crystal) or AFLC (anti-ferroelectric liquid crystal), and the polymer dispersed liquid crystal display mode.

Among the liquid crystal display modes, for example, the TN mode using Nematic liquid crystal is adopted in the conventional liquid crystal display element, and the liquid crystal display element is in the practical use. However, the liquid crystal display adopting the TN mode has drawbacks in slow response and a narrow viewing angle. Those disadvantages are large hindrances for the TN mode to take over CRT (Cathode Ray Tube).

The mode using the FLC or AFLC allows high-speed response and wide viewing angle, but has drawbacks in shock resistance and temperature characteristics. This prevents wide and practical application of the mode using the FLC or AFLC.

The polymer dispersed liquid crystal display mode using light scattering does not need a polarizing plate, and allows high-luminance display. However, in the polymer dispersed liquid crystal display mode, it is intrinsically impossible to control the viewing angle with the use of a phase plate. Further, the polymer dispersed liquid crystal display mode has a problem in its response property. Therefore, the polymer dispersed liquid crystal display mode has only a few advantages over the TN mode.

In each of those display modes, liquid crystal molecules are aligned in a certain direction, and viewing angle depends on an angle with respect to the liquid crystal molecules. That is, in the display mode, there is restriction in the viewing angle. Further, each of the display modes uses that rotation of the liquid crystal molecules which is caused by electric field application. Because the liquid crystal molecules rotate in the alignment all together, a response speed is slow. Although the mode using the FLC or AFLC has advantages in its response speed and its viewing angle, the mode has a problem of irreversible alignment breakdown due to external force.

Apart from the display elements using the molecule rotation due to the application of the electric field voltage, an electronic polarization display mode using the Kerr electro-optic effect is proposed.

The term "electro-optic effect" indicates such a phenomenon that reflective index of a substance varies according to an outer electric field, and there are two types in the electro-optic effect: (i) the Pockels effect that is proportional to the electric field, and (ii) the Kerr effect that is proportional to square of the electric field. The Kerr effect, that is the Kerr electro-optic effect, was adopted early on in high-speed optical shutters, and has been practically used in special measuring instruments.

The Kerr effect was found by J. Kerr in 1875. Well-know materials showing the Kerr effect are organic liquid materials such as nitrobenzene, carbon disulfide, and the like. These materials are used for, for example, the aforementioned optical shutter, an optical modulating device, an optical polarizing device. For example, these materials are used, e.g., for measuring the strength of high electric field for power cables and the like, and similar uses.

Later on, Research has been conducted to utilize a large Kerr constant of the liquid crystal materials for use in light modulation devices, light deflection devices, and optical integrated circuits. It has been reported that a liquid crystal compound has a Kerr constant more than 200 times higher than that of nitrobenzene.

Under these circumstances, studies for using the Kerr effect to a display device have begun. It is expected that use of the Kerr effect attains a relatively low voltage driving than the Pockels effect that is proportional to electric field, because the Kerr effect is proportional to the square of the electric field. Further, it is expected that the utilization of the Kerr effect attains a high-response display apparatus because, e.g., the Kerr effect shows a response property of several. μ seconds to several m seconds, as its basic nature.

However, one of the problems in practically employing the Kerr effect for a display element is driving voltage that is greater than that for driving a conventional liquid crystal display element. In view of this problem, Japanese Laid-Open Patent Application Tokukai 2001-249363 (published on Sep. 14, 2001) discloses a method of subjecting the substrate surface to alignment treatment in advance so as to encourage induction of the Kerr effect.

Further, Japanese Laid-Open Patent Application Tokukaihei 11-183937 (published on Jul. 9, 1999) discloses a technique of dividing a liquid crystal material into small domains by a polymer to realize a high-speed liquid crystal optical switching element with a wide viewing angle. In the invention of Tokukaihei 11-183937, the liquid crystal material is divided into small domains with a diameter=0.1 μm or less so as to suppress the temperature dependency of the Kerr constant of liquid crystal that exhibits optical isotropy when no voltage is applied.

However, the art disclosed in the foregoing publication has a problem in that the region in which the Kerr effect can be easily generated is limited to a vicinity of surfaces of the substrate. More specifically, in the foregoing technique, the molecules are aligned only in the vicinity of the substrate boundary where the alignment treatment has been performed. Therefore, the art of the foregoing technique provides only little reduction of the driving voltage.

The small reduction in driving voltage occurs because the molecular orientation caused by the electric field application, in other words, i.e., the molecular orientation caused by the Kerr effect, has a short long-range order. That is, for example, in a TN-mode liquid crystal display device or the like, the orientation direction of the liquid crystal molecules is changed in the whole substrate in the normal direction; however, in a liquid crystal display device employing the Kerr effect, there is a little difficulty in propagating the alignment order of the molecules in the vicinity of the substrate to the inner portion (bulk portion) of the cell. For this reason, the method of the foregoing publication cannot significantly reduce the driving voltage to overcome the practical problem.

Further, when employing the method of the foregoing publication for a display element that contain negative-type liquid crystal that are aligned by voltage application in the substrate normal direction, there is a problem that the directions of major axes of the molecules in the bulk region are not consistent. More specifically, in the vicinity of the substrate boundary where the alignment treatment has been performed, the liquid crystal molecules are aligned in the rubbing direction by voltage application; however, in the bulk region which is away from the substrate boundary, the major axes of the molecules could be aligned in any directions. This is because, even though the polarization of the molecule can be aligned, it only causes alignment in the minor axis direction, as the polarization mostly exists in the minor axis direction of the molecule. In other words, even though the polarization is aligned by voltage application, the bulk area is optically isotropic when viewed from the front (substrate normal direction), and therefore it does not contribute to optical response. Therefore, in employment of the technique of the foregoing publication for this display device, optical response can be obtained only in the vicinity of the substrate boundary when a practical level voltage is applied, and the optical response in the bulk region cannot be obtained unless a driving voltage a lot higher than the practical level is applied.

Further, in the display element that includes positive-type liquid crystal molecules that are aligned by application of electric field in the substrate in-plane direction, the alignment in the bulk region is substantially unified to the direction of the electric field. However, in employment of the technique of the foregoing publication for this display device using the positive-type liquid crystal, reduction of driving voltage because of the alignment treatment can be achieved only in the vicinity of the substrate boundary. For this reason, this structure cannot attain reduction of the driving voltage to a practical level.

Further, in the invention of Tokukaihei 11-183937, the ratios of the monomer and a cross-linker are high, 16 wt % to 40 wt %, thus inducing an increase of driving voltage. Further, this publication describes that the created small domains do not have to be completely separated from each other. However, in this publication, the liquid crystal material in each small domain needs to be covered substantially completely like a micro capsule so as to individually create each domain. Otherwise, the average diameter of the small domains becomes large, and the material does not exhibit optical isotropy when no voltage is applied. Therefore, the small domains need to be substantially completely covered by a polymer or the like, thus increasing the content of the monomer.

SUMMARY OF THE INVENTION

The present invention is made in view of the foregoing conventional problems, and an object is to provide a display element or a display device whose optical anisotropy degree is changeable by application of external field, which display element/device can be driven by a low voltage (or can be driven by a weaker external field). The present invention also provides a manufacturing method of the display element/device.

In order to solve the foregoing problems, a display element of the present invention comprises a pair of substrates, at least one of which is transparent; a material layer between the substrates; and an electrode for applying a field on the material layer, in order to perform display operation, the material layer including (a) a medium whose optical anisotropy degree is changeable by field application, and (b) an alignment auxiliary material.

It is to be noted that the filed only needs to be able to change the degree of optical anisotropy of the medium and is not particularly limited but may be a field, a magnetic field, or light.

Further, the alignment auxiliary material functions to stabilize or expedite the alignment of the molecules in the bulk region. As long as the alignment auxiliary material has such an effect, the shape of the alignment auxiliary material is not to be particularly limited. Therefore, the alignment auxiliary material does not need to cover each small domain almost entirely, like a material described in the foregoing Japanese Laid-Open Patent Application Tokukaihei 11-183937, which divides a liquid crystal material into small domains.

The foregoing Japanese Laid-Open Patent Application Tokukaihei 11-183937 describes that the small domains may not necessarily be divided completely independently. However, in the technique of the foregoing Japanese Laid-Open Patent Application Tokukaihei 11-183937, the average diameter of each small domain inevitably becomes too large to exhibit optical isotropy unless each of the small domains is independently divided like a microcapsule in which each small domain of the liquid crystal material is almost entirely covered with the material which divides the liquid crystal material into the small domains. That is, according to the technique of the foregoing Japanese Laid-Open Patent Application Tokukaihei 11-183937, each small domain needs to be covered almost entirely.

Further, the material described in the foregoing Japanese Laid-Open Patent Application Tokukaihei 11-183937, which divides a liquid crystal into small domains is aimed only at suppressing the temperature dependency of Kerr constant. On the contrary, the alignment auxiliary material of the present invention is aimed at stabilizing and expediting the alignment of molecules at the time of change in degree of optical anisotropy in a medium. Therefore, the foregoing Japanese Laid-Open Patent Application Tokukaihei 11-183937 does not teach at all anything like the alignment auxiliary material of the present invention.

That is, when molecules (e.g., liquid crystal molecules) or an aggregation of molecules which a medium comprises are aligned along the alignment auxiliary material, the alignment direction thereof reflects the structure of the alignment auxiliary material to some extent. For example, when the alignment auxiliary material has a uniaxial alignment direction, the alignment of the molecules or the aggregation of the molecules which the medium comprises exhibits a uniaxial tendency to some extent. Meanwhile, the foregoing Japanese Laid-Open Patent Application Tokukaihei 11-183937 describes a spherical microdomain in which liquid crystal molecules aligned in the same direction when no voltage is applied or when a voltage is applied. Moreover, the microdomain is formed to reduce temperature dependency and therefore is not to stabilize or expedite the alignment of molecules or that of the aggregation of molecules at the time of changing the degree of optical anisotropy.

With this arrangement, the alignment auxiliary material, stabilizing or expediting the alignment of the molecules in the bulk region, helps the change in degree of optical anisotropy of the material layer that occurs in response to field application. On this account, the intensity of an external filed applied for display operation by the display element can be reduced.

The material layer is made of a medium that is changed in degree of optical anisotropy of the material layer according to whether an external field is applied or not. Here, the change in degree of optical anisotropy means a change in shape of refractive index ellipsoid. In other words, the display element of the present invention uses the change in shape of ellipsoid, that occurs in response to application of a field, to realize varied display states.

On the other hand, a conventional liquid crystal display element applies a field to a medium for display. In response to application of a field, the conventional liquid crystal display element causes no change in shape of refractive index ellipsoid but causes a change in direction of major axis of the ellipsoid. Specifically, the conventional display element uses the change in direction of major axis of ellipsoid, that occurs in response to application of a field, to realize varied display states. Accordingly, the display element of the present invention greatly differs in display principle from the conventional display element.

Thus, because the conventional liquid crystal display element utilizes the change in the alignment direction of liquid crystal molecules, the viscosity inherent in the liquid crystal has greatly affected the response speed. On the contrary, according to the foregoing arrangement, the change in degree of optical anisotropy in a medium is used for display. Therefore, according to the foregoing arrangement, unlike the conventional liquid crystal display element, there is little defect of the viscosity inherent in the liquid crystal that affects the response speed, thereby realizing high-speed response. Further, with this advantage of high-speed response, the display element according to the present embodiment is suitable for a display device using a field sequential color method or the like.

Further, a conventional liquid crystal display element utilizing an electro-optical effect suffers from a drawback in that the driving temperature range is limited to temperatures near the liquid crystal phase transition point, thereby requiring extremely highly precise temperature control. On the other hand, according to the foregoing arrangement, the medium only needs to be kept at a temperature at which optical anisotropy is changed in response to field application, thereby easing temperature control.

Further, the conventional liquid crystal display element utilizing the electro-optical effect suffers from a drawback in that it has advantages like a high-speed response property and a wider viewing angle but also has a very high driving voltage. On the other hand, according to the foregoing arrangement, the alignment auxiliary material functions to stabilize or expedite the alignment of the molecules in the bulk region. This makes it possible for a smaller field to change the degree of optical anisotropy, thereby realizing a display element which can be driven by application of an external field at a practical level and which is provided with a high-speed response property and a wider viewing angle.

Further, in contrast to the conventional liquid crystal display element which changes the alignment of the liquid crystal molecules for performing display, the foregoing arrangement uses the change in degree of optical anisotropy in a medium for display, thereby realizing a wider viewing angle.

The display element of the present invention may comprise a pair of substrates, at least one of which is transparent; and a material layer between the substrates and may apply an external field on the material layer, in order to perform display operation, the material layer including (a) a medium whose optical anisotropy degree is changeable by field application, and (b) a hydrogen-bonded cluster.

With this arrangement, the change in degree of optical anisotropy by field application may be promoted by the hydrogen-bonding material.

In order to solve the foregoing problems, the display device of the present invention comprises one of the foregoing display elements.

With this arrangement, the display element exhibits optical isotropy when a field is applied, and can be brought into operation by a low-intensity field. Therefore, it is possible to realize a display device that requires a low-intensity field for display.

In order to solve the foregoing problems, the manufacturing method of the display element of the present invention is a manufacturing method of a display element that comprises a pair of substrates, at least one of which is transparent, and a material layer between the substrates and applies an external field on the material layer in order to perform display operation, the method comprising the steps of: forming the material layer between the substrates by sealing a medium therebetween, the medium being changed in optical anisotropy degree when a field is applied; forming a liquid crystal phase in the medium of the material layer; and forming an alignment auxiliary material in the medium while the medium is in the liquid crystal phase.

With this method, the alignment auxiliary material has more molecules aligned along the alignment direction of the molecules which the medium exhibiting a liquid crystal phase comprises, than the molecules aligned in other directions. Therefore, it is possible to realize a display element provided with the alignment auxiliary material capable of encouraging the molecules, which the medium comprises, to be aligned in the same alignment direction as that in the liquid crystal phase when a field is applied, or capable of fixing the alignment of the molecules in the bulk region. On this account, it is possible to manufacture a display element that exhibits change in degree of optical anisotropy when a field is applied, and can be driven by a low-intensity field.

Further, according to the foregoing manufacturing method, the degree of optical anisotropy is changed by a low-intensity field. On this account, it is possible to realize a display device that achieves high-response and wide viewing angle, and can be driven by a practical intensity field.

Further, the manufacturing method of the display device of the present invention is a manufacturing method of a display device that comprises method for manufacturing a display element including a pair of substrates, at least one of which is transparent, and a material layer between the substrates and applying an external field on the material layer in order to perform display operation, the method comprising the step of: adding an alignment auxiliary material or a material functioning as an alignment auxiliary material to a medium which is changed in optical anisotropy degree when a field is applied. The alignment auxiliary material or the material functioning as an alignment auxiliary material may be a hydrogen bonding material, fine particles, a porous structure material, or a polymerizable compound, for example.

With the foregoing method, it is possible to manufacture a display element which causes the fine particles to promote a change of alignment direction of molecules which the medium comprises when a field is supplied, or to fix the alignment of the molecules in the bulk region with the alignment auxiliary material. Therefore, the display element exhibits change in degree of optical anisotropy when a field is applied, and can be driven by a low-intensity field.

The manufacturing method of the display device of the present invention is a manufacturing method of a display device that includes a pair of substrates, at least one of which is transparent, and a material layer between the substrates and applies an external field on the material layer in order to perform display operation, the method comprising the step of: adding a polymerizable compound to a medium which is changed in optical anisotropy degree when a field is applied; and polymerizing the compound thus added to the medium.

With the foregoing method, it is possible to manufacture a display element which causes the porous structure material to promote a change of alignment direction of molecules which the medium comprises when a voltage is supplied, or to fix the alignment of the molecules in the bulk region by the polymer. Therefore, the display element exhibits change in degree of optical anisotropy by application of external field, and can be driven by a low-intensity external field.

BRIEF DESCRIPTION OF THE DRAWINGS

Additional objects, features, and strengths of the present invention will be made clear by the description below. Further, the advantages of the present invention will be evident from the following explanation in reference to the drawings.

FIG. 3(b) shows a state where a voltage V1 is applied between two electrodes, and FIG. 3(c) shows a state where a voltage V2 (>V1) is applied between the two electrodes.

FIG. 4 is an explanatory view showing the alignment directions of the molecules of a comparative display element when the voltage V2 (>V1) is applied between the two electrodes.

FIG. 11 is a view illustrating classification of lyotropic liquid phase.

FIG. 18(a) is a cross sectional view schematically showing alignment condition of molecules of the display element of FIG. 17 when no field is applied, FIG. 18(b) is a cross-sectional view schematically showing alignment state of molecules alignment condition of molecules of the display element of FIG. 17 when a voltage is applied

FIG. 20 is an explanatory view schematically showing the mechanism of optical activity.

DESCRIPTION OF THE EMBODIMENTS

First Embodiment

An embodiment of the present invention is described below, referring to Figures. Note that, the respective embodiments in this specification mainly deal with the case of using a field as means for changing degree of optical isotropy of the medium; however, the present invention is not limited to this case, and a magnetic field, light etc. may be used instead of a field. Further, the present embodiment mainly deals with the case of carrying out display with a medium that exhibits an optical isotropy when a field (external field) is applied or when no electrical field (external field) is applied; however, the present invention is not limited to this case. More specifically, the medium of the present embodiment is not limited to the medium that is isotropic when a field (external field) is applied or when no field (external field) is applied, but may be a medium that is anisotropic when no field (external field) is applied, and is changed in degree of optical anisotropy in response to application of field (external field). In being "optical isotropic" is meant that the medium is at least macroscopically isotropic in the visible light wavelength region (i.e., in a scale equal to or larger than a wavelength scale of the visible light).

Figure 1:
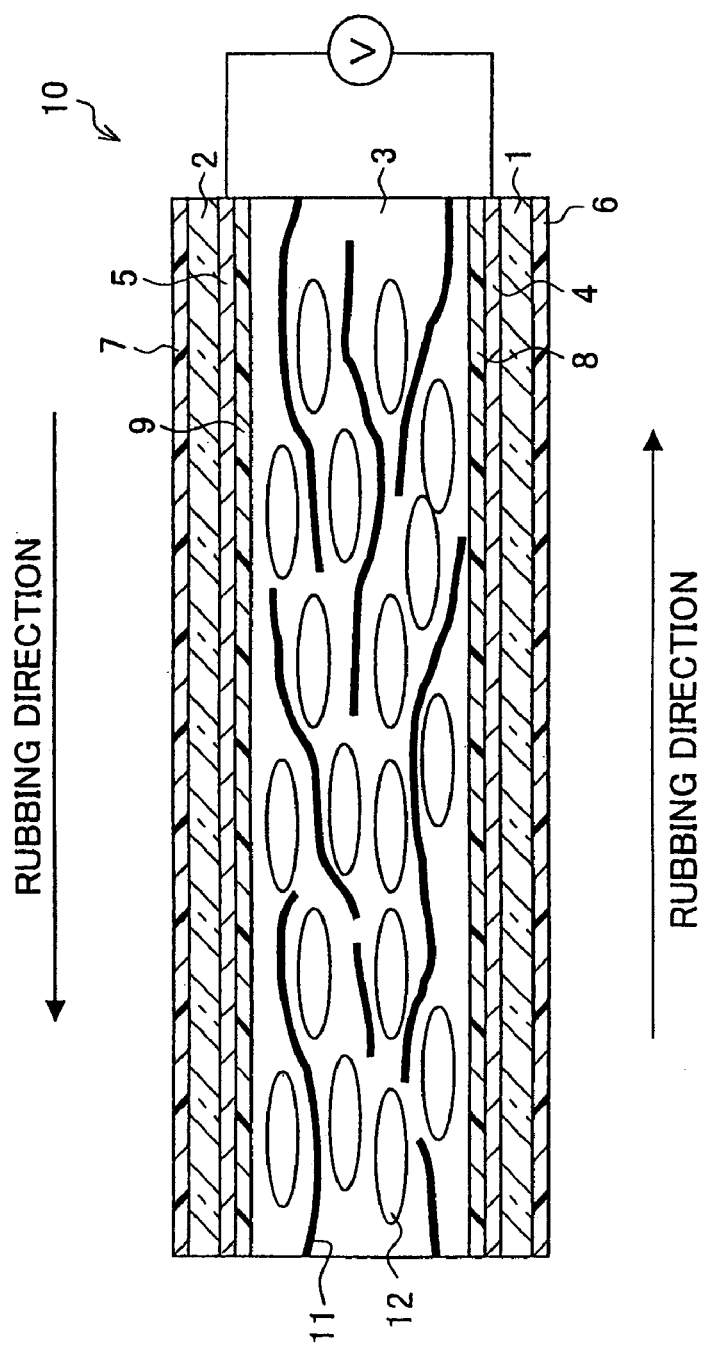
FIG. 1 is a cross sectional view schematically illustrating an arrangement of a display element according to one embodiment of the present invention.

FIG. 1 is a cross sectional view schematically illustrating an arrangement of a display element according to the present embodiment. This display element is provided in a display device together with a driving circuit, signal lines (data signal line), scanning lines (scanning signal line), switching elements etc. The display element carries out display using a medium that becomes isotropic when no field is applied to the electrode and becomes optically anisotropic when a field (external field) is applied.

Figure 21:
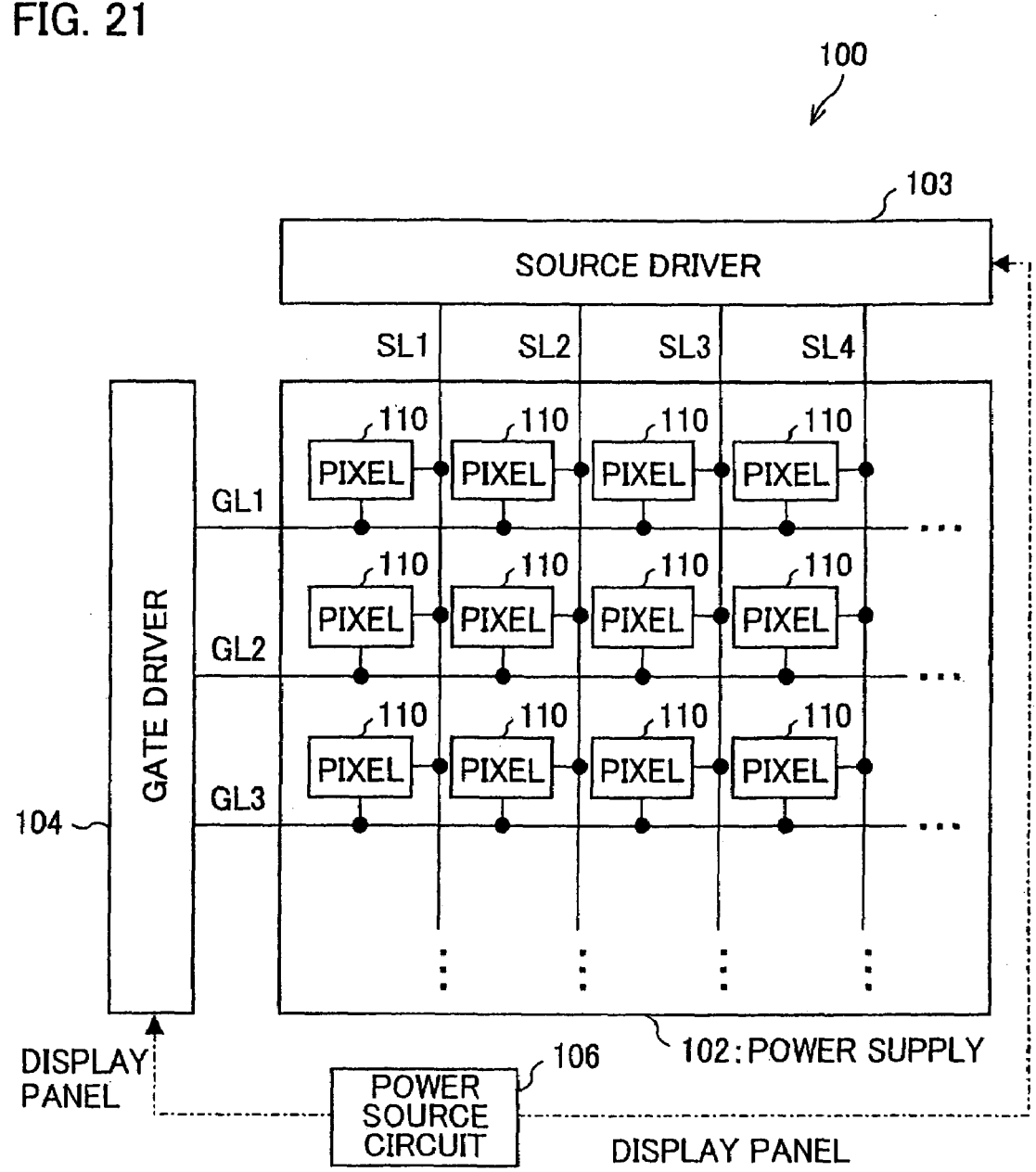
FIG. 21 is a block diagram illustrating a schematic arrangement of the main portion of a display device using a display element according to one embodiment of the present invention.
Figure 22:
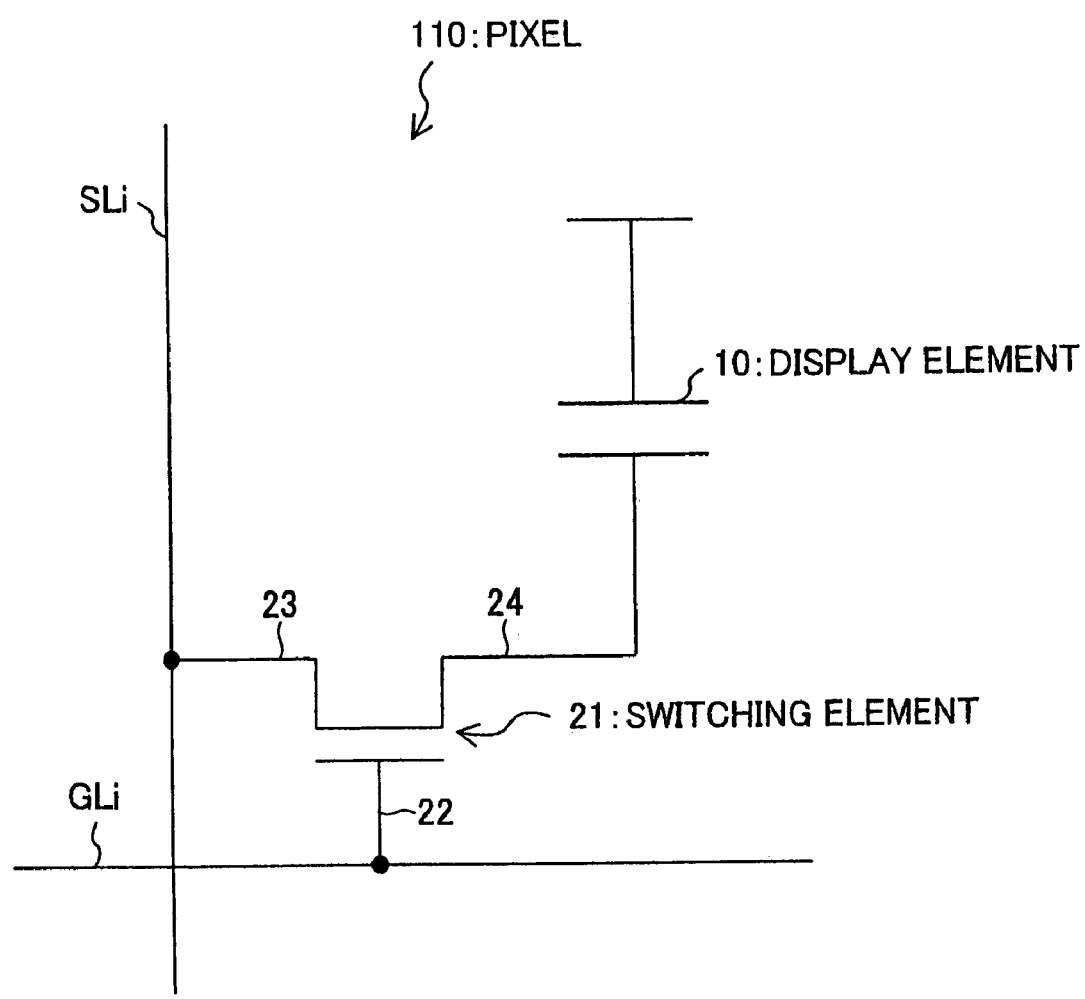
FIG. 22 is a schematic view illustrating a schematic arrangement of the periphery of the display element used in the display device illustrated in FIG. 21.

FIG. 21 is a block diagram illustrating a schematic arrangement of the main portion of the display device using the display element of the present embodiment. FIG. 22 is a pattern diagram illustrating a schematic arrangement of periphery of the display element (display element 10) used in the display device illustrated in FIG. 21.

As illustrated in FIG. 21, a display device 100 according to the present embodiment includes a display panel 102 in which pixels 110 are arranged in matrix, a source driver 103 and gate driver 104 which function as driving circuits, a power supplying circuit 106 etc.

Each pixel 110 is, as illustrated in FIG. 22, provided with the display element (display element 10) and a switching element 21.

Further, the display panel 102 is provided with a plurality of data signal lines SL1 to SLn (n is an arbitral integer not less than 2) and a plurality of scanning lines GL1 to GLm (m is an arbitral integer not less than 2), which respectively cross the data signal lines SL1 to SLn. Corresponding to each intersection of the data signal lines SL1 to SLn and the scanning signal lines GL1 to GLm, the pixels 110 are respectively provided.

The power supplying circuit 106 supplies a voltage to the source driver 103 and the gate driver 104 in order to cause the display panel 102 to perform display operation. In response to this voltage application, the source driver 103 drives the data signal lines SL1 to SLn of the display panel 102 and the gate driver 104 drives the scanning signal lines GL1 to GLm of the display panel 102.

Figure 6:
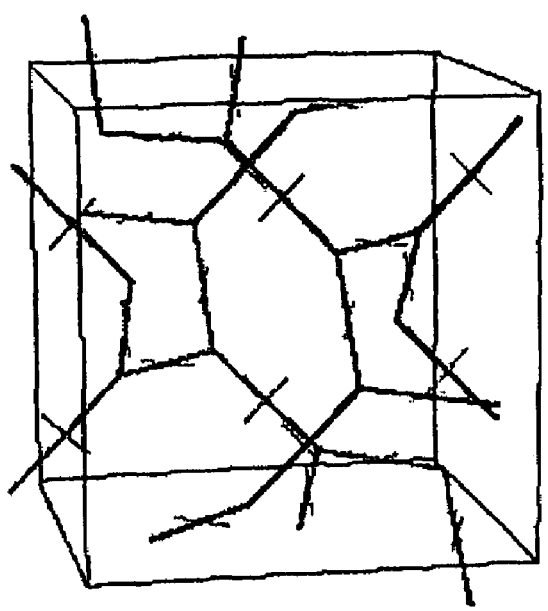
FIG. 6 is a structure model (rod-network-model) of a cubic phase.

The switching element 21 may be, for example, an FET (Field Effect Transistor), a TFT (Thin Film Transistor), or the like. In FIG. 6, the switching element 21 is connected to the scanning signal lines GLi via its gate electrode 22, and to data signal line SLi via its drain electrode 23. Further, the switching element 21 is connected to one end of the display element 10 via its source electrode 24. Further, the other end of the display device 10 is connected to a common electrode line (not shown) that is used for all of the pixels 110. With this arrangement, when the scanning signal line GLi (i is an arbitrary integer not less than 1) is selected in a pixel 110, the corresponding switching element 21 is conducted, so that a signal voltage determined by a display data signal supplied from a controller (not shown) is applied to the display element 10 by the source driver 103 via the corresponding data signal line SLi (i is an arbitrary integer not less than 1). Ideally, after the selection period of the scanning signal line GLi is finished and the switching element 21 is blocked, the display element 10 keeps the same voltage level at the time the switching element 21 is blocked.

As shown in FIG. 1, the display element of the present embodiment is constituted of two opposed transparent substrates (substrate 1 and 2) with a material layer (dielectric liquid layer) 3 therebetween. The material layer 3 is an optical modulation layer. Further, the surfaces (inner faces) of the substrates 1 and 2, the surfaces opposite to each other, are provided with electrodes (transparent electrode) 4 and 5, respectively, that function as field applying means for applying a field to the material layer 3. Further, the inner faces of the electrodes 4 and 5 are provided with alignment films 8 and 9, respectively. Further, the other (outer) surfaces (opposite to the inner surfaces) of the substrates 1 and 2 are provided with polarizers 6 and 7, respectively.

The substrates 1 and 2 are each made of a glass substrate. Further, the interval between the two substrates, that is the thickness of the material layer 3, is 5 μm. Further, the electrodes 4 and 5 are each made of ITO (Indium Tin Oxide).

Figure 2:
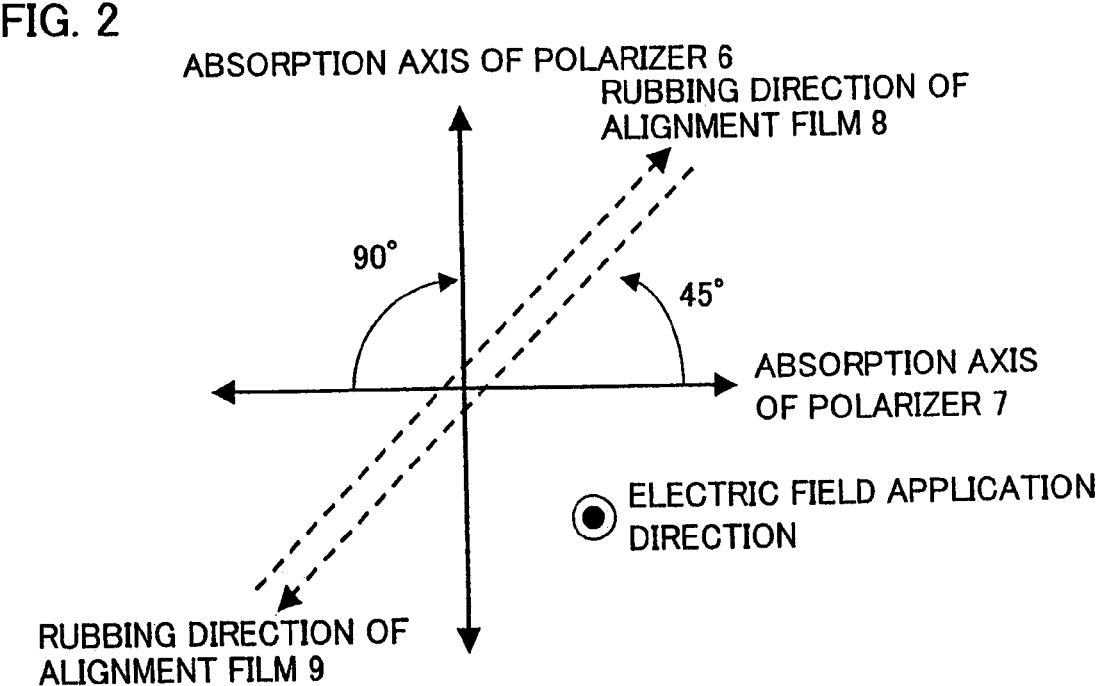
FIG. 2 is an explanatory view showing rubbing directions of alignment films and a direction of an absorption axis of a polarizer, according to a display element according to one embodiment of the present invention.

FIG. 2 shows the rubbing direction of the alignment films (horizontal alignment film) 8 and 9 and the absorption axis direction of the polarizers 6 and 7. As shown in the figure, the alignment films 8 and 9 have been processed through horizontal rubbing treatment (rubbing treatment) so that the rubbing directions of the two films become antiparallel (parallel but in opposite directions). The alignment films 8 and 9 are made of polyimide.

Further, as shown in the figure, the absorption axes of the polarizers 6 and 7 are orthogonal to each other. The absorption axes of the polarizers 6 and 7 and the rubbing directions of the alignment films 8 and 9 respectively make 45° angles.

As shown in FIG. 1, the material layer 3 includes a negative-type liquid crystal mixture (medium) comprising a molecule 12, and a polymer chain (alignment auxiliary material) 11. The negative-type liquid crystal mixture consists of the following compounds (1)(30 wt %), (2) (40 wt %), and (3) (30 wt %).

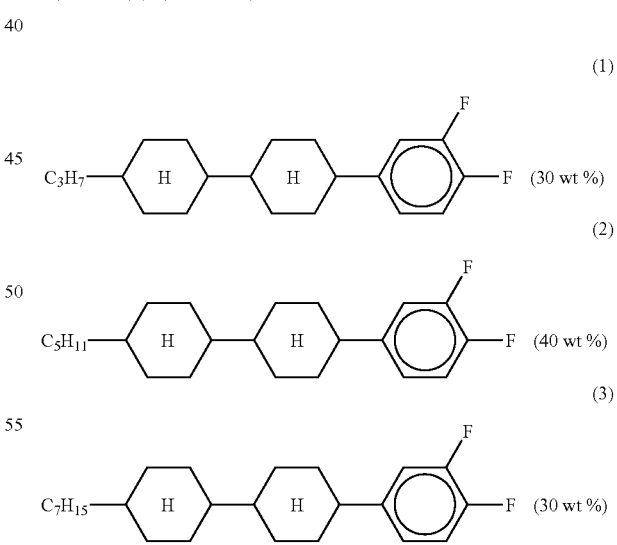

Further, the polymer chain 11 is a polymer obtained through polymerization (metallization) of a photopolymerizable monomer (polymerized compound). For example, the polymer chain 11 is obtained through polymerization of the compound (liquid (meta) acrylate, polymerized compound) denoted by the following structural formula (4).

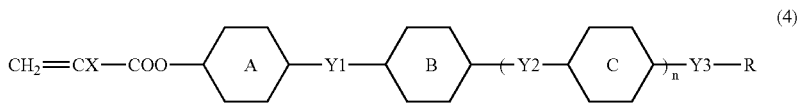

(4)

Note that, in the foregoing structural formula (4), X denotes a hydrogen atom or a methyl group. Further, n is an integer of 0 or 1. Further, the six-membered rings A, B and C denote functional groups having six-membered structures, such as a 1,4-phenylene group, or a 1,4-trans cyclohexylene (trans-1,4-cyclohexylene) group. However, the six-membered rings A, B and C are not limited only to these functional bases; that is, as long as they comprise at least one of the foregoing functional bases, all of them may be the same kinds, or may be different kinds to each other, for example. Note that, in the foregoing functional group denoted by the structural formula (4), m denotes an integer selected from 1 to 4.

Further, Y3 denotes a single bond, —O—, —OCO—, —COO. Further, R denotes hydrogen atom, halogen atom, cyano group, an alkyl group with 1-20 carbons, an alkenyl group, alkoxyl group. Note that, the compound exhibits a liquid crystal phase at around the room temperature, thus desirably giving alignment controlling ability. The Y3 is therefore suitable for a medium to be sealed in the material layer 3.

Further, the photopolymerizable monomer (polymerized compound) is not limited to such an achiral material but may be a chiral material. The chiral photopolymerizable monomer may be, for example, the polymerized compound denoted by the following structural formula (5).

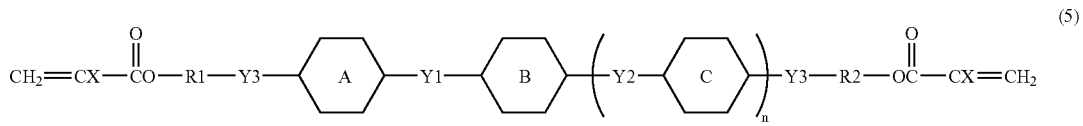

(5)

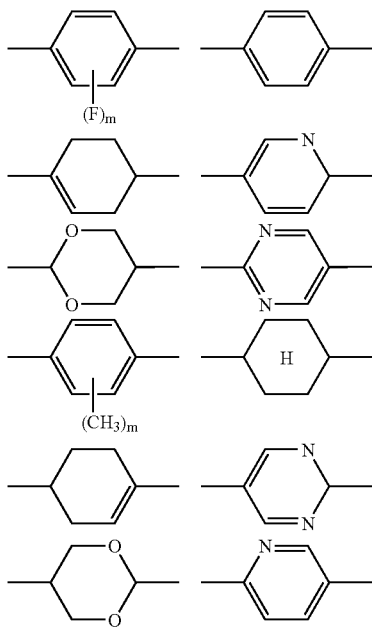

Further, in the foregoing structural formula (4), Y1 and Y2 individually denote a single bond, —CH$_2$CH$_2$—, —CH$_2$O—, —OCH$_2$—, —OCO—, —COO—, —CH=CH—, —C≡C—, —CF=CF—, —(CH$_2$)$_4$—, —CH$_2$CH$_2$CH$_2$O—, —OCH$_2$CH$_2$CH$_2$—, —CH=CHCH$_2$CH$_2$O—, —CH$_2$CH$_2$CH=CH—. Note that, Y1 and Y2 both may be the same kinds, or may be different kinds to each other, as long as it comprises at least one of the foregoing structures.

In the structural formula (5), X denotes a hydrogen atom or a methyl group. Further, n is an integer of 0 or 1. Further, the six-membered rings A, B and C denote functional groups having six-membered structures, such as a 1,4-phenylene group, or a 1,4-trans cyclohexylene (trans-1,4-cyclohexylene) group. However, the six-membered rings A, B and C are not limited only to these functional bases; that is, as long as they comprise at least one kind of the functional base denoted by the following structural formula (7), all of them may be the same kinds, or may be different kinds to each other, for example. Note that, in the foregoing functional group, m denotes an integer selected from 1 to 4.

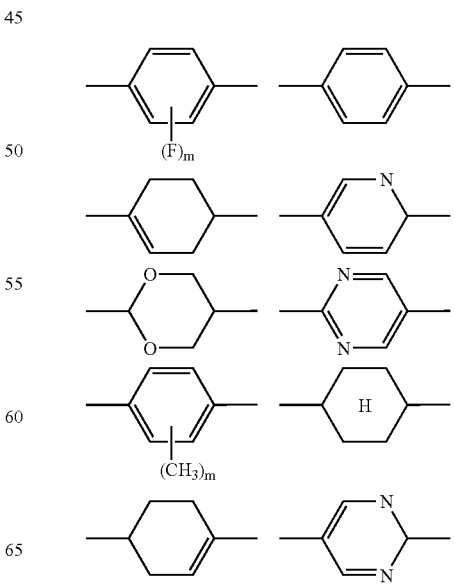

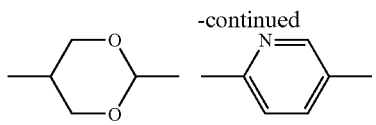

Further, in the foregoing structural formula (5), each of the Y1 and Y2 is a liner or branched alkyl group or alkenyl group, wherein a $CH_2$ group or two unadjacent $CH_2$ groups may be replaced with —O—, —S—, —CO—O— and (or) —O—CO, and may comprise a single bond, —$CH_2CH_2$—, —$CH_2O$—, —$OCH_2$—, —OCO—, —COO—, —CH=CH—, —C≡C—, —CF=CF—, —$(CH_2)_4$—, —$CH_2CH_2CH_2O$—, —$OCH_2CH_2CH_2$—, —CH=CHCH$_2$CH$_2$O—, —CH$_2$CH$_2$CH=CH—. Further, it may comprise a chiral carbon, however not required. Namely, Y1 and Y2 may be the same or different as long as they each have one of the foregoing structures.

Further, Y3 denotes a single bond, —O—, —OCO—, —COO. Further, R1 denotes an alkyl group with 3-20 carbons comprising a chiral carbon and a branched structure. R2 denotes an alkyl group with 1-20 carbons, that may comprise a chiral carbon, however not required. These compounds exhibit liquid crystal phases, thus desirably giving alignment controlling ability. The Y2 and Y3 are therefore suitable for a medium to be sealed in the material layer 3. The compound denoted by the following formula (6) is one example of the foregoing compound.

sealing off the edges. In applying the sealing material, a portion that will be an inlet for injecting the medium (e.g., dielectric liquid) is not sealed off but kept open. Note that materials of the spacer and the sealing material are not limited but may be any materials that are conventionally used for the liquid crystal display element.

Next, the medium, i.e., the negative-type liquid crystal mixture consisting of the foregoing compounds (1)(30 wt %), (2)(40 wt %), and (3)(30 wt %), is further mixed with the liquid crystal (meta) acrylate (photopolymerizable monomer) and the methylethylketoneperoxide (polymerization initiator), and the resulting medium is injected between the substrates 1 and 2. Here, the amount of photopolymerizable monomer is in a range of 0.05 wt % (weight %) to 15 wt %. Further, the amount of polymerization initiator is not more than 10 wt %.

Next, the cell (the liquid crystal element) is irradiated with ultraviolet light, while keeping the substrates 1 and 2 at 100° C. by an external heating device (not shown), to polymerize (metalize) the photopolymerizable monomer injected into the material layer 3, so as to form the polymer chain 11. Note that the negative type liquid crystalline mixture is in a negative type Nematic liquid crystal phase at temperature less than 113° C., and is isotropic at temperatures at or above 113° C. More specifically, in the present embodiment, a photopolymerizable monomer is polymerized in the medium sealed in the material layer 3 when the medium is exhibiting a liquid crystal phase, thereby forming a polymer chain 11.

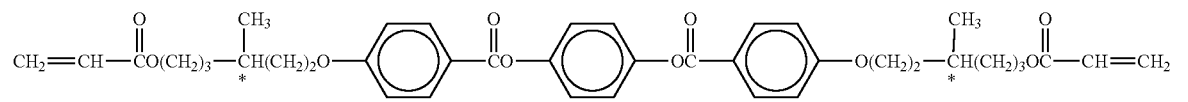

(6)

Note that, the compound (6) exhibits a cholesteric phase in a temperature 69° C. to 97° C.

Further, a methylethylketoneperoxide is added to the material layer 3 as an initiator (polymerization initiator; not shown) for rapid polymerization.

The following explains a manufacturing method of the display element of the present embodiment. First, the electrodes 4 and 5 are formed on the respective surfaces of the substrates 1 and 2, using a conventional available manufacturing method of a liquid crystal display element.

Next, the alignment film 8 is formed over the electrode 4 on the substrate 1, and the alignment film 9 is formed over the electrode 5 on the substrate 2. The alignment films 8 and 9 have been rubbed in advance so that their rubbing directions are antiparallel.

Further, the polarizers 6 and 7 are bonded on the other sides of the substrates 1 and 2, i.e., the sides opposite to those on which the electrodes 4 and 5 are formed. Here, the polarizers 6 and 7 are bonded so that the absorption axes of the polarizers 6 and 7 are orthogonal to each other, and the rubbing directions of the alignment films 8 and 9 and the absorption axes of the polarizers 6 and 7 respectively make 45° angles.

Next, the substrates 1 and 2 are joined with a 5 μm gap (thickness of the material layer 3), which gap is created by interpolating a spacer (not shown) formed from plastic beads or the like. A sealing material (not shown) is applied and fixed around the edges of the joined substrates, thereby With this element in which the medium sealed in the material layer 3 is exhibiting a liquid crystal phase, the liquid crystal molecules (molecule 12) are under influence of the alignment films 8 and 9 that have been rubbed, and therefore are aligned in the rubbing direction. Therefore, when polymerization of the photopolymerizable monomer is carried out under this condition, the resulting polymer chain 11 has more molecules aligned in the alignment direction of the molecules 12, than the molecules aligned in other directions (see FIG. 1). That is, the polymer chain 11 has a structural anisotropy so that more molecules aligned in the alignment direction of the molecules 12, that have been aligned by the rubbing treatment, than the molecules aligned in other directions.

The display element thus prepared is kept at a temperature near above a Nematic phase-isotropic phase transition temperature (that is, at a temperature slightly above the phase transition temperature, for example, +0.1K) by using an external heating device, so as to allow the element to change in transmittance, that is caused by voltage (field) application between the electrodes 4 and 5. More specifically, the medium sealed in the material layer 3 was caused to be isotropic by being kept at the temperature slightly above the liquid crystal phase-isotropic phase transition point thereof, and the transmittance of the material layer 3 can be changed by being supplied with a voltage (field) between the electrodes 4 and 5. A maximum transmittance of the display element was obtained when a voltage of 110V was applied.

Meanwhile, for comparison with the display element of the present embodiment, a comparison cell (comparison display element) was prepared through the same manufacturing method of the foregoing display element except that the photopolymerizable monomer and the initiator were not added and the ultraviolet irradiation was not performed. Further, as with the foregoing display element, this comparison display element was kept at a temperature near above a Nematic phase-isotropic phase transition temperature and was supplied with a voltage (field) between the electrodes 4 and 5. For this comparison display element, a maximum transmittance was obtained when a voltage of 150V was applied.

Figure 3:
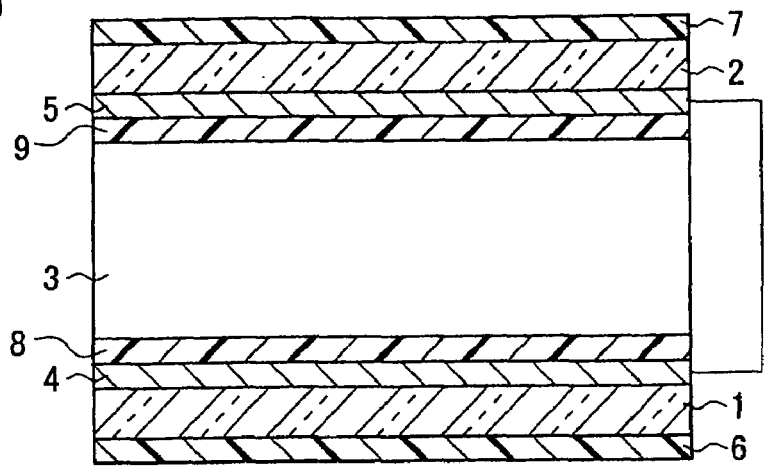
FIGS. 3(a) through 3(c) are explanatory views for showing the relation between an applied voltage and a transmittance for a comparative display element.
Figure 3:
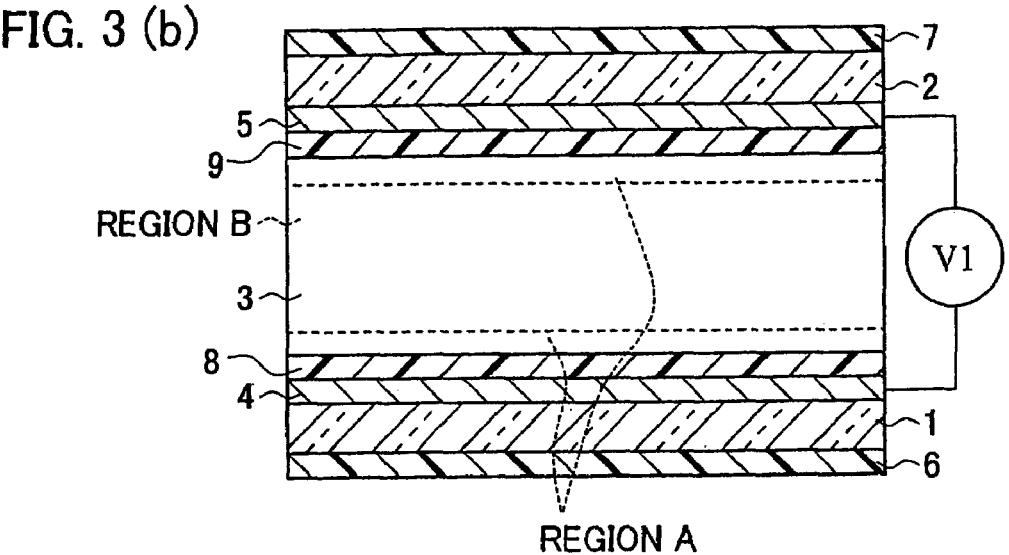
Figure 3:
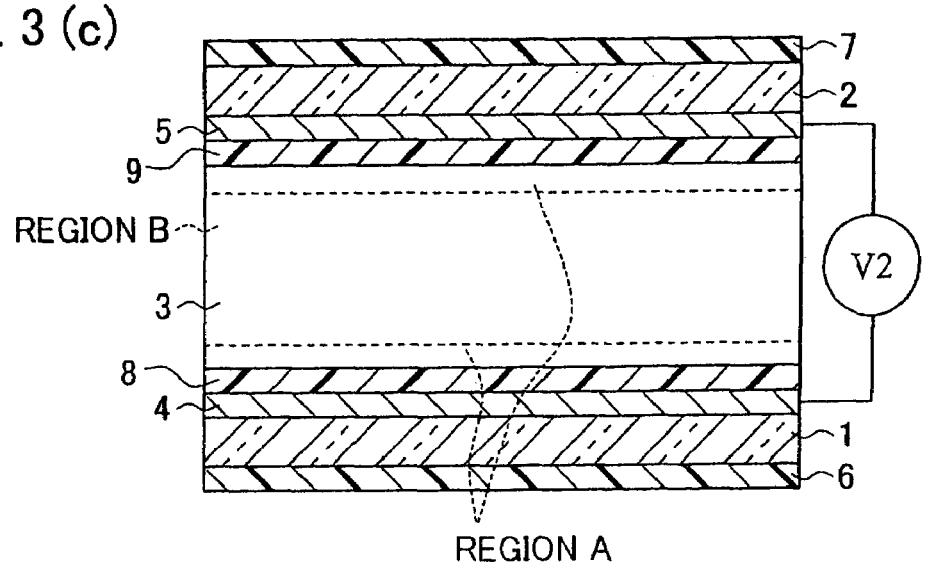

FIGS. 3(a) through 3(c) are explanatory views for showing the relation between the applied voltage and the transmittance of the comparison display element. FIG. 3(a) shows a state where no voltage (field) is applied, FIG. 3(b) shows a state where a voltage V1 is applied between the electrodes 4 and 5, and FIG. 3(c) shows a state where a voltage V2 (>V1) is applied between the electrodes 4 and 5.

As shown in FIG. 3(b), when the voltage V1 is applied between the electrodes 4 and 5, the molecules of the material layer 3 in the vicinity of the substrate (region A) are turned to the rubbing direction of the alignment films 8 and 9. However, the alignment direction is not changed for the molecules in the bulk region (region B). More specifically, due to the effect of the alignment treatment (rubbing treatment) on the boundary, the voltage that aligns the molecules in the vicinity of the boundary is reduced, and therefore, the molecules in the region A are turned to the rubbing direction. However, since the intermolecular interaction does not affect the bulk (bulk region), the alignment direction of the molecules is not changed in the region B.

Meanwhile, as shown in FIG. 3(c), when the voltage V2 is applied between the electrodes 4 and 5, the alignment of the molecules are changed not only in the region A but also in the region B. However, the molecules in the region B do not contribute to the optical response. The following explains the reason for this with reference to FIG. 4.

FIG. 4 is an explanatory view showing the alignment directions of the molecules in the region A and the molecules in the region B when the voltage V2 is applied between the electrodes 4 and 5. Note that, the upper row of the table of FIG. 4 shows the alignment direction and the polarization direction of the molecules viewed in parallel from the substrate, while the lower row shows the alignment direction and the dipole direction (polarization direction) of the molecules viewed from the normal direction (field direction) of the substrate.

As shown in the figure, when the voltage V2 is applied between the electrodes 4 and 5, the polarization of the molecules is unified to the field direction in the region A; further, the molecules are aligned in the rubbing direction due to the effect of alignment treatment on the boundary, that is, the molecules are aligned in the manner of "alignment a". On the other hand, the polarization of the molecules is unified to the field direction in the region B, but there is little intermolecular interaction, and therefore the effect of alignment treatment does not affect the region B, so that the molecules are aligned in various directions within the substrate surface (the direction parallel to the substrate surface) denoted as "alignment b" in the figure). Accordingly, the region B is optically isotropic, and does not contribute to optical response.

As described, in the comparison display element, a field is applied to the all regions (regions A and B) of the material layer 3, but only the portion (region A) in the vicinity of the substrate contributes to optical response. To obtain a wider area for optical response, the voltage applied between the electrodes 4 and 5 needs to increase. Therefore, the driving voltage of the comparison display element increases.

Meanwhile, as shown in a schematic view of FIG. 1, the display element of the present embodiment includes a chain-type polymer (polymer chain 11) in the cell. This polymer chain 11 is formed by previously decreasing the temperature of the medium (e.g., dielectric liquid) so that a Nematic phase is expressed, and then causing reaction of the polymerized monomer under the condition. Therefore, more than half portion of the polymer chain 11 is aligned substantially in parallel with the alignment direction of Nematic phase molecules.

The display element with such a structure is kept as liquid (isotropic) at a temperature near the Nematic-isotropic phase transition temperature, and a voltage V1 is applied between the electrodes 4 and 5. As a result, the molecules move and align not only in the vicinity of the boundary but also in the whole regions including the bulk region. Further, as the voltage increases, superior alignment order of the molecules can be obtained in the material layer, thereby obtaining greater optical response.

This effect of the display element of the present embodiment is given by the polymer chain 11 formed in the whole area of the cell with alignment in a desirable direction. In contrast, in the comparison display element, the molecule alignment is controlled only by the alignment treatment on the substrate surface (the alignment films 8 and 9). More specifically, the display element of the present embodiment uses, in addition to the rubbing treatment on the alignment films 8 and 9, a polymer chain 11 in which more than half portion is aligned in the rubbing direction, which therefore also plays a roll to encourage the molecules to be aligned in the rubbing direction. On this account, the display element achieves a maximum transmittance by a lower voltage than that to obtain a maximum transmittance of the comparison display element.

As described, the display element of the present embodiment carries out display by aligning the molecules of a medium through field application, which medium is isotropic before the field application. Further, the display element includes a polymer (alignment auxiliary material) to promote the molecule alignment upon the field application. The polymer (alignment auxiliary material) is formed with the medium exhibiting liquid crystal phase, that is, when the molecules of the medium are aligned to cause expression of an optical anisotropy. By using such a polymer (alignment auxiliary material), when a field is applied to an isotropic medium, the molecules of the medium is encouraged to be aligned in the alignment manner (alignment manner of liquid crystal phase) given upon formation of the polymer (alignment auxiliary material). Due to this function of the polymer (alignment auxiliary material), the display element of the present embodiment can be driven by a lower voltage.

Note that, the expression method of liquid crystal phase in forming a polymer (alignment auxiliary material) is not limited to the described method of causing Nematic phase by decreasing the temperature of the medium. For example, the molecules may be compulsively aligned without decreasing the temperature by expressing liquid crystal phase through application of a high voltage not required for general display operation, i.e., a lot greater voltage than the driving voltage of the display element. More specifically, expression of the liquid crystal phase may be caused by a change (decrease in general) in temperature or application of an external field, such as a field. Note that, it is preferable that the external field applied to express the liquid crystal phase differs from the environment on display.

Further, the liquid crystal phase expressed in forming the polymer (alignment auxiliary material) is not limited to the Nematic phase, as long as it exhibits optical anisotropy in response to the application of an external field that is different than the driving environment of the display element; an example may be a smectic phase, a crystal phase etc. However, to form a desirable polymer (alignment auxiliary material), a preferable example is one flexible in alignment and not likely to cause any alignment defect, such as Nematic phase, smectic A phase etc.

The medium to be sealed in the material layer 3 is preferably a medium having negative anisotropy. An example of the medium may be a mixture of 3HPFF, 5HPFF and 7HPFF, that is one of the liquid crystal materials described in Japanese Laid-Open patent application Tokukai 2001-249363 (published on Sep. 14, 2001). The 3HPFF refers to 1,2-difluoro-4-[trans-4-(trans-4-n-propylcyclohexyl) cyclohexyl]benzene. The 5HPFF refers to 1,2-difluoro-4-[trans-4-(trans-4-n-pentylcyclohexyl) cyclohexyl]benzene. The 7HPFF refers to 1,2-difluoro-4-[trans-4-(trans-4-n-pentylcyclohexyl) cyclohexyl]benzene.

Further, the medium for the material layer 3 is not limited to a dielectric medium but may be any medium that is changed in degree of optical anisotropy in response to external field application. Typically, the medium is substantially optically isotropic when no field (external field) is applied, and causes optical modulation in response to field (external field) application. That is, the medium may be a substance in which the orientational order parameter of the molecules or the molecular agglomerations or clusters is increased by the field application.

Further, the medium for the material layer 3 may be, for example, a medium in a liquid crystal phase having an orderly structure smaller than the optical wavelength, and therefore appears to be optically isotropic but has a negative dielectric anisotropy. Further, the medium may be a system made up of liquid crystal molecules forming agglomerations by being orientated radially in a size smaller than optical wavelength so that the system appears to be optically isotropic. By applying a field to such a medium, micro structures of the molecules or the molecular agglomerations are distorted, thereby inducing the optical modulation. Further, by providing the polymer (alignment auxiliary material) in this medium, the molecule alignment is promoted, and therefore the element may be driven by a low voltage (low level external field).

The medium may be, for example, a mixture system of 3HPFF, 5HPFF, and 7HPFF. This mixture system has a negative dielectric anisotropy.

As described above, the mixture system of 3HPFF, 5HPFF, and 7HPFF is transparent because of the orderly structure smaller than the optical wavelength. That is, the mixture system is optically isotropic when no field is applied. Therefore, when this mixture system is used as a material of the display element according to the present embodiment, the display element becomes possible to perform good black display under crossed nicols polarizers.

On the other hand, by applying a field between the electrodes 4 and 5 while keeping the temperature of the mixture system within the temperature range in which the mixture system is optically isotropic when no field is applied, the structure of the system exhibiting the optical isotropy is distorted, thereby causing the optical anisotropy. That is, the mixture system is optically isotropic when no field is applied, but becomes optically anisotropic by field application.

The display element having this arrangement, and the display device including the display element are capable of performing good white display because the structure exhibiting the optical isotropy is distorted by the field application thereby causing birefringence. Note that, the birefringence occurs in the same direction and its degree is changeable depending on the field application. Further, a voltage-transmittance curve, that represents the relationship between the voltage (field) applied between the electrodes 4 and 5, and the transmittance, draw a stable curve. That is, in the display element having this arrangement, and the display device including the display element, the voltage-transmittance curve is stable as long as the temperature is kept at a range at which the mixture system is optically isotropic when no field is applied. Thus, in the display element having this arrangement, and the display device provided with the display element, temperature control is very easy.

The following explains the difference in display principal between a liquid crystal display element according to a conventional display method and the display element according to the present embodiment using the medium with molecules whose optical anisotropy is changeable in degree by the field application, such as the foregoing mixture system.

Figure 8:
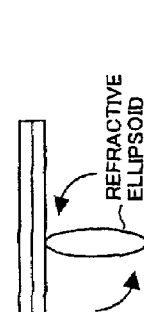
FIG. 8 is an explanatory view showing the difference in display principal between a liquid crystal display element according to a conventional display method and a display element according to one embodiment of the present invention in which BABH8 is sealed in the dielectric layer.

FIG. 8 is an explanatory view schematically illustrating shapes and directions of refractive index ellipsoids with and without field application, so as to show the difference in display principal between the liquid crystal display element according to a conventional display method and the display element according to the present embodiment using the foregoing mixture system. Note that, FIG. 8 depicts the display principles of the TN (Twisted Nematic) mode, VA (Vertical Alignment) mode, and IPS (In Plane Switching) mode as the conventional display modes.

As shown in the figure, the liquid crystal display element of the TN mode is arranged so that a liquid crystal layer is sandwiched between two opposed substrates, each of which is thereon provided with a transparent electrode (electrode). When no field is applied, the major axes of the liquid crystal molecules are helically aligned; when a field is applied, the major axes of the liquid crystal molecules are aligned along the field direction. In this case, as shown in FIG. 8, an average refractive index ellipsoid is orientated in such a manner that, when no field is applied, the major axes are aligned in parallel to the substrate surface; when the field is applied, the major axes are orientated along the substrate normal direction. That is, the refractive index ellipsoid has the ellipsoidal shape with or without field application, but the direction of the major axis is changed according to whether a field is applied or not (the refractive index ellipsoid rotates). Further, the refractive index ellipsoid causes little change in shape according to whether a field is applied or not.

Further, as with the liquid crystal element of TN mode, the liquid crystal display element of the VA mode is arranged so that a liquid crystal layer is sandwiched between two opposed substrates, each of which is thereon provided with a transparent electrode (electrode). However, in this element, when no field is applied, the major axes of the liquid crystal molecules in the liquid crystal layer are aligned in a substantially perpendicular direction with respect to the substrate surface; when a field is applied, the major axes of the liquid crystal molecules are aligned in a perpendicular direction to the field. That is, the refractive index ellipsoid has the ellipsoidal shape with or without field application, but the direction of the major axis (direction of refractive index ellipsoid) is changed according to whether a field is applied or not that is, the refractive index ellipsoid rotates. Further, the refractive index ellipsoid causes little change in shape according to whether a field is applied or not.

Further, the liquid crystal element of IPS mode includes one substrate with a pair of electrodes that have a liquid crystal layer therebetween. Further, the alignment direction of the liquid crystal molecules is changed by field application so that the display condition is changeable according to whether a field is applied or not. Therefore, as shown in FIG. 8, the refractive index ellipsoid has the ellipsoidal shape with or without field application, but the direction of the major axis is changed according to whether a field is applied or not (the refractive index ellipsoid rotates). Further, the refractive index ellipsoid causes little change in shape according to whether a field is applied or not.

As described, the liquid crystal display element according to a conventional display method perform display (transmittance modulation) in such a principle that the liquid crystal molecules are aligned (in the same direction, in general) even when no field is applied, and these tidily aligned molecules are simultaneously turned to a different direction in response to field application. Further, the refractive index ellipsoid causes little change in shape according to whether a field is applied or not. That is, in the liquid crystal display element according to a conventional display method, the display operation is performed with the refractive index ellipsoids that have the ellipsoidal shape with or without field application, but change in direction (the refractive index ellipsoid rotates) of the major axes by field application. Accordingly, the major axes of the refractive index ellipsoids are not necessarily aligned perpendicular to or in parallel with the field application direction. In contrast, as described later, the display element of the present embodiment, the refractive index ellipsoids are aligned perpendicular to or in parallel with the field application direction.

As described, the liquid crystal display element of a conventional display method carries out display by changing the alignment direction of liquid crystal molecules whose orientational order parameter is substantially constant with respect to visible light or greater wavelength.

On the other hand, in the display element of the present invention comprising a mixture system of 3HPFF, 5HPFF, and 7HPFF, alignment directions of the molecules are not constant when no voltage is applied. However, since these molecules are aligned with an order (orderly structure, orientational order) smaller than the optical wavelength scale, no optical anisotropy will occur (an orientational order parameter for visible light or a greater scale=0). Therefore, as shown in FIG. 8, the refractive index ellipsoids have round shapes, in contrast to the conventional liquid crystal element.

However, when a field is applied, due to the negative dielectric anisotropy of each molecule, the molecules are attracted to the substrate in-plane direction (direction in parallel with the substrate surface), and therefore their alignment direction change. Further, here, the orderly structure smaller than optical wavelength is disturbed, and optical anisotropy occurs (an orientational order parameter for visible light or a greater scale>0), so that the refractive index ellipsoids become oval shapes. At this point, the major axes of the refractive index ellipsoids are perpendicular to the field direction. More specifically, when the medium sealed in the material layer 3 has negative dielectric anisotropy, the refractive index ellipsoids become perpendicular to the field, and when the medium sealed in the material layer 3 has positive dielectric anisotropy, the refractive index ellipsoids become in parallel with the field. That is, in the display element comprising the foregoing mixture system, the shapes of the refractive index ellipsoids are isotropic ($nx=ny=nz$) when no field is applied, but they exhibit anisotropy ($nx>ny$) in shape in response to field application. Here, $nx$, $ny$ and $nz$ denote respective refractivities for the direction in parallel with the substrate surface in terms of length direction in FIG. 8, for the direction in parallel with the substrate surface in terms of depth direction in FIG. 8, and the direction perpendicular to the substrate surface.

Note that, the foregoing description: "an orientational order for visible light or a greater scale≈0 (little orientational order) expresses the condition where many of the liquid crystal molecules are aligned in a certain direction (there is an orientational order) when viewing at a smaller scale than visible light, but when viewing at a greater scale than visible light, the alignment direction is even, that is, there is no orientational order.

More specifically, in the present invention, the description: "an orientational order for visible light or a greater scale≈0" expresses the condition where the orientational order parameter is so small that it does not affect light whose wavelength is equal to or greater than visible light wavelength, such as the state where black display is realized with crossed nicols configuration. On the other hand, in the present invention, the description: "an orientational order for visible light or a greater scale>0" expresses the condition where the orientational order parameter is greater than a value around 0, such as the state where white display is realized with crossed nicols configuration (this includes grey scale).

Further, in the display element of the present embodiment, since the material layer 3 has a negative dielectric anisotropy, the major axis of refractive index ellipsoid is always perpendicular to the field direction when a field is applied (it should be noted that, when the material layer 3 has a positive dielectric anisotropy, the major axis of refractive index ellipsoid is parallel to the field direction). On the other hand, in the conventional liquid crystal display element, display operation is carried out by rotating the major axis of the refractive index ellipsoid by application of field, and therefore, the major axis of the refractive index ellipsoid is not always perpendicular or parallel to field direction.

As explained, in the display element according to the present embodiment comprising the mixture of 3HPFF, 5HPFF, and 7HPFF, the direction of the optical anisotropy is constant (the same field application direction), and the display operation is performed by changing the orientational order parameter which influences visible light. More specifically, in the display element according to the present embodiment comprising the foregoing mixture, the degree of optical anisotropy (or the orientational order which influences visible light) of the medium changes. That surely distinguishes the display element according to the present embodiment comprising the mixture in display principle from the liquid crystal elements for other display methods.

Moreover, in the display element according to the present embodiment comprising the mixture, since the display operation is performed by changing the degree of optical anisotropy of the medium, in other words, by using disturbance of the optical isotropic structure, the display element achieves a wide viewing angle characteristic, that cannot be obtained by the display device according to the conventional method that performs display by changing alignment direction of the liquid crystal molecules. Further, in the display element according to the present embodiment comprising the mixture, the direction of induced birefringence is constant, that keeps the optical axis in the same direction, thereby obtaining a wider viewing angle characteristic.

Further, the display element according to the present embodiment comprising the foregoing mixture carries out display by using anisotropy induced by disturbance of the structure (crystal-like lattice) of a microdomain. Therefore, unlike the conventional display principle, there is no defect of the particular viscosity of the liquid crystal that greatly affects the response speed, thereby realizing high-speed response, for example, 1 ms. More specifically, the conventional display principle performs display by using changes in alignment direction of the liquid crystal molecules, and therefore suffers from the defect of the particular viscosity of the liquid crystal that greatly affects the response speed; on the other hand, the display element according to the present embodiment comprising the mixture uses disturbance of the structure of a microdomain, and therefore has a little effect of the particular viscosity of the liquid crystal, thereby realizing high-speed response. With this advantage of high-speed response, the display element according to the present embodiment is suitable for a display device using a field sequential color method or the like.

Note that, the medium sealed in the material layer 3 may be a compound that solely exhibits the liquid crystal property, or a mixture of plural substances that cooperatively produce the liquid crystalline property. Further, the compound or the mixture may comprise a non-liquid crystal substance.

Furthermore, the display element according to the present embodiment is not limited to the foregoing structure in which the substrates 1 and 2 are glass substrates. Moreover, the gap between the two substrates is not limited to 5 μm specified in the foregoing example, but may be arbitrarily determined. Further, though the electrodes 4 and 5 are both made of ITO in the foregoing example, the present invention only requires at least one ITO electrode (one of electrodes 4 and 5).

Further, the alignment films 8 and 9 are not limited to polyimide films but may be made of polyamic acid or the like. Otherwise, polyvinyl alcohol, silane coupling agent, or polyvinyl cinnamate may be used.

When forming the film from polyamic acid or polyvinyl alcohol, the material is applied on the substrate to form an alignment film, and the film is then processed by rubbing treatment. Further, in the case of silane coupling agent, the film may be formed like a LB film through a crystal pulling method. Further, in the case of polyvinyl cinnamate, the material is applied on the substrate, followed by UV (Ultra Violet) irradiation.

Further, the foregoing display element uses the alignment films 8 and 9 whose rubbing directions are antiparallel to each other, but the present invention is not limited to this arrangement but the alignment films have parallel rubbing directions (parallel with each other in the same direction) or different rubbing directions. Further, rubbing treatment may be performed to only one of the films.

Further, the present embodiment uses horizontal alignment films processed by rubbing as the alignment films 8 and 9, but the present invention is not limited to such films, but may use horizontal alignment films processed by light irradiation, for example, by polarization irradiation, or diagonal unpolarized irradiation. Further, vertical alignment films may be used instead of the horizontal alignment films. However, a horizontal alignment film has conventionally proven its adequacy to a liquid crystal element and also is advantageous in that the alignment film may be made of a material highly compatible with a liquid crystal material. Further, in contrast to a vertical alignment film, the horizontal alignment film gives strong alignment controlling force to the liquid crystal molecules in the substrate in-plane direction, thereby improving optical anisotropy upon field application.

Further, the photopolymerizable monomer (polymerizable compound) is not limited to the foregoing compound but may be other liquid crystal (meta) acrylates that comprise both the liquid crystal structure and a polymerization functional group. Note that, to attain middle tone display and low-voltage driving at the same time, a monofunctional liquid crystal (meta) acrylate, that comprises no methylene spacer between the liquid crystal structure and the polymerization functional group, is more preferable. More specifically, a preferable example may be a acrylic acid compound partially has a structure as liquid crystal with 2 or 3 six-membered rings, or a monofunctional (meta) acrylate (methacrylic acid ester).

In such a monofunctional (meta) acrylate, there is no flexible connecting groups, such as an alkylene group or an oxyalkylene group, between the acryloyl oxy group and the liquid crystal structure. Therefore, polymerization of this kind of monofunctional (meta) acrylate produces a polymer whose major chain is made up of inflexible liquid crystal structures that are directly joined without a connecting group. In this structure, thermal activity of the liquid crystal structure is restricted by the polymer chain, thus further ensuring alignment of the liquid crystal molecules that are influenced by the major chain.

Further, an epoxy acrylate may be used as the photopolymerizable monomer added to the medium sealed in the material layer 3. The epoxy acrylate may be bisphenol A epoxy acrylate, brominated bisphenol A epoxy acrylate, or phenol novolak epoxy acrylate. Each molecule of an epoxy acrylate comprise acrylic group that causes polymerization by light irradiation, a hydroxyl group and a carbonyl group causing polymerization by heating. Therefore, the epoxyacrylate may be cured by light irradiation and heating. In this case, it is likely that at least one of the functional groups is reacted and polymerized (cured). Therefore, the unreacted portion can be reduced, thereby carrying out sufficient polymerization.

Note that, in this case, it is not always necessary to carry out both light irradiation and heating, but the polymerization may be performed through only one of them. More specifically, formation of the polymer (alignment auxiliary material) used for the display element according to the present embodiment does not always have to be performed through polymerization of a photopolymerizable monomer by ultra violet (light) irradiation, but may be performed through any other appropriate polymerization methods according to the characteristic of the polymerizable compound. In other words, in the display element of the present embodiment, the polymerizable monomer added to the medium to form the polymer (alignment auxiliary material) is not limited to a photopolymerizable monomer causing polymerization by light irradiation, but may be other polymerization monomers causing polymerization by other method than light irradiation.

Further, in addition to the foregoing examples, the polymerization monomer sealed in the material layer 3 may be a mixture of an acrylate monomer (for example, EHA, TMHA, product of Aldrich Co. Ltd) and a diacrylate monomer (for example, RM257, product of Merck Co. Ltd).

Further, for any polymerizable compounds above, the addition amount is preferably in a range from 0.05 wt % to 15 wt %. When the concentration of the cured product is less than 0.05 wt %, the resulting alignment auxiliary material has insufficient alignment auxiliary function (small alignment controlling force); on the other hand, when the concentration of the cured product is more than 15 wt %, the ratio of the field applied to the alignment auxiliary film increases, thereby increasing driving voltage.

Further, the present embodiment forms the polymer chain (chain-type polymer) 11 as the polymer (alignment auxiliary material), but the auxiliary material is not limited to this kind, and any other materials may be used as long as it helps (promote) alignment of the molecules upon field application. For example, a reticular polymer (reticular polymer material), or a ring polymer (ring polymer material) may also be used as the alignment auxiliary material.

Furthermore, the material of the alignment auxiliary material is not limited to a polymerizable compound, but may be, for example, a porous inorganic material. In this case, a sol-gel material (porous inorganic material), such as barium titanate, is added in advance to the medium (e.g., dielectric liquid) that is to be sealed in the material layer 3. Otherwise, it is made as a porous inorganic layer using polystyrene fine particles (diameter=100 nm) and $SiO_2$ fine particles (diameter=5 nm). In this case, for example, a glass substrate with transparent electrode having a slit is dipped in an aqueous solution in which the polystyrene fine particles (diameter=100 nm) and the $SiO_2$ fine particles (diameter=5 nm) are mixed and dispersed, and then a several jams film is formed by a crystal pulling method using self-assembly characteristic of the mixture fine particles, followed by high-temperature sintering to gasify the polystyrene. As a result, porous inorganic layer of an inverse-opal structure with 100 nm holes is formed on the substrate. Then, the two of such a substrate are joined to create a cell, and a medium is injected to fill the holes to complete the cell. This structure having the porous inorganic material ensures the same effect as that having the alignment auxiliary material formed from the polymer chain 11 (polymerizable compound).

Further, a hydrogen bond network (hydrogen-bonded cluster, hydrogen-bonded structure material) may be used as the alignment auxiliary material on the material layer 3. The hydrogen bond network here refers to a cluster that is produced through not a chemical bond but a hydrogen bond.

Such a hydrogen bond network may be obtained, for example, by adding a gelatinizer (hydrogen-bonding material) to the medium sealed into the material layer 3.

A preferable example of the gelatinizer is one comprising an amide group. More preferable gelatinizer is one comprising at least two amide groups for each cell, an urea gelatinizer, or a ricin gelatinizer. The following structural formulas (7) and (8) denote suitable examples of the gelatinizers (gelatinizers A and B).

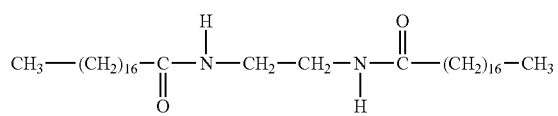

(7)

-continued

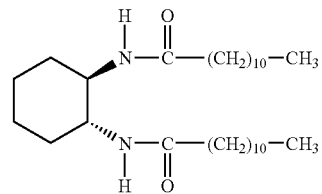

(8)

By adding a little amount of one of these gelatinizers, the dielectric material such as a liquid crystal material may be gelatinized.

Further, an example of the foregoing hydrogen bond network may be a gelatinizer (hydrogen-bonding material) described in Norihiro Mizoshita, Kenji Hanabusa, Takashi Kato "Fast and High-Contrast Electro-optical Switching of Liquid-Crystalline Physical Gels: Formation of Oriented Microphase-Separated Structures", Advanced Functional Materials, APRIL 2003, Vol.13, No.4, p.314, FIG. 2, that is obtained by mixing Lys 18 (see the structural formula (9) below) with the medium sealed in the material layer 3 in an amount of 0.15 mol %.

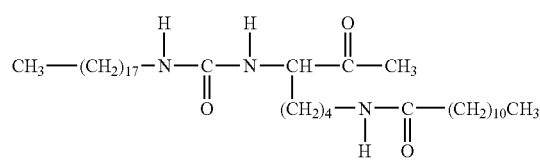

(9)

That is, the alignment auxiliary material may be a hydrogen bond network having a gel structure described in Norihiro Mizoshita, Kenji Hanabusa, Takashi Kato "Fast and High-Contrast Electro-optical Switching of Liquid-Crystalline Physical Gels: Formation of Oriented Microphase-Separated Structures", Advanced Functional Materials, APRIL 2003, Vol.13, No.4, p.314, FIG. 2, in which Lys 18 is mixed with the medium in an amount of 0.15 mol %. This structure using such a hydrogen bond network as the alignment auxiliary material ensures the same effect as in the structure using a polymerizable compound as the alignment auxiliary material. Further, the gelatinizers are free from various defects of a polymer network, such as extra UV irradiation process, degradation of material due to UV irradiation, decrease in reliability because of the unreacted groups etc.

Further, the alignment auxiliary material may be formed from fine particles. In a system in which fine particles are dispersed in the material layer 3, the dielectric materials, such as liquid crystal molecules, are aligned under influence of the boundaries of the fine particles. Accordingly, in the system with the dispersed fine particles, the dispersion ensures stable alignment condition of the dielectric materials.

In this case, the dielectric materials and the fine particles are sealed in the material layer 3. The dielectric materials and the fine particles each may be made of a single or plural substance. Further, it is preferable that the fine particles are dispersed in the dielectric materials so that a material layer comprising dispersed fine particles is created.

Further, in this case, the average diameter of the fine particles is equal to or less than 0.2 μm. With these fine particles whose average diameter is not more than 0.2 μm, stable particle dispersion is ensured in the material layer 3, thereby preventing aggregation of the fine particles or separation of the phase even after a long time. Therefore, it securely avoids possible defects from the fine particles, such as partial uneven concentration due to precipitation of particles, that may result in unevenness in display.

Moreover, it is preferable that particle-particle distance between the fine particles be 200 nm or less, and it is preferable that particle-particle distance between the particulates be 190 nm or less.

When light is radiated on fine particles three-dimensionally dispersed, diffraction light occurs at a certain wavelength. The optical isotropy is improved by preventing the occurrence of the diffraction light. As a result, the display element attains better contrast.

The diffraction light caused by the fine particles three-dimensionally dispersed depends on an angle at which the light hits the fine particles. However, the wavelength λ at which the diffraction is caused is substantially such that λ=2d, where d is the particle-particle distance between the fine particles.

The diffraction light of wavelength 400 nm or less is almost unrecognizable for human eyes. Thus, it is preferable that λ≦400 nm. The particle-particle distance d of 200 nm or less allows to attain that λ≦400 nm.

Further, according to the CIE (Commission Internationale de l' Eclairage), it is determined that the wavelength unrecognizable for human eyes is 380 nm or less. Therefore, it is further preferable that λ≦380 nm. The particle-particle distance d of 190 nm or less allows to attain that λ≦380 nm.

Moreover, if the particle-particle distance was too long, the particle-particle interaction would not work sufficiently, and thus it would become difficult for the phase (micelle phase, sponge phase, cubic phase, reverse micelle phase) to occur. For this reason again, it is preferable that particle-particle distance be 200 nm or less, and it is further preferable that particle-particle distance be 190 nm or less.

Moreover, it is preferable that the concentration (particulate content) of the particulates in the material layer 3 be in a range between 0.05 wt % and 20 wt % with respect to a total weight of the medium sealed between the substrates so as to form the material layer 3. By arranging such that the particle content is in the range between 0.05 wt % and 20 wt % in the material layer 3, it is possible to prevent the agglomeration of the particulates.

Note that, the particulates t be added in the material layer 3 is not particularly limited and may be transparent or may not be transparent. Moreover, the particulates may be organic particulates such as a polymer, or may be inorganic particulates or metallic particulates.

As the organic particulates, for example, fine particles in polymer beads form are preferable, such as polystyrene beads, polymethylmethacrylate beads, polyhydroxyacrylate, divinylbenzene beads. Moreover, the particulates may be cross-linked or may not be cross-linked. As the inorganic particulates, for example, particulates such as glass beads, silica beads or the like are preferable.

As the metallic particulates, alkali metal, alkali earth metal, transition metal, rare earth metal are preferable. For example, particulates made of titania, alumina, palladium, silver, gold, copper, or an oxide of these metals can be preferably used as the metallic particulates. These metallic particulates may be made of sole metal or may be made of an alloy of two or more of them or a complex of two or more of them. For example, particulates prepared by covering silver particulates with a metal such a titania, palladium, or the like may be used. The silver particulates themselves would possibly cause characteristics of the display element by oxidation of silver. By covering the surfaces of the silver particulates with a metal such as palladium, it is possible to prevent the oxidation of silver. Moreover, the metallic particulates in the beads form may be used as such, or may be used after subjected to heat treatment or adding an organic material to the surfaces of the beads. The organic material to be added is preferably liquid crystalline. For example, a compound represented by the following structural Formula (10) is preferable. By applying an organic material exhibiting liquid crystal property on the beads surface, the molecules on the periphery of the medium (dielectric material) are more easily aligned. That is, it has superior function as the alignment auxiliary material (alignment controlling ability increases).

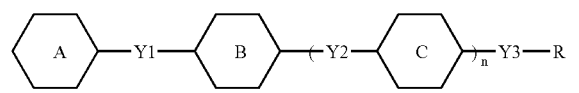

(10)

where n is an integer in a range of 0 to 2, and a six-membered ring A is preferably any one of the following functional groups:

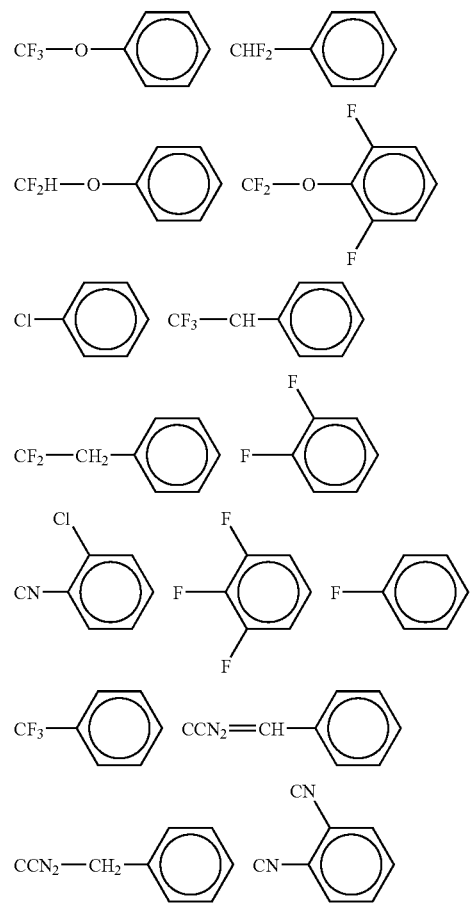

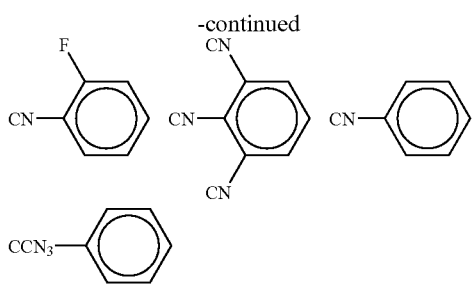

Six-membered rings B and C may be, but not limited to, substituents having a six-membered ring structure such as 1,4-phenylene group or 1,4-trans-cyclohexyl group (trans-1,4-cyclohexylene group), and the like, provided that the six-membered rings B and C have any one of the following substituents:

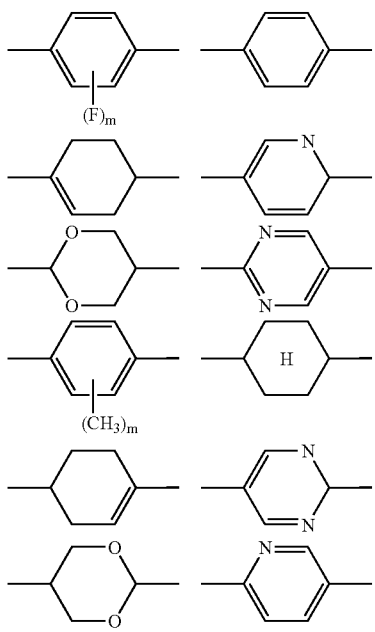

Note that, in the substituents, m is an integer in a range of from 1 to 4. The six-membered rings B and C may be identical the same substituent, or respectively different substituents.

Moreover, in the structural Formula (10), Y1, Y2, and Y3 are independently an alkyl group or an alkenyl group, which is straight chained or branched and has ten carbon atoms or less. One $CH_2$ or non-adjacent two $CH_2$ in the group may be independently substituted with —O—, —S—, —CO—O— and/or —O—CO—, a single bond, —$CH_2CH_2$—, —$CH_2O$—, —$OCH_2$—, —OCO—, COO—, —CH=CH—, —C≡C—, —CF=CF—, —$(CH_2)_4$—, —$CH_2CH_2CH_2O$—, —$OCH_2CH_2CH_2$—, —CH=$CHCH_2CH_2O$—, or —$CH_2CH_2$CH=CH—. Moreover, Y1, Y2, and Y3 may comprise a chiral carbon or not. Moreover, Y1, Y2, Y3 may be identical with each other or different from each other, as long as they have any one of the above structures. Further, two of Y1, Y2, Y3 may be identical with each other, while the last of them is different from the two.

Moreover, in the structural Formula (10), R is any one of a hydrogen atom, a halogen atom, a cyano group, an alkyl group of a carbon number of 1 to 20, an alkenyl group of a carbon number of 1 to 20, or alkoxyl group of a carbon number of 1 to 20.

Moreover, it is preferable that the organic material to be added on the surfaces of the metallic particulates be not less than 1 mole but not more than 50 moles with respect to 1 mole of the metal.

For example, the metallic particulates to which the organic material is added may be prepared by mixing the organic material in a solvent in which metal ions are solved or dispersed, and then reducing the metal ions. The solvent may be water, an alcohol, an ether, or the like.

Further, the particulates to be dispersed may be in a form of fullerene, and/or in a carbon nano tube. The fullerene should be such that carbon atoms are arranged in a spherical shell configuration therein. For example, a preferable fullerene is such that has a stable structure having a carbon number n of 24 to 96. An example of such fullerene is, for example, a spherical closed-shell carbon molecular structure of C60 (comprising 60 carbon atoms). Moreover, as the carbon nano tube, for example, a tube-like shaped nano tube is preferable, in which carbon atoms are arranged a graphite-like plane cured into the tube like shape of thickness of several atoms.

Moreover, the shape of the particulates is not particularly limited. For example, the shape may be a spherical shape, ellipsoidal shape, agglomeration-like shape, column-like shape, cone-like shape, any of these shapes with protrusion, or any of these shapes with a hole. Moreover, the particulates re not particularly limited in terms of their surface state. For example, the particulates may have a flat surface or a non-flat surface, or may have a hole or a groove.

Moreover, the particulate content is preferably in a range of 0.05 wt % to 20 wt % with respect to a sum of the weight of the particulates and the dielectric material. If the particulate content is less than 0.05 wt %, the ratio of the particulates is too small to cause the particulates to attain sufficient effect as the alignment auxiliary material. If the particulate content exceeds 20 wt %, the ratio of the particulates is too large to prevent the particulates from agglomeration. The agglomeration of the particulates dose not only prevent the particulates from attaining the sufficient effect as the alignment auxiliary material, but also light scattering.

Moreover, even though the medium comprises the polymerization initiator in the present embodiment, the present invention may be arranged such that the polymerization initiator is not added even if the alignment auxiliary material is formed form a polymerizable compound. However, in order to polymerize the polymerizable compound, it is preferable that the medium comprise the polymerization initiator. The presence of the polymerization initiator speeds up the polymerization.

Moreover, even though in the present embodiment the polymerization initiator is methylethylketone peroxide, the present invention is not limited to this. In lieu of methylethylketone peroxide, the polymerization initiator may be, for example, benzoyl peroxide, cumene hydroid peroxide, tertially butyl per oxtoate, dicumyl peroxide, benzoyl alkyl ether-based polymerization initiator, an acetophenone-based polymerization initiator, benzophenones, xanthone-based polymerization initiator, benzoinether-based polymerization initiator, benzylketol-based polymerization initiator, and the like. Moreover, among commercially available products, for example, darocure 1173 darocure 1116 made of Merck Co. Ltd., irugacure 184, 369, 651, 907, made by chibachemical, cayacure DETX, EPA, and ITA made by NIPPON KAYAKU Co. Ltd, DMPAP made by Aldorich (all product names exemplified here are registered as trademarks) may be used solely or in appropriate combination.

Moreover, an amount of the polymerization initiator to add is preferably 10 wt % or less with respect to the polymerizable compound. If the amount of the polymerization initiator to add is more than 10 wt %, excess polymerization initiator works as impurity and causes reduction in specific resistance of the display element.

Moreover, the display element according to the present embodiment may be expressed as a display element basically arranged such that (i) the field is applied along the normal direction of the surfaces of the substrates (vertical field application), (ii) the medium for the material layer 3 is a negative type liquid crystal (use of negative type liquid crystal), (iii) rubbing directions of the alignment films respectively provided on the substrates are parallel to each other (parallel rubbing), and (iv) the material layer 3 comprises an alignment auxiliary material for promoting orientation of the molecules (polymer structural support).

Moreover, by applying the present invention to a display device in which the Kerr effect is utilized, it is possible to realize a display device which attains high-speed responding property by utilizing the Kerr effect. Moreover, in this arrangement, the display device can be driven with a significantly low driving voltage. Thus, this arrangement is significantly valuable practically. Moreover, the object of the present invention may be expressed as providing a display element whose display operation is carried out by utilizing the Kerr effect and whose driving voltage is reduced to a practical level.

Moreover, by arranging the display device to include the present display element, it is possible to attain a display device that is operable with a driving voltage (strength of external field) of a practical level and that has a high-speed responding property and wide viewing angle properties.

Moreover, the present invention is not limited to the manufacturing method mentioned above in which the electrodes 4 and 5 and the alignment films 8 and 9 are formed respectively on the facing surfaces of the substrates 1 and 2, the polarizers 6 and 7 are stuck on those surfaces of the substrates 1 and 2, which are opposite to the surfaces of the electrodes 4 and 5 are provided, and then the medium is sealed between the substrates, the medium comprising the photo polymerizable monomer and the polymerizable initiator, and the polymerizable monomer is polymerized by ultraviolet radiation, even though the present embodiment is arranged as such.

For example, the present invention may be arranged such that a color filter is stuck on the substrate 2 and a TFT (Thin Film Transistor) is formed on the substrate 1, and then the ultraviolet radiation is carried out. In this case, however, efficient photo polymerization cannot be carried out if the light exposure (ultraviolet radiation) is carried out from above the panel (from above the substrate 2 on which the color filter is attached), because the color filter absorbs a significant amount of the ultraviolet light. Therefore, it is necessary to use ultraviolet light much stronger in this arrangement than in the arrangement in which the ultraviolet light is not passed through the color filter. This is a significant problem. Moreover, the color filter has red, green, and blue regions for the pixels. The red, green, and blue regions are largely different in terms of transmittance. Thus, the photo polymerization carried out by passing the ultraviolet light through the color filter causes unevenness among pixels.

In view of this, this arrangement may be arranged such that the light exposure is carried out by radiation the light from behind the panel (form above the substrate 1 on which the TFT is formed). In this case, however, the light is partially shielded by the signal lines, scanning lines, TFT, and the like. These sections are difficult to make from a transparent electrode (transparent material). Because a transparent electrode such as ITO has a higher resistance than a metal such as aluminum, copper, tantalum, and the like, the transparent electrode is not suitable as the material for the signal lines and the scanning lines. Especially, in case of the display element for the large-size and large-screen display device such as liquid crystal television, the display device are provided of a large amount of signal lines and the scanning lines and it is not appropriate to arrange such that these lines are transparent. Therefore, in the arrangement in which the light is radiated from behind the panel, the light is partially shield in the region where the signal lines, scanning lines, TFT, and the like are located. Thus, the photo polymerization cannot be carried out for these regions. For this reason, it is necessary to cover edges of the signal lines, scanning line and the TFT with a light-shielding film. This results in lower aperture ratio. Further, the presence of the unreacted photo polymerizable monomer and unreacted polymerization initiator would possibly cause reliability deterioration such as holding voltage ratio reduction and the like. Thus, it is not preferable that the display element has portion in which the unreacted photo polymerizable monomer and unreacted polymerization initiator remain.

In order to solve these problems, it may be arranged such that the color filter and the light shielding film are provided on the TFT substrate (the substrate 1 on which the TFT is formed), and the light is radiated from above the other substrate (substrate 2). In this arrangement, it is unnecessary to radiate through the TFT (switching element), color filter, and light shielding film. Thus, it is possible to radiate the light over wider area of the material layer 3. Because the light shielding portion is eliminated, it is possible to radiate the light all over the surface of the material layer 3. Therefore, it is not necessary to cover the edges. This improves the aperture ratio. Further, the unreacted photo polymerizable monomer and unreacted polymerization initiator will not remain. This prevents the reliability from being deteriorated.

Moreover, in this arrangement, it is preferable that the other substrate (the substrate 2 on which the conventional arrangement provides the color filter) and the electrode 5 formed on the other substrate be made of a transparent material(s). With this arrangement, the photo polymerization can be carried out with the ultraviolet light of a smaller radiation amount.

Second Embodiment

The following explains another embodiment of the present invention with reference to Figures. For ease of explanation, materials having the equivalent functions as those shown in the drawings pertaining to the foregoing First Embodiment will be given the same reference symbols, and explanation thereof will be omitted here.

The present embodiment also uses the display element described in First Embodiment, which however includes the alignment films 8 and 9 that differ from each other in rubbing directions. More specifically, the display element of the present embodiment has the same structure as that of the display element of First Embodiment except for the alignment films 8 and 9 that differ from each other in rubbing directions. Note that, as to the medium to be sealed in the material layer 3, the display element of the present embodiment uses the medium with negative dielectric anisotropy, that is one of the mediums described in First Embodiment. Further, the display element of the present embodiment is provided in the display device 100, as a replacement of the display element according to First Embodiment.

Figure 12:
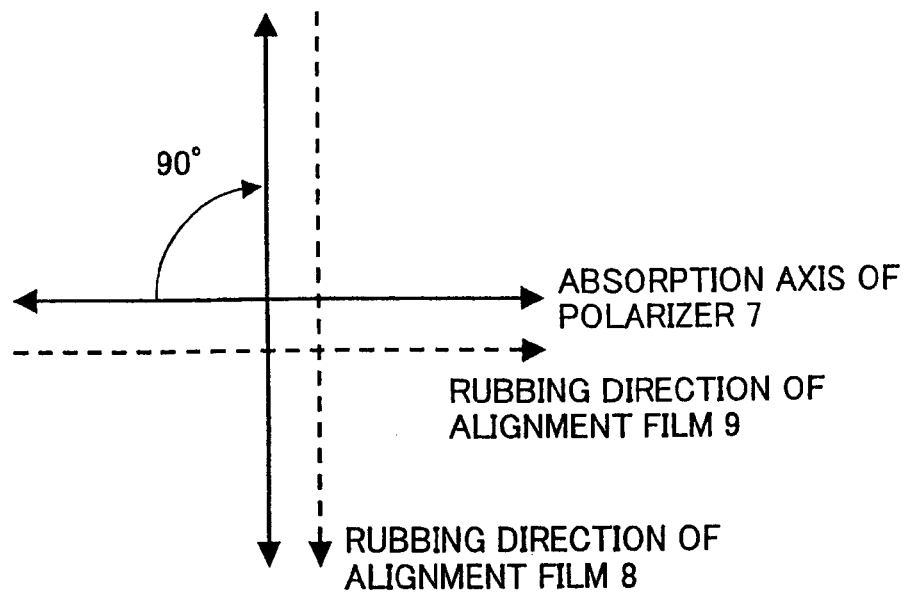
FIG. 12 is an explanatory view showing rubbing directions of alignment films and a direction of an absorption axis of a polarizer, according to a display element according to another embodiment of the present invention.

FIG. 12 is an explanatory view showing the directions of the alignment films 8 and 9 and the directions of the absorption axes of the polarizers 6 and 7 in the display element of the present embodiment. As shown in the figure, the rubbing directions of alignment films 8 and 9 are orthogonal to each other. Also, the rubbing direction of the alignment film 8 on the substrate 1 is in parallel with the direction of the absorption axis of the polarizer 6. Further, the rubbing direction of the alignment film 9 on the substrate 2 is in parallel with the direction of the absorption axis of the polarizer 7. The direction of the absorption axis of the polarizers 6 and the direction of the absorption axis of the polarizers 7 are orthogonal to each other.

However, the rubbing directions of the alignment films are not limited to this structure. For example, the display element may be arranged so that the rubbing direction of the alignment film 8 is orthogonal to the direction of the absorption axis of the polarizer 6, and he rubbing direction of the alignment film 9 is orthogonal to the direction of the absorption axis of the polarizer 7. Further, the rubbing directions of the alignment films 8 and 9 do not necessarily have to be orthogonal, as long as they are rubbed in different directions.

Further, the manufacturing method of the display element of the present embodiment is the same as the manufacturing method described in First Embodiment except that the rubbing directions of alignment films 8 and 9 are orthogonal to each other.

As described, when the alignment films 8 and 9, respectively provided in the substrates 1 and 2, are rubbed in different directions, and when the medium sealed in the material layer 3 is kept at a temperature at which the liquid crystal layer exhibits a liquid crystal phase, the alignment of the molecules in the material layer 3 have a twisted structure. More specifically, the molecules are aligned so that their major axis are aligned in a direction parallel to the substrate surface and the molecules are sequentially twisted from the side of one substrate to the side of another, when a field (external field) is applied.

Further, when the photopolymerizable monomer is polymerized (metalized) in such a twisted structure, the resulting polymer chain 11 will have more molecules aligned in the alignment direction of the molecules, than the molecules aligned in other directions. That is, the polymer chain 11 has a such structural anisotropy that more molecules are aligned with the major axes oriented to the alignment direction of the molecules, than the molecules with the major axes aligned in other directions.

As in First Embodiment, the display element thus prepared is kept at a temperature for exhibiting an isotropic phase by using an external heating device, which temperature is near above a liquid crystal phase-isotropic phase transition temperature, so that the element can be changed in transmittance when a field is applied between the electrodes 4 and 5. In this case, the alignment is promoted by the polymer chain 11 created in the twisted structure and therefore more molecules are aligned in the alignment direction of the twisted structure, than the molecules aligned in other directions. Accordingly, in the display element of the present embodiment, the molecules are aligned in the twisted structure in response to field application.

Therefore, as with the display element of First Embodiment, a maximum transmittance of the display element of the present embodiment can be obtained by low voltage application.

The display element according to First Embodiment has a homogenous structure in which the molecules are aligned in one direction. In this case, coloring may occur by the wavelength dispersion of the medium (e.g., dielectric liquid). On the other hand, as described, the molecules of the display element of the present embodiment are aligned in the twisted structure, thereby relieving the coloring phenomenon due to wavelength dispersion.

Note that, the twisted structure has a rightward twist or a leftward twist, forming a multi domain. Therefore, transmittance may decrease at the border of the domain.

In view of this problem, a chiral agent may be added to the medium sealed in the material layer 3. With the addition of the chiral agent, the twisted structure will have either of the rightward twist or a leftward twist, thereby improving transmittance.

Further, the medium (e.g., dielectric liquid) sealed in the material layer 3 may be a medium having chirality itself (chiral material). In this case, any structure among: (i) only the alignment auxiliary material (e.g., polymer, or hydrogen-bonding material) is chiral (chiral material), (ii) other portion than the alignment auxiliary material (e.g., polymer, or hydrogen-bonding material) is chiral, and (iii) the alignment auxiliary material (e.g., polymer, or hydrogen-bonding material) and the other portion are both chiral. The following compound (5) is one of examples of the material having a chiral polymer (the structure (i) above).

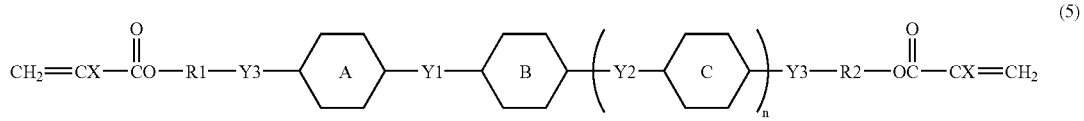

(5)

Since the chiral photopolymerizable monomer has chirality itself, it automatically forms a twisted structure. Therefore, by fixing the chiral structure by photopolymerization, it is possible to form an alignment auxiliary material with either a rightward twist or a leftward twist.

Further, the medium may be a banana-shaped (curved) liquid crystal material, which does not comprise an asymmetrical carbon atom (the molecules are not chiral), but becomes a chiral system due to the anisotropy from the molecule shape and the packing structure. The banana-shaped (curved) liquid crystal may be P8PIMB (see the structural formula (11) below), for example.

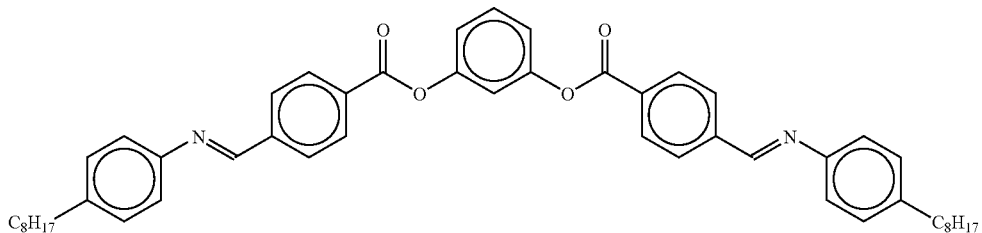

(11)

Further, the banana-shaped (curved) liquid crystal material is not limited to P8PIMB, but may be one in which the curving portion in the chemical structural formula is a benzene ring such as phenylene group or the like; otherwise, it may be one coupled by a naphthalene ring, a methylene chain or the like. The compounds denoted by the structural formulas (12) through (15) below are examples of the banana-shaped (curved) liquid crystal.

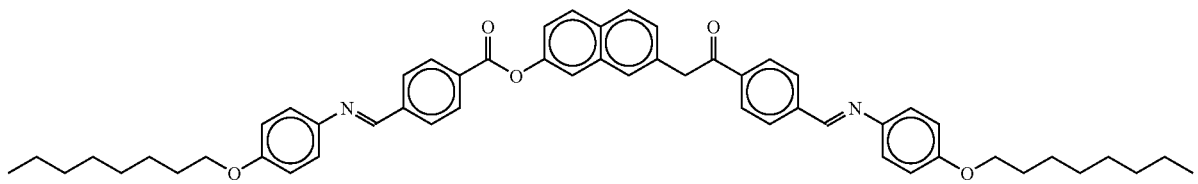

(12)

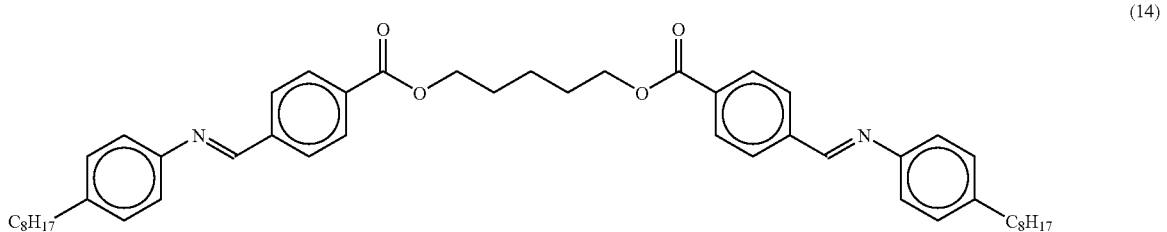

(13)

(14)

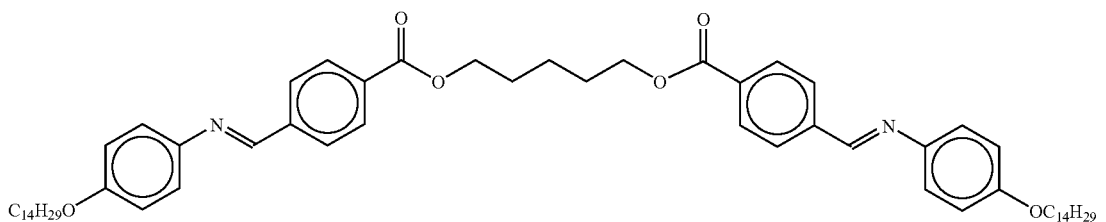

(15)

Further, the banana-shaped (curved) liquid crystal material may comprise an azo group. The compound denoted by the structural formula (16) below is an example of the banana-shaped (curved) liquid crystal.

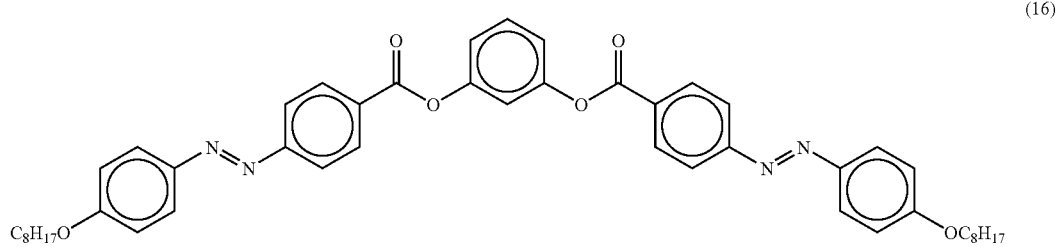

(16)

Further, the foregoing banana-shaped (curved) liquid crystal material has a horizontally symmetrical chemical structure in the bonding portion, but may instead have a horizontally asymmetrical chemical structure in the bonding (curving) portion. The compound denoted by the structural formula (17) below is an example of the banana-shaped (curved) liquid crystal.

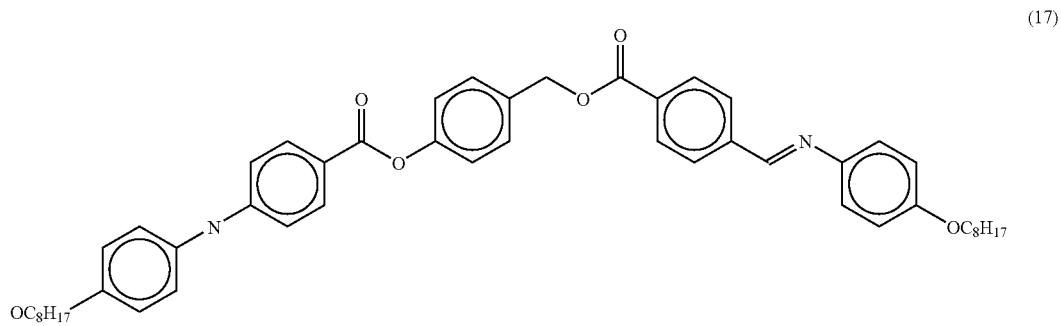

(17)

Further, though the foregoing banana-shaped (curved) liquid crystal molecules do not comprise a chiral carbon, it may comprise one or more chiral carbon(s). The compound denoted by the structural formula (18) below is an example of the banana-shaped (curved) liquid crystal.

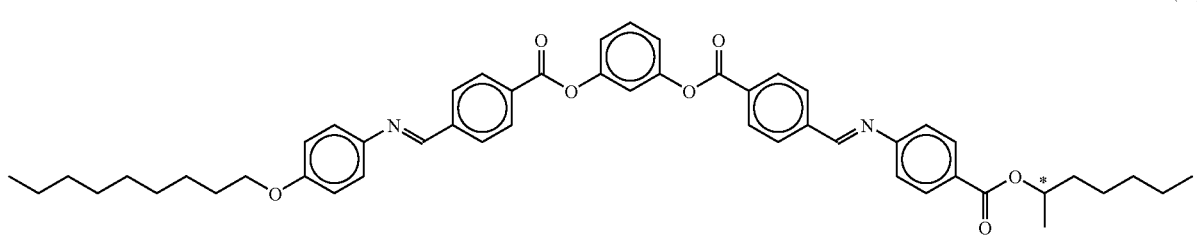

(18)

Further, this structure using the banana-shaped (curved) liquid crystal material inducing one of the rightward twisted structure or the leftward twisted structure, thereby improving transmittance.

In such a display element according to the present embodiment having a twisted structure with either a rightward twist or a leftward twist, that is, having only one chiral configuration (R configuration or S configuration), the display element has a certain optical activity even when the twisted structures have different alignment directions without orientational correlativity between themselves. Because of this, the material layer has a large optical activity as a whole. Thus, the voltage to obtain the maximum transmittance in the display element is lowered to the practical level. Moreover, the material layer 3 includes an alignment auxiliary material for promoting the expression of optical anisotropy in response to field application, which supports the alignment of molecules in the medium, thereby more efficiently expressing the optical anisotropy.

Note that, the display element of the present embodiment may be expressed as a display element that at least has the following three arrangements: (i) the field is applied along the normal direction of the surfaces of the substrates (vertical field application), (ii) the medium sealed in the material layer 3 is a negative type liquid crystal (use of negative type liquid crystal), and (iii) a chiral agent is added to the medium sealed in the material layer 3 so that the twisted structure of the molecule alignment has either the rightward twist or the leftward twist (polymer fixing (+chiral)).

Further, by forming a display device using the display element of the present embodiment, it is possible to realize a display device, that has the following advantages: it is drivable by a practical level voltage (external field), it has high-speed response and wide viewing angle, and the coloring phenomenon is reduced.

Further, as with the display element of First Embodiment, the display element according to the present embodiment may be provided with a color filter and a light-blocking film on the TFT substrate (the substrate 1 on which the TFT is formed), as well as the transparent counter substrate (the substrate 2 on which the color filter is formed in the conventional structure) allowing exposure therefrom.

Third Embodiment

The following explains still another embodiment of the present invention with reference to Figures. For ease of explanation, materials having the equivalent functions as those shown in the drawings pertaining to the foregoing First Embodiment will be given the same reference symbols, and explanation thereof will be omitted here.

Figure 13:
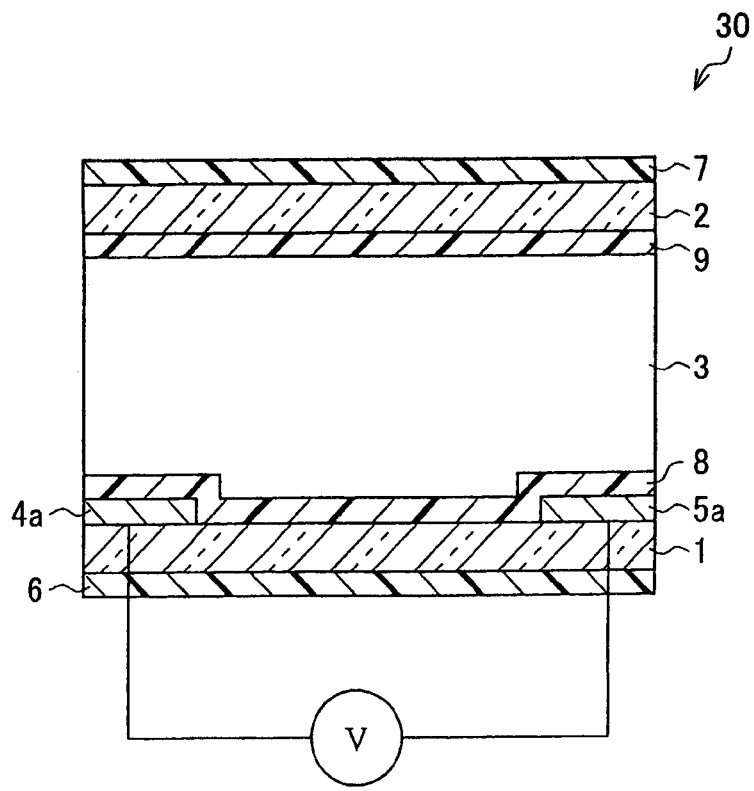
FIG. 13 is a cross sectional view schematically illustrating an arrangement of a display element according to another embodiment of the present invention.

FIG. 13 is a cross-sectional view illustrating a schematic structure of a display element (display element 30) according to the present embodiment. For example, the display element 30 is provided in the display device 100 as a replacement of the display element of First Embodiment. As shown in the figure, the display element 30 includes a material layer (optical modulation layer) 3 between the two opposed substrates (substrate 1 and substrate 2). Further, on one surface of the substrate 1, the surface opposite to the substrate 2, pectination electrodes (pectination-shaped electrodes) 4a and 5a, that function as field applying means for applying a field to the material layer 3, are formed. These electrodes are oppositely provided to apply an electric filed in the substrate in-plane direction (direction in parallel with the substrate surface). Further, on the respective inner surfaces of the substrate 1 and the substrate 2, the alignment films 8 and 9 are respectively provided. Note that, the alignment film 8 on the substrate 1 is covering the electrodes 4a and 5a. Further, polarizers 6 and 7 are provided on the other surfaces of the substrates 1 and 2 (the surfaces opposite to the inner surfaces).

The substrate 1 and 2 are each formed from a glass substrate, but this is not always required as long as at least one of them is a transparent substrate. Further, the gap between the substrates is 10 µm in the foregoing example, but it may be set arbitrarily.

The electrodes 4a and 5b are oppositely provided in that surface of the substrate 1, which is opposite to the substrate 2. Note that, in the foregoing example, the electrodes 4a and 5a are each formed from an ITO (Indium Tin Oxide), but they may be formed from any materials conventionally used.

Figure 14:
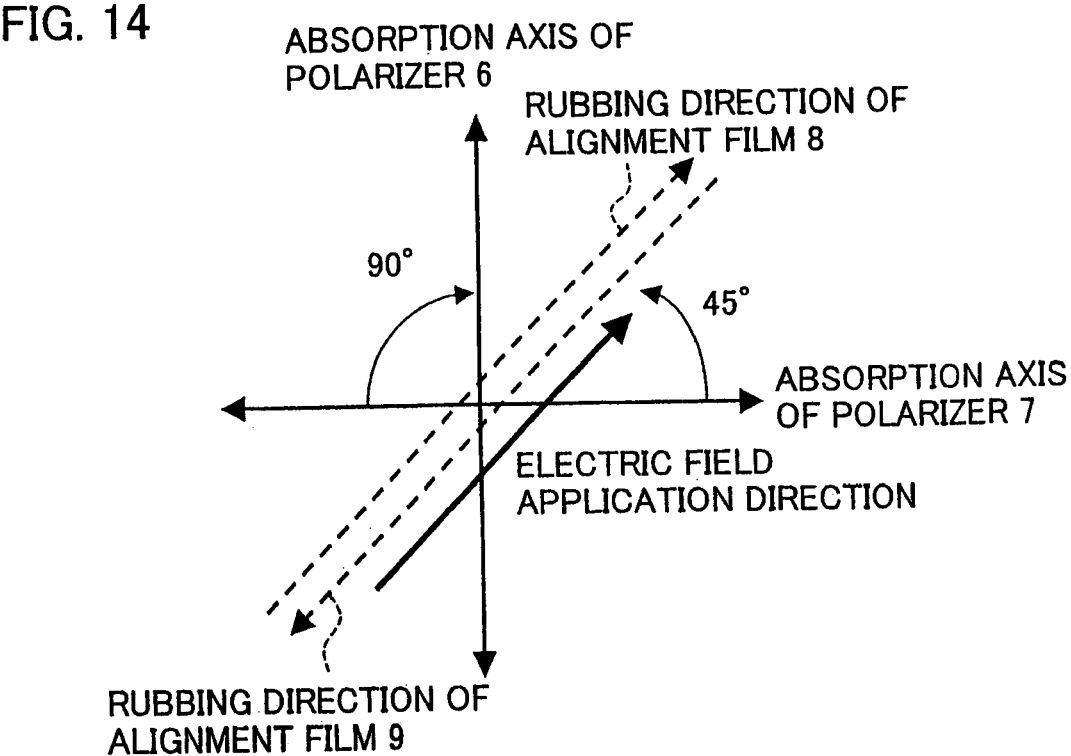
FIG. 14 is an explanatory view showing rubbing directions of alignment films and a direction of an absorption axis of a polarizer, and direction of field application according to a display element according to still another embodiment of the present invention.

FIG. 14 is an explanatory view illustrating the absorption directions of the polarizers 6 and 7, the rubbing direction of the alignment films 8 and 9, and the direction of field application. As shown in the figure, in the display element 30, the directions of the absorption axes of the polarizers 6 and 7 are orthogonal to each other. Further, the alignment films 8 and 9 have been rubbed in antiparallel directions with each other, and also respectively make 45° angles with the absorption axes of the polarizers 6 and 7. Furthermore, the field application by the electrodes 4a and 5a is performed in a direction in parallel with the rubbing directions of the alignment films 8 and 9, creating 45° angles with the absorption axes of the polarizers 6 and 7. Note that, the alignment films 8 and 9 may be formed from the same material as those used in the First Embodiment.

In the material layer 3, a positive type liquid crystal compound (medium), that is denoted by the following structural formula (19), is sealed. Note that, the positive type liquid crystal compound exhibits a Nematic phase at a temperature less than 33.3° C.

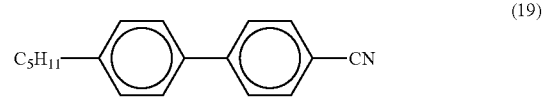

(19)

Further, as with the material layer 3 of First Embodiment, an alignment auxiliary material (not shown) made of a polymer chain is formed. Further, a methylethylketoneperoxide is added to the positive type liquid crystal compound sealed in the material layer 3 as an initiator (polymerization initiator; not shown) for rapid polymerization.

The following explains a manufacturing method of the display element 30. First, the electrodes 4a and 5a are formed on the surface of the substrate 1, using a conventional available manufacturing method of a liquid crystal display element.

Next, the alignment film 8 is formed over the electrodes 4a and 5a on the substrate 1, and the alignment film 9 is formed on the substrate 2. The alignment films 8 and 9 have been rubbed in advance in directions antiparallel to each other.

Further, the polarizers 6 and 7 are bonded on the other sides of the substrates 1 and 2, i.e., the sides opposite to their inner surfaces. Here, as shown in FIG. 14, the polarizers 6 and 7 are bonded so that their absorption axes are orthogonal to each other, respectively creating 45° angles with the rubbing directions of the alignment films 8 and 9.

Next, the substrates 1 and 2 are bonded, while providing a 5 µm gap (thickness of the material layer 3) therebetween by interpolating a spacer (not shown) formed from plastic beads or the like. A sealing material (not shown) is applied and fixed around the edges of the joined substrates, thereby sealing off the edges. In applying the sealing material, a portion that will be an inlet (not shown) for injecting the medium (e.g., dielectric liquid) is not sealed off but kept open. Note that, materials of the spacer and the sealing material are not limited but may be any materials conventionally used for the liquid crystal display element.

Next, the mixture of the liquid crystal (meta) acrylate (photopolymerizable monomer) and the methylethylketoneperoxide (polymerization initiator) are injected to the medium made of the foregoing positive type liquid crystal compound. Here, the amount of photopolymerizable monomer is in a range of 0.05 wt % (weight %) to 15 wt %. Further, the amount of polymerization initiator is not more than 10 wt %.

Next, the temperature of the two substrates is kept at 25° C. by an external heating device (not shown), and the cell (display element 30) is subjected to ultra violet irradiation so as to cause polymerization of the photopolymerizable monomer injected in the material layer 3, thus forming a polymer chain (not shown). Note that, the positive type liquid crystal mixture exhibits a Nematic phase at a temperature less than 33.3° C., and exhibits isotropy at a higher temperature. More specifically, the photopolymerizable monomer is polymerized to form a polymer chain in the medium exhibiting a liquid crystal phase in the material layer 3.

As described, when the medium sealed in the material layer is exhibiting a liquid crystal phase, the molecules in the medium are under influence of the alignment films 8 and 9 and thus aligned in the rubbing direction of these films. Therefore, by carrying out polymerization of the photopolymerizable monomer under such a condition, the resulting polymer chain will have more molecules aligned in the alignment direction of the molecules, than the molecules aligned in other directions. That is, the polymer chain has such a structural anisotropy that more molecules are aligned in the alignment direction of the molecules, that have been aligned by the rubbing treatment, than the molecules aligned in other directions.

The display element 30 thus prepared is kept at a temperature near above a Nematic phase-isotropic phase transition by using an external heating device, so as to allow a change in transmittance by field application. More specifically, the medium sealed in the material layer 3 was caused to be isotropic by being kept at the temperature slightly above the liquid crystal phase-isotropic phase transition point thereof, and the transmittance is changed by being supplied with a field between the electrodes 4 and 5. A maximum transmittance of the display element 30 was obtained when a voltage of 60V was applied.

Meanwhile, for comparison with the display element 30, a comparison cell was prepared by the same manufacturing method of the foregoing display element 30 except that the photopolymerizable monomer and the initiator were not added and the ultraviolet irradiation was not performed. Further, as with the foregoing display element 30, this comparison display element was kept at a temperature near above a Nematic phase-isotropic phase transition temperature and then was supplied with a field between the electrodes 4 and 5. For this comparison display element, a maximum transmittance was obtained when a voltage of 90V was applied.

This maximum transmittance of the display element 30 of the present embodiment, that was obtained by a lower voltage than that for the comparison display element, is achieved by the same mechanism as that of First Embodiment. That is, in the comparison display element, the molecule alignment is controlled only by the alignment treatment on the substrate surface, and therefore only the molecules in the vicinity of the substrates are aligned by a low voltage. On the other hand, the display element 30 of the present embodiment uses, in addition to the rubbing treatment on the substrate boundary, the alignment of the molecules of the whole cell is promoted by the polymer chain. More specifically, the alignment promotion effect induced by interaction of the polymer chain and the molecules affects the whole cell. On this account, the display element 30 achieves a maximum transmittance by a lower voltage than that for obtaining a maximum transmittance of the comparison display element.

Note that, the manufacturing method of the display element 30 is not limited to the foregoing manufacturing method in which, first, the electrodes 4a and 5a, and the alignment film 8 are formed on the substrate 1, then the alignment film 9 is formed on the substrate 2, and then the polarizers 6 and 7 are bonded respectively on the other sides of the substrates 1 and 2, that are the sides opposite to the sides on which the alignment films 8 and 9 are formed, followed by injection of the medium mixed with the photopolymerizable monomer and the polymerization initiator, that is then subjected to ultra violet irradiation to polymerize the photopolymerizable monomer.

For example, alternately, the ultra violet irradiation may be performed on the cell made up of the substrate 1, that is provided with a TFT, and the substrate 2, that is provided with a color filter. However, in this case, the exposure (ultra violet irradiation) from the front surface of the panel (on the side of the substrate 2 on which the color filter is provided) may result in inefficient photopolymerization since the color filter absorbs a large amount of the ultraviolet light. Therefore, the ultra violet irradiation needs to be carried out with lot stronger light than that in the case without a color filter, which will be a serious drawback. Further, the color filter has a red region, a blue region, and a green region corresponding to the pixels, and each of the regions greatly differs in transmittance to the ultraviolet light. The photopolymerization by ultraviolet irradiation through the color filter will thus result in great unevenness among the pixels. For this reason, the exposure from the front surface of the panel is inadequate.

In view of this problem, the exposure may be performed from the rear surface (from the side of the substrate 1 on which the TFT is formed). However, in the exposure from the rear surface of the panel, the ultraviolet light is blocked by the electrodes 4a and 5a, these electrodes thus cannot be exposed to the light. Therefore, the photosensitive monomers on the electrodes 4a and 5a cannot be polymerized. Further, the regions excluded from the polymerization cannot stabilize a cholesteric blue phase, and therefore the cholesteric blue phase is expressed at a small temperature range. As a result, in the medium, the region subjected to light irradiation with no color filter exhibits the cholesteric blue phase in a wide temperature range, but the portion on the electrodes 4a and 5a exhibits other liquid crystal phase, such as a cholesteric phase. Further, the alignment of molecules at the border of the cholesteric blue phase and the cholesteric phase becomes inadequate, thereby causing light leakage. More specifically, the resulting display element will have molecules whose alignment state differs in respective regions. Accordingly, in such a display element, when the region of the cholesteric blue phase is used as the display element, not only the portion on the electrodes 4a and 5a but also the periphery thereof needs to be blocked by a light-shading film, thus decreasing the aperture ratio.

In view of this problem, the electrodes 4a and 5a may be formed from transparent electrodes. More specifically, by forming the electrodes 4a and 5a from transparent electrodes of an ITO (Indium Tin Oxide) or the like, ultra violet light may be incident on the portion on these electrodes.

However, when the exposure (irradiation) is performed from the rear surface of the panel, the signal lines, the scanning lines, the TFT (thin film transistor) etc. may also be light-shading portion as well as the electrodes 4a and 5a. However, it is difficult to form these components from transparent electrodes like the electrodes 4a and 5a, because the transparent electrode of ITO or the like is higher in resistance than a metal such as aluminum, copper, tantalum etc., and therefore not suitable for the signal lines or the scanning lines. Particularly, in the case of display elements for a large-sized display, such as a liquid crystal TV, a large number of signal lines and scanning lines is required and it is obviously not desirable that all of those lines are made of transparent electrodes. Therefore, when the exposure is performed from the rear surface of the panel, the signal lines, the scanning lines, the TFT etc. block the light, and cannot be polymerized. Thus the peripheries of these components needs to be covered by light-shading films in addition to the electrodes 4a and 5a, thus decreasing the aperture. Further, if the photopolymerizable monomer or the initiator remains unreacted in such light-shading regions, it may cause decrease in voltage retention. Those unreacted portions can result in deterioration in reliability and thus should be avoided.

In view of these problems, the color filter, and the light-shading film may be formed on the side of the TFT substrate (the substrate 1 on which the TFT is formed), and the counter substrate (the substrate 2 on which the color filter is provided in the conventional structure) is made of a transparent substrate for allowing exposure therefrom. In this case, there will be no light-shading portions as the case above, and the whole of the material layer 3 will be exposed to ultra violet light. Therefore, it is no longer necessary to cover the peripheries of the foregoing components by the light-shading films, thus increasing the aperture. Further, it is also possible to avoid the unreacted polymerized monomer or polymerization initiator, thereby preventing deterioration in reliability.

Further, the polymer (alignment auxiliary material) formed on the material layer 3 is not limited to the foregoing liquid crystal (meta) acrylate, but may be the same as that used in First Embodiment. Further, as in First Embodiment, the addition amount of the photopolymerizable monomer is preferably in a range from 0.05 wt % to 15 wt %.

Further, the polymerization initiator used in forming the polymer (alignment auxiliary material) formed from the photopolymerizable monomer is not limited to the methylethylketoneperoxide, but may be the same as that used in First Embodiment. Further, as in First Embodiment, the polymerization initiator is not always required, and the addition amount is preferably not more than 10 wt %.

Further, in the present embodiment, the medium sealed in the material layer 3 is not limited to the foregoing compound, but may be any medium having positive dielectric anisotropy.

Further, the medium for the material layer 3 may be any medium that is substantially optically isotropic when no field is applied, and causes optical modulation in response to field application. That is, the medium may be a substance whose orientational order parameter of the molecules or the molecular agglomerations (clusters) is increased by the field application.

Further, in the present embodiment, the medium sealed in the material layer 3 may be, for example, a one exhibiting a liquid crystal phase with an orderly structure (alignment order) smaller than the optical wavelength, so that the medium appears to be optically isotropic but has a positive dielectric anisotropy. Further, the medium may be a system made up of liquid crystal molecules forming agglomerations orientated radially in a size smaller than optical wavelength, so that the system appears to be optically isotropic. By applying a field to such a medium, micro structures of the molecules or the molecular agglomerations are distorted, thereby inducing the optical modulation. Further, by providing the alignment auxiliary material (polymer) in this medium, the molecule alignment is promoted, and therefore the element may be driven by a low voltage.

The following describes an example of the medium. However, the medium example below is one of possible examples, and the medium used for the display element of the present invention is not limited to this example.

MEDIUM EXAMPLE 1

One example of the medium sealed in the material layer 3 may be a one exhibiting a cubic phase. More specifically, the medium has an orderly structure with a cubic symmetric property, and has a scale smaller than optical wavelength (visible light wavelength).

Such a medium can be, for example, a BABH8 described in Makoto Yoneya, "Examining nano-structured liquid crystal phase by molecular simulation" EKISHO, 2003, Vol. 7, No. 3, pp. 238-245 and "Handbook of Liquid Crystals", Vol.2B, p.887-900, Wiley-VCH, 1998. This BABH8 is denoted by the following structural formula (20).

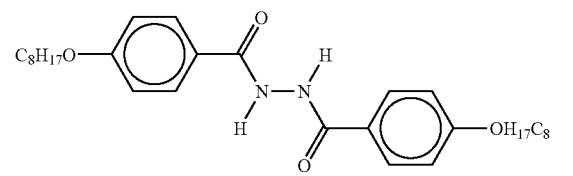

(20)

Figure 5:
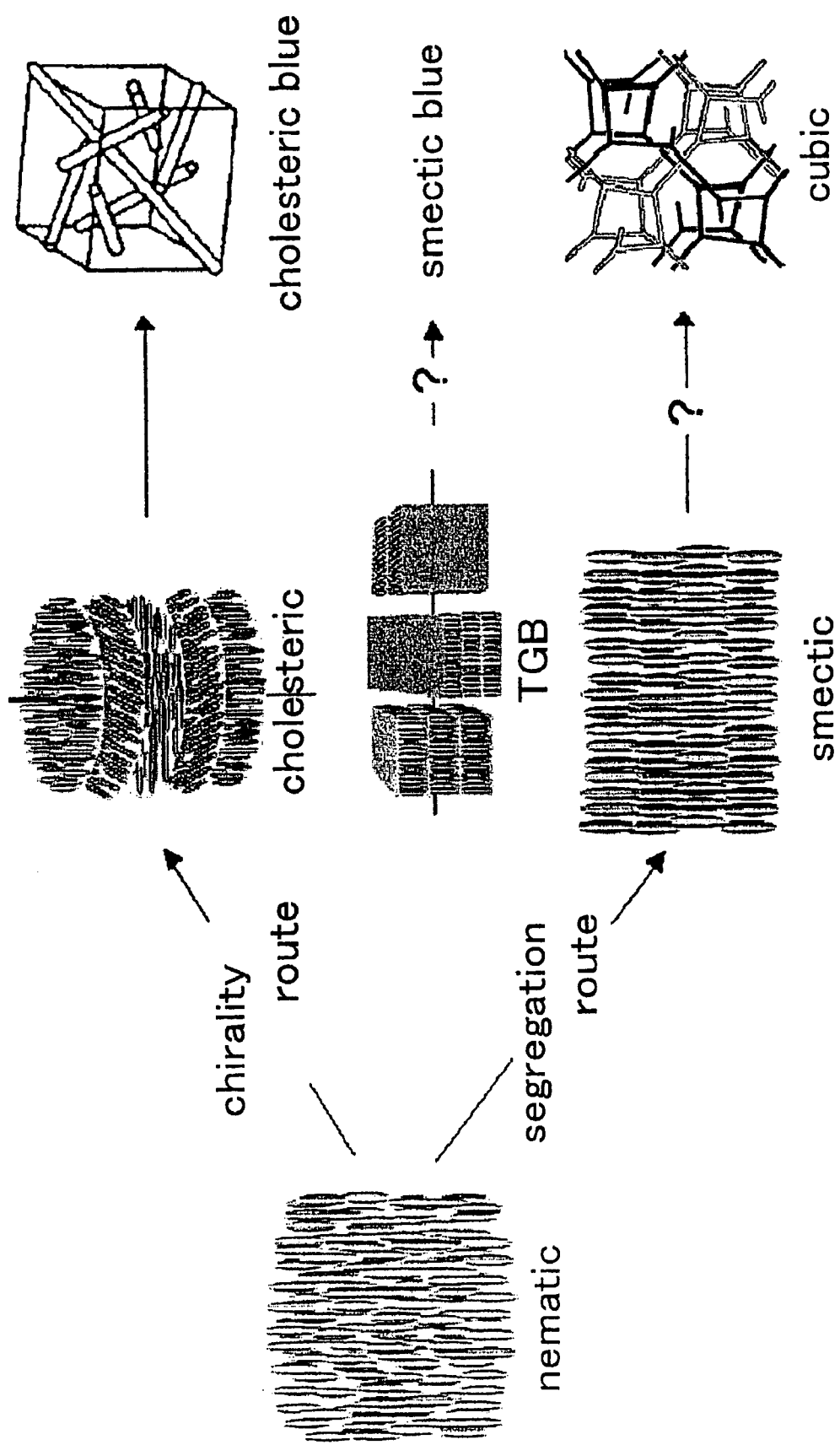
FIG. 5 is structure models of various liquid crystal phases.
Figure 7:
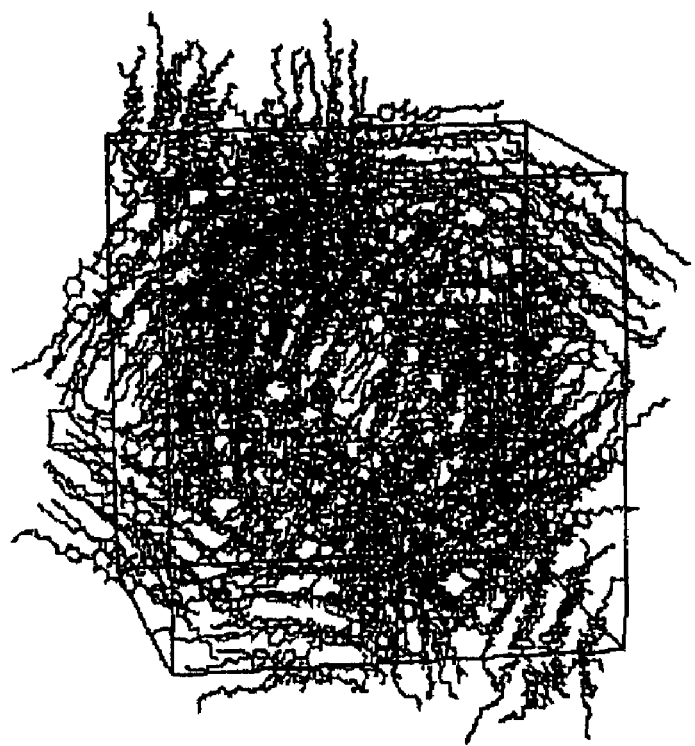
FIG. 7 is a structure model of a cubic phase.

The BABH8 exhibits a cubic phase having an orderly structure in a scale smaller than optical wavelength at a temperature range from 136.7° C. to 161° C. Note that, Makoto Yoneya, "Examining nano-structured liquid crystal phase by molecular simulation" EKISHO, 2003, Vol. 7, No. 3, pp. 238-245 describes a structure model of the cubic phase as shown in FIGS. 5 through 7.

As described above, the BABH8 is transparent, as it has a lattice constant=6 nm, that is more than 10 times smaller than the optical wavelength, and also the orderly structure (alignment order) smaller than the optical wavelength. Therefore, when no field is applied, the BABH8 exhibits optical isotropy. Accordingly, by using such a BABH8, the display element of the present embodiment performs superior black display with crossed nicols configuration.

Meanwhile, when a field is applied between the electrodes 4 and 5 while keeping the material layer 3 in a range between 136.7° C.to 161° C., the structure with a cubic symmetric property is distorted, thus expressing an optical isotropy. In other words, at the foregoing temperature range, the BABH8 is optically isotropic when no field is applied, and expresses an optical isotropy in response to field application.

As described, in the display device of the present embodiment having the foregoing structure, the structure having a cubic symmetric property is distorted in response to field application, that results in generation of birefringence, thus performing superior white display. Note that, the birefringence is generated in a constant direction but the degree is changed depending on the field application. Further, the voltage transmittance curve, that denotes the relation between the transmittance and the voltage applied between the electrodes 4 and 5, draws a stable curve in a wide temperature range as specified above. That is, the display element of the present embodiment having the foregoing structure obtains a stable voltage transmittance curve at a temperature range of appropriately 20K, from 136.7° C. to 161° C. Therefore, the temperature control is very easy in the display element.

Further, in the display element of the present embodiment using the BABH8, the distortion caused in the structure with a cubic symmetric property, in other words, the degree in change of the optical anisotropy of the medium, is used to perform the display operation. Therefore, a wider viewing angle property can be obtained in the present display element than that in the conventional display methods in which the display operation is carried out by changing the alignment directions of the liquid crystal molecules. Further, in the present display element using the BABH8, the birefringence occurs in a constant direction, and the optical axial direction is not changed. Thus, a wider viewing angle property is realized in the present display element.

Furthermore, in the display element of the present embodiment using the BABH8, the display operation is performed by using the anisotropy caused by distortion of the structure (crystal-like lattice) of micro regions. Because of this, the display element is free from such a problem of the display principle of the conventional display modes that inherent viscosity of the liquid crystal largely affects the response speed. On this account, the display element realizes high-speed response of about 1 ms. More specifically, in the display principle of the conventional modes, the change in alignment direction of the liquid crystal molecules is used to carry out the display, and therefore the inherent viscosity of the liquid crystal largely affects the response speed. On the other hand, in the display element of the present embodiment using the BABH8, the distortion of the structures in the micro regions is used to carry out the display, and therefore, the effect from the inherent viscosity of the liquid crystal is small, thus attaining high-speed response.

MEDIUM EXAMPLE 2

Another example of the medium to be sealed in the material layer 3 may be one with molecules exhibiting a smectic D (SmD) phase, that is one of the liquid crystal phases.

Such a liquid crystal material exhibiting the smectic D phase can be, for example, a ANBC16 described in Kazuya Saito, and Michio Sorai, "Thermodynamics of a unique thermo-tropic liquid crystal having optical isotropy" EKISHO, 2001, Vol. 5, No. 1, p. 21, FIG. 1 Structure 1 (n=16) and Handbook of Liquid Crystals", Vol. 2B, pp.887-900, Wiley-VCH, 1998, p. 888, Table 1, Compound (compound no.) 1, Compound 1a, Compound 1a-1. The molecule structure of the ANBC16 is denoted by the following structural formula.

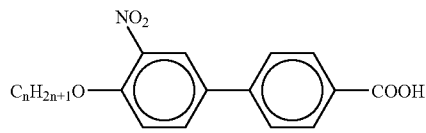

(21)

4'n-alkoxy-3'-nitro-biphenyl-4-carboxylic acids n-15 Cr 127 SmC 187 Cub 198 SmA 204 I This liquid crystal material (ANBC16, n=16 in the chemical structural formula (21)) shows a smectic D phase at a temperature range from 171.0° C. to 197.2° C. The smectic D phase has a three-dimensional lattice of plural molecules that looks like a jungle gym®. The lattice constant of this liquid crystal material is not more than several ten nms, that is smaller than the optical wavelength. That is, the smectic D phase has an orderly structure (alignment order) in which the molecules are aligned in a cubic symmetrical manner. Note that, since the ANBC16 has a lattice constant=approximately 6 nm, it exhibits optical isotropy.

Further, when a field is applied to the material layer 3 made of the ANBC16 that is kept at a temperature for exhibiting a smectic D phase, the molecules are attracted to the electric filed direction due to their dielectric anisotropy, thus causing distortion in the lattice structure. As a result, an optical anisotropy is expressed in the material layer 3.

Therefore, the ANBC16 can be used for the medium sealed in the material layer 3 of the display element of the present embodiment. Further, apart from the ANBC16, other smectic D phases also cause change in degree of the optical isotropy depending on whether a field is applied or not, and therefore may be used for the medium sealed in the material layer 3 of the display element of the present embodiment.

MEDIUM EXAMPLE 3

A liquid crystal micro emulsion may also be used for the medium to be sealed in the material layer 3. Here, the liquid crystal micro emulsion is a general name of such a system (mixture system) that the oil molecules of the O/W-type micro emulsion (a system comprising waterdrops dissolved in oil using a surfactant, the system having continuous oil phases) are replaced with thermotropic liquid crystal molecules, which system was originally named by the researchers led by Jun Yamamoto, the author of "liquid crystal micro emersion" (see EKISHO, Vol 4, No. 3, P.248-254, year of 2000).

Figure 9:
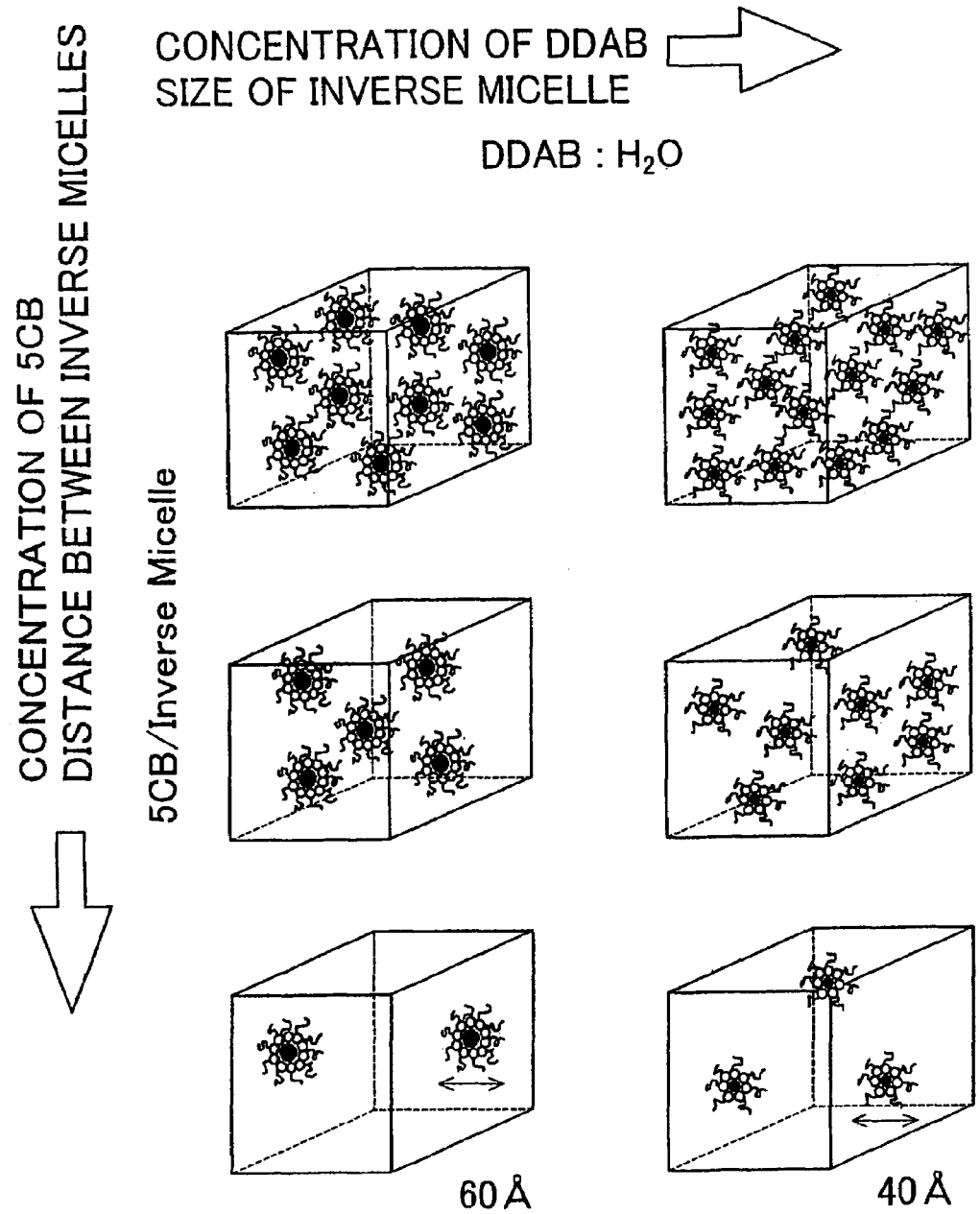
FIG. 9 is a schematic view illustrating a structure of a liquid crystal micro emulsion.
Figure 10:
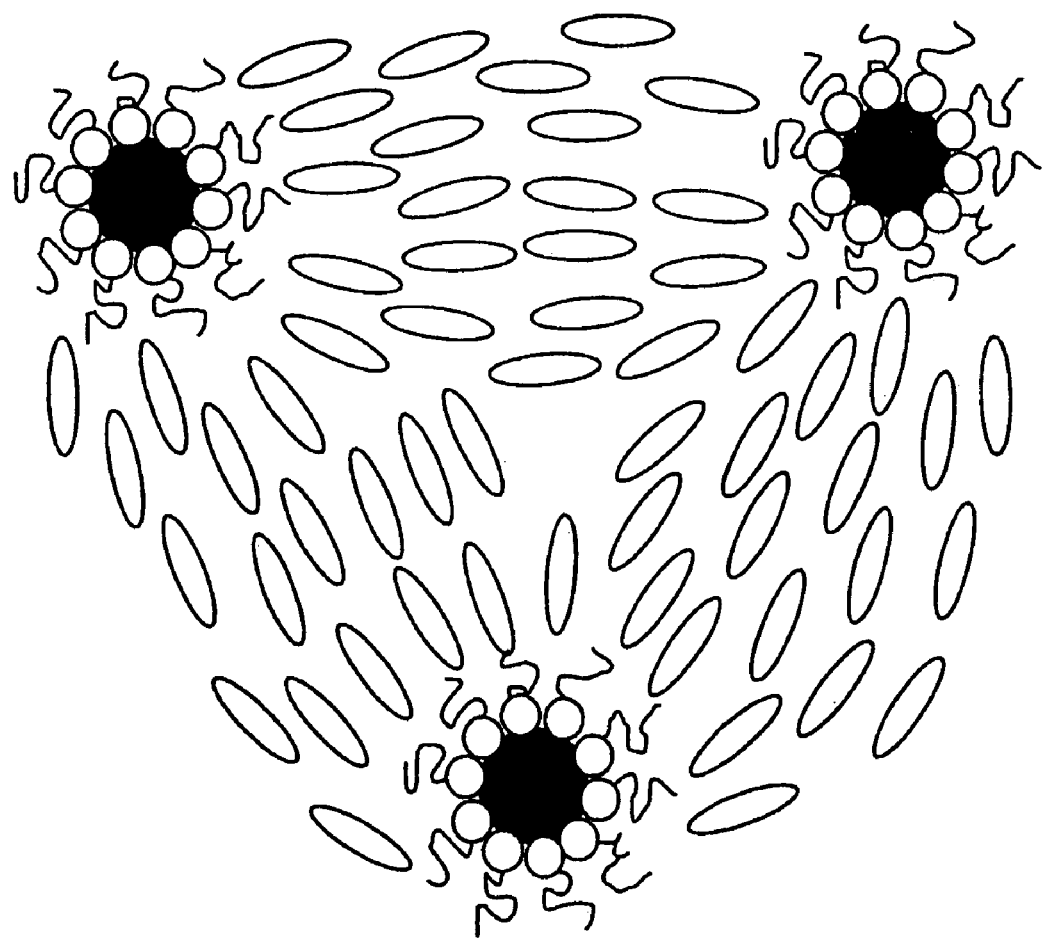
FIG. 10 is a schematic view illustrating a structure of a liquid crystal micro emulsion.

One specific example of the liquid crystal micro emersion may be a mixture system of (a) Pentylcyanobiphenyl (5CB), a thermotropic liquid crystal (temperature-transition-type liquid crystal) exhibiting a Nematic liquid crystal phase, described in the foregoing "liquid crystal micro emersion", and (b) an aqueous solution of Didodecyl ammonium bromide (DDAB), that is a lyotropic liquid crystal (concentration-transition-type liquid crystal) exhibiting a reverse micelle phase. The mixture system has a structure illustrated in the schematic views of FIGS. 9 and 10.

Further, in this mixture system, the diameter of each reverse micelle is typically about 50 Å, and each distance between the respective inverse phases is about 200 Å. These scales are approximately 10 times smaller than the optical length. That is, the foregoing mixture system (liquid crystal micro emersion) has an orderly structure smaller than the optical wavelength. Further, in this mixture system, the reverse micelles exist at random in a three-dimensional space, and the 5CBs are radially extended from each reverse micelle. Accordingly, the foregoing mixture system exhibits optical isotropy.

Then, when a field is applied to the medium made of the foregoing mixture system, due to the dielectric isotropy of the 5CB, the molecules are attracted to the direction of the field. That is, alignment anisotropy is expressed in the system that was optically isotropic and the 5CB were radially aligned around the reverse micelles, thereby causing an optical anisotropic. Therefore, the mixture system may be used for the medium sealed in the material layer 3 of the display element of the present embodiment. Note that, in addition to the foregoing mixture system, any liquid crystal micro emersion causing a change in degree of the optical anisotropy depending on whether a field is applied or not may be used for the medium sealed in the material layer 3 of the display element of the present embodiment.

MEDIUM EXAMPLE 4

Still another example of the medium to be sealed in the material layer 3 may be lyotropic liquid crystal with a particular phases. The lyotropic liquid crystal here is referred to as liquid crystal in which the general molecules which the liquid crystal comprises are dissolved in a solvent (water, organic solvent etc.) having a different property. Further, the particular phase here is referred to as a phase that causes a change in degree of optical anisotropic depending on whether a field is applied or not. Such a particular phase may be the micelle phase, the sponge phase, the cubic phase, or the reverse micelle phase, described in Jun Yamamoto "First lecture of liquid crystal science experiment: Identification of liquid crystal phase: (4) Lyotropic liquid crystal" EKISHO, 2002, Vol. 6, No. 1, p.72-83. FIG. 11 shows a classification of the lyotropic liquid crystal phase.

A surfactant has an amphipathic property, and thus comprises a material expressing a micelle phase. For example, an ionic surfactant, such as an aqueous solution of the sodium dodecyl sulfate or an aqueous solution of palmitic acid potassium, forms a spherical micelle. Further, in a mixture liquid of polyoxyethylenenonylphenylether and water, the nonylphenyl group functions as a hydrophobic group, and the oxyethylene chain functions as a hydrophilic group, thus forming a micelle. An aqueous solution of styrene-ethylene oxide block copolymer also forms a micelle.

For example, in the spherical micelle, the molecules form a spherical shape by being packed (forming molecule aggregation) in the whole space of the micelle. Further, since the size of the spherical micelle is smaller than the optical wavelength, it appears to be isotropic in the range of optical wavelength without exhibiting anisotropy. More specifically, the spherical micelle has an orderly structure (alignment order) smaller than optical wavelength. However, when a voltage is applied to such a spherical micelle, the spherical micelle is distorted, thus expressing anisotropy. Therefore, the lyotropic liquid crystal exhibited by the spherical micelle may be adopted as the medium sealed in the material layer 3 of the display device of the present embodiment. Note that, the medium is however not limited to the spherical micelle but other micelles, for example, a lyotropic liquid crystal exhibiting a string-like micelle phase, an elliptical micelle phase, a rod-like micelle phase may be sealed in the material layer to obtain the same effect.

Further, generally, a reverse micelle phase in which a hydrophilic group and a hydrophobic group are exchanged the spherical micelle phase is often formed depending on the conditions such as concentration, temperature, the type of surfactant etc. The reverse micelle shows the same optical effect as the normal micelle. Therefore, by adopting the lyptropic liquid crystal exhibiting the reverse micelle phase as the medium sealed in the material layer 3, the same effect as when using the lyotropic liquid crystal can be obtained. Note that, the liquid crystal micro emersion explained in the medium example 2 is one of the lyotropic liquid crystal exhibiting the reverse micelle phase (reverse micelle structure).

Further, as shown in FIG. 11, the aqueous solution of non-ionic surfactant pentaethylenglychol-dodecylether ($C_{12}E_5$) includes a region that with concentration and temperature exhibiting a sponge phase or a cubic phase. The sponge phase or the cubic phase has an orderly structure (orderly structure, alignment order) smaller than the optical wavelength, and is transparent in the optical wavelength range. Accordingly, the medium made of such a phase exhibits optical isotropy. Further, when a field is applied to the medium made of such a phase, the orderly structure (alignment order) is distorted, thus expressing optical anisotropy. Therefore, the lyotropic liquid crystal exhibiting the sponge phase or the cubic phase may be adopted for the medium sealed in the material layer 3 of the display element of the present embodiment.

MEDIUM EXAMPLE 5

The medium sealed in the material layer 3 may be a liquid crystal fine particle dispersion system that exhibits the phase whose degree of optical anisotropy is changed depending on whether a field is applied or not. Such a system may be a micelle phase, a sponge phase, a cubic phase, or a reverse micelle phase. Here, a liquid crystal fine particle dispersion system refers to a mixture system made of a solvent (liquid crystal) mixed with fine particles.

One of examples of the liquid crystal fine particle dispersion system may be a system made of an aqueous solution of non-ionic surfactant pentaethylenglychol-dodecylether ($C_{12}E_5$) mixed with latex fine particles, each of which has a diameter=100 Å, and the surface thereof is modified with a sulfuric group. The liquid crystal fine particle dispersion system expresses a sponge phase that has an orderly structure (alignment order) smaller than the optical wavelength. Accordingly, as with the foregoing medium example 3, the foregoing liquid crystal fine particle dispersion system may be adopted for the medium sealed in the material layer 3 of the display element of the present embodiment.

Note that, by replacing the latex fine particles with DDAB of the liquid crystal emersion of the Medium Example 2, the same alignment structure as that in the liquid crystal micro emersion of the Medium Example 2 can be obtained.

MEDIUM EXAMPLE 6

A dendrimer (dendrimer molecules) may be used for the medium sealed in the material layer 3. The dendrimer here refers to a three-dimensional highly-branched polymer that is branched for each monomer.

As it has many branches, the dendrimer forms a spherical structure when it comprises a certain amount of molecules. This spherical structure has an order (orderly structure, alignment order) smaller the optical wavelength, and therefore is transparent in the optical wavelength range, and is changed in degree of alignment order in response to the field application, thereby expressing an optical anisotropy (changing in degree of optical anisotropy). Therefore, the dendrimer may be adopted for the medium sealed in the material layer 3.

Further, by replacing the dendrimer material with DDAB of the liquid crystal micro emersion of the Medium Example 2, the same alignment structure as that in the liquid crystal micro emersion of the medium example 2 can be obtained. On this account, the dendrimer may be used for the medium sealed in the material layer 3 of the display element of the present embodiment.

MEDIUM EXAMPLE 7

The medium sealed in the material layer 3 may be a medium made of molecules exhibiting a cholesteric blue phase. Note that, FIG. 5 and FIG. 15 illustrate a schematic structure of a cholesteric blue phase.

Figure 15:
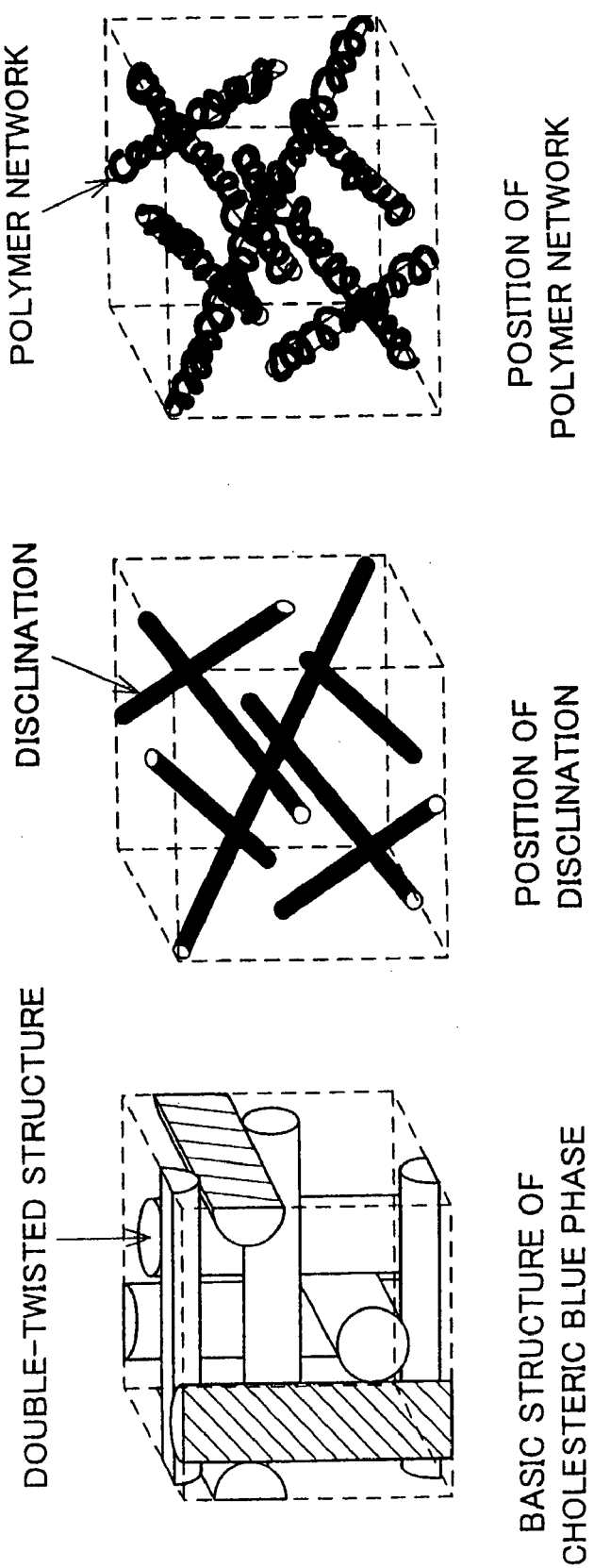
FIG. 15 is an explanatory view illustrating a cholesteric blue phase and a mechanism for fixing one embodiment of the present invention.

As shown in FIGS. 5 and 15, the cholesteric blue phase has a highly-symmetrical structure. Further, the cholesteric blue phase has an order (orderly structure, alignment order) smaller than the optical wavelength, and therefore is substantially transparent in the optical wavelength range, and is changed in degree of alignment order in response to the field application, thereby expressing an optical anisotropy (changing in degree of optical anisotropy). That is, the cholesteric blue phase is substantially optically isotropic, and when a field is applied, the molecules are attracted to the electric filed direction, thus causing distortion in the lattice structure. As a result, an optical anisotropy is expressed in the material layer 3. Therefore, the medium made of a cholesteric blue phase may be adopted for the medium sealed in the material layer 3 of the display element of the present embodiment.

Note that, one of the examples of the material exhibiting a cholesteric blue phase may be a mixture material of 48.2 mol % of JC1041xx (Nematic liquid crystal mixture material, Chisso. Co), 47.4 mol % of 5CB (4-cyano-4'-pentyl biphenol, Nematic liquid crystal mixture, product of Aldrich Co.Ltd.) and 4.4 mol % of ZLI-4572 (chiral agent, product of Merck Co. Ltd). The material exhibits a cholesteric blue phase at a temperature range from 330.7K to 331.8K.

Further, this mixture may be further mixed with a polymerizable monomer, or both a polymerization monomer and a polymerization initiator. More specifically, the alignment order structure of the molecules which the medium made of the foregoing mixture material comprises may be fixed by forming many microdomains (microdomains) in the material layer by the alignment auxiliary material (polymerizable compound). However, it is not preferable that the medium is divided into small regions (small domains) like micro capsules by a polymer etc. More specifically, when the medium is formed in a structure in which the liquid crystal molecules in each small domain are individually covered by a polymer, the structure of the cholesteric blue phase is disturbed, and therefore the structure cannot be fixed. Further, in this case of fixing the structure of the medium by the alignment auxiliary material, the alignment order structure of the molecules of the medium may also be fixed at the stage when the medium has been sealed in the material layer 3 but no field is yet applied. That is, the orderly structure (the orderly structure (alignment order) of the medium sealed in the material layer 3 when no field is applied) of the optical isotropy with no field application may be stabilized by the alignment auxiliary material (polymer).

With this arrangement, the orderly structure of the optical isotropy with no voltage application may be stabilized by the alignment auxiliary material (polymer). On this account, the use of the alignment auxiliary material (polymer) allows reduction of the driving voltage at a wide temperature range, even with a medium requiring driving voltage greatly dependent upon the temperature and therefore cannot be actually driven by a low voltage at a practical temperature range (a medium that is drivable by a low voltage only at a narrow temperature range, and therefore not really practical without the alignment auxiliary material (polymer)) is used. Therefore, it becomes possible to express an optical anisotropy (change the degree of optical anisotropy) by a low voltage. On this account, it is possible to realize a display device that achieves high-response and wide viewing angle, and can be driven by a practical voltage level.

For example, EHA (2-ethylhexyl acrylate, monoacrylate, Aldrich Co. Ltd) and RM257 (diacrylate monomer (diacrylate monomer), Merck Co. Ltd.) as photopolymerizable monomers, and DMPAP (2,2-dimethoxy-2-phenyl acetophenon, Aldrich Co. Ltd.) as a photopolymerizable initiator are added, in accordance with the following amounts.

EHA=4.0 mol % (2.4 wt %)
RM257=2.6 mol % (5.0 wt %)
DMPAP=0.33 mol % (0.28 wt %)
JC-1041xx=44.7 mol % (47.1 wt %)
5CB=43.4 mol % (35.2 wt %)
ZLI-4572=4.9 mol % (10.1 wt %)

Note that, after the mixture is made according to the foregoing ratios, the product is then constantly kept at a temperature for exhibiting a cholesteric blue phase, and irradiated with ultra violet light without application of field. The resulting medium exhibits a cholesteric blue phase constantly in a range from 326.4K to 260K, that is, the temperature range has been greatly increased from the conventional range=1.1K. On this account, it is possible to significantly increase the temperature range of a phase with an unpractical temperature range. This cholesteric blue phase may be driven by an electrode layout of FIG. 13 for example, functions as a display device allowing low voltage driving at a wide temperature range. FIG. 15 shows a mechanism of the cholesteric blue phase and the fixing method.

Further, the amount ratio of each material is not limited to the foregoing example. However, if the content of the photopolymerizable monomer (monomer) is small, the temperature range for exhibiting the cholesteric blue phase does not enlarge. For example, when the mixture is made of JC-1042xx=45.1 mol %, 5CB=45.8 mol %, ZLI-4572=5.1 mol %, EHA=2.4 mol % (1.4 wt %), RM257=1.5 mol % (2.9 wt %), and DMPAP=0.2 mol % (and a photopolymerizable monomer=3.9 mol % (4.3 wt %)), the cholesteric blue phase has a temperature range from 326.3K to 319.5K, that is smaller than the temperature range when the mixture is made according to the foregoing ratios. Further, when the content of monomer is large, in the resulting display element, the portion contributing the change in optical anisotropy with field application becomes smaller than that when no field is applied, and also the driving voltage increases. In this view, the content of the photopolymerizable monomer (photosensitive monomer) is preferably not less than 0.05 wt % and not more than 15 wt %, more preferably in a range between 2 mol % to 20 mol %, further preferably in a range between 3 mol % to 15 mol %, still further preferably in a range between 5 mol % to 11 mol %.

Further, the isotropic phase-liquid crystal phase transmission temperature decreases by addition of monomer and ultra violet (UV) irradiation. Therefore, to avoid excessive decrease of the temperature range in use for a display element, it is preferable that the mixture ratios of the foregoing mixture material are adjusted so that the isotropic phase-liquid crystal phase transition temperature of the liquid crystal mixture before the monomer is added becomes at or more than 55° C. When the display element is actually mounted to a product, such as a TV, there will be no serious problems if the isotropic phase-liquid crystal phase transition temperature of the liquid crystal mixture before the monomer is added is at or more than 55° C. For example, when the mixture is prepared with JC-1041xx=48.2 mol %, 5CB=47.4 mol %, ZLI-4572=4.4 mol %, and then is subjected to ultra violet irradiation, as described, the isotropic phase-liquid crystal phase transition temperature is 331.8K; however, when the mixture is prepared with JC-1041xx=44.7 mol %, 5CB=43.4 mol %, ZLI-4572=4.9 mol %, EHA=4.0 mol %, RM257=2.6 mol % and DMPAP=0.33 mol %, and then is subjected to ultra violet irradiation, the isotropic phase-liquid crystal phase transition temperature is decreased to 326.4K Further, the liquid crystal phase-solid phase transition temperature is preferably not more than −10° C., more preferably not more than −30° C. More specifically, the amount ratios of the mixture material is preferably decided so that the liquid crystal phase-solid phase transition temperature is not more than −10° C., more preferably not more than −30° C.

Further, an acrylate-type monomer is particularly preferable for the photopolymerizable monomer (photosensitive monomer). More preferable monomer is a mixture system of a liquid crystal diacrylate monomer and a non-liquid crystal acrylate monomer. This is because a mixture system of a liquid crystal diacrylate monomer and a liquid crystal acrylate monomer causes a smaller enlargement in temperature range for exhibiting the cholesteric blue phase. For example, when the mixture is prepared with JC-1041xx=46.2 mol %, 5CB=44.7 mol %, ZLI-4572=5.0 mol %, 6CBA (liquid a branched structure (e.g., HA), if a greater amount of the acrylate-type monomer is used. Further, when an acrylate-type monomer not having a branched structure is used, a monomer with a long alkyl chain is preferred, which gives substantially the same effect as that of an acrylate-type monomer having a branched structure. The acrylate-type monomer not having a branched structure but including a long alkyl chain may be n-OA (n-octyl acrylate, Aldorich), for example.

Further, the photopolymerized monomer is not limited to the achiral material but may be a chiral photosensitive monomer. The following compound (5) is an example of the chiral photosensitive monomer.

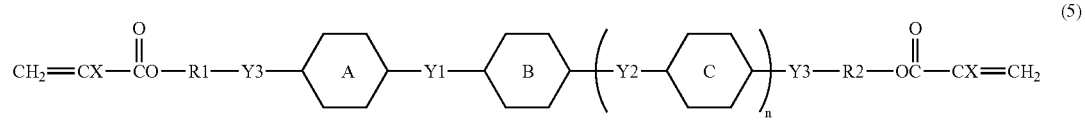

(5)

crystal acrylate monomer; 6-(4'-cyanobiphenyl-4-yloxy) hexyl acrylate))=2.8 mol %, RM257=1.1 mol % and DMPAP=0.2 mol %, the temperature range for exhibiting a cholesteric blue phase is 329.8K to 327.7K.

A diacrylate compound including a few six-membered rings in the main structure is suitable for the liquid crystal monomer. Such a compound exhibits a liquid crystal property, and is highly capable of alignment control. The following compound (22) is an example of such a liquid crystal monomer.

Since a chiral photopolymerizable monomer has a chiral property, and therefore automatically has a twisted structure, it is compatible with the twisted structure of the cholesteric blue phase, thereby ensuring stability.

Further, in the foregoing explanation, the alignment orderly structure of the molecules which the medium comprises is fixed by the polymer (alignment auxiliary material) made of a photopolymerizable monomer; however, the present invention is not limited to such fixing of the align-

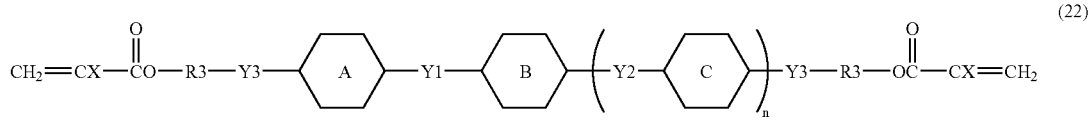

(22)

where R3 denotes an alkyl group including 1-20 carbons other than chiral carbons.

Further, a preferable example of the non-liquid crystal monomer is an acrylate-type monomer including either an acryloyl group or a metacryloyl group in its molecule structure; further, more preferable example is an acrylate-type monomer having a branched structure including an alkyl group as a side chain. It is preferable that the alkyl group has 1-4 carbons, and at least one side chain of the alkyl group exists for each monomer. In addition to the EHA, other preferable examples of the monomer includes TMHA (3,5,5-trimetthylhexyl acrylate, Aldrich Co. Ltd).

Note that, when the photopolymerization is performed with an acrylate-type monomer not having a branched structure, the enlargement of the temperature range for exhibiting the cholesteric blue phase is reduced. For example, when the mixture is prepared with JC-1041xx 44.1 mol %, ZLI-4572 5.2 mol %, HA (monomer not having a branched structure; n-hexyl acrylate, Aldrich. Co. Ltd)=4.0 mol %, RM257=2.0 mol % and DMPAP=0.3 mol %, the temperature range for exhibiting a cholesteric blue phase is 326.2K to 318.0K. However, larger enlargement of the temperature range for exhibiting a cholesteric blue phase can be achieved even with an acrylate-type monomer not having ment orderly structure by the formation of the polymer (alignment auxiliary material).

For example, the alignment auxiliary material may be made of a thermosensitive monomer that is polymerizable by heat, or a monomer polymerizable by heat and light irradiation. Further, it may also be a chain polymer, a reticulate polymer (reticulate polymer material) or a ring polymer (ring polymer material).

Further, the auxiliary alignment material is not always formed by a polymerized compound, but may be made of the hydrogen bond network (hydrogen-bonded cluster), fine particles, porous structure material (e.g., porous inorganic material), or the like.

Further, a micropore film, such as a membrane filter, may be used as the porous structure material. For example, Nuclepore (Nomura Micro Science Co., Ltd.), Isopore (Japan milipore Co. Ltd), Hipore (Asahi Kasei), Millipore (Japan Millipore), or U-pore (Ube Industries. Ltd.) is suitable.

Note that, the micropore film is preferably made of a polycarbonate, polyolefin, cellulose-contained ether, cellulose acetate, polyvinylidene fluoride, acetylene cellulose, or a mixture of acetyl cellulose and cellulose nitrate, which does not react with the medium (e.g., a dielectric material such as a liquid crystal material) sealed in the micropore film. The size (diameter) of the micropore is preferably not more than ¼ of the wavelength of visible light, more preferably not more than 50 nm, so as to ensure optical isotropy after the medium is sealed in, and also to provide a system for fixing the medium. On this account, the material layer has sufficient transparency with respect to visible light. Further, the thickness of the micropore film is preferably not more than 50 μm, more preferably not more than 10 μm.

Note that, in the foregoing explanation, the alignment auxiliary material fixes the alignment orderly structure of the molecules which the medium exhibiting the cholesteric blue phase comprises, but the medium to be fixed is not limited to this type of medium but may be any other mediums (medium having a phase exhibiting other orderly structure) described in this specification. On this account, the temperature range in use for display element can be greatly enlarged. Further, in use of those mediums, the alignment order structure of the molecules of the medium may also be fixed at the stage when the medium has been sealed in the material layer 3 but no field is yet applied.

Further, one of suitable micropore films is one having a twisted structure such as a helical crystal; for example, a polyolefin-type film, polypeptide-type film etc. One preferable example of the polypeptide-type film with a twisted structure is a synthetic polypeptide having a helical structure, thus having α-herix formation ability. Examples of the synthetic polypeptide having a helical structure, i.e., α-herix formation ability are polyglutamic acid derivative such as poly-γ-benzyl-L-glutamate, poly-γ-methyl-L-glutamate, poly-γ-ethyl-L-glutamate, polyaspartic acid derivative such as poly-β-benzyl-L-aspartate, poly-L-leucine, and poly-L-alanine. These synthetic polypeptides become available as such or by being diluted by insoluble herix solvent or the like; for example, 1.2-dichloroethane, or dichloromethane. A commercially available synthetic polypeptide having α-helix formation ability may be poly-methyl-L-glutamate, such as ajicoat A-2000, or XB-900 (Ajinomoto Co. Ltd), PLG-10,-20,-30(Kyowa Hakko Co. Ltd), for example.

When using such a film having a twisted structure, and the medium is chiral, it is possible to prevent great distortion in a chiral medium by using a similar structures for the twisted structure of the medium and the helical structure of the film, thereby improving stability of the medium. Further, even when the medium is not chiral, the medium is aligned in accordance with the twisted structure of the film, thus the medium will have a characteristic similar to the chiral medium.

Further, other material exhibiting a cholesteric blue phase may be, for example, a mixture material made of ZLI-2293 (mixed liquid crystal, Merck Co. Ltd)=67.1 mol %, P8PIMB (1,3-phenylene bis [4-(4-8-alkylphenyliminomethyl-ben-zoate, banana-like shape (curved) liquid crystal, see the following structural formula (11))=15 wt %, and MLC-6248 (chiral agent, Merck Co. Ltd)=17.9 wt %. This mixture material exhibits a cholesteric blue phase at a temperature range of 77.2° C. to 82.1° C. Further, different suitable materials may be created by appropriately changing the foregoing mixture ratios. For example, a material made of ZLI-2293=69.7 wt %, P8PIMB=15 wt %, and MLC-6248 (chiral agent)=15.3 wt % exhibits a cholesteric blue phase at a temperature range of 80.8° C. to 81.6° C.

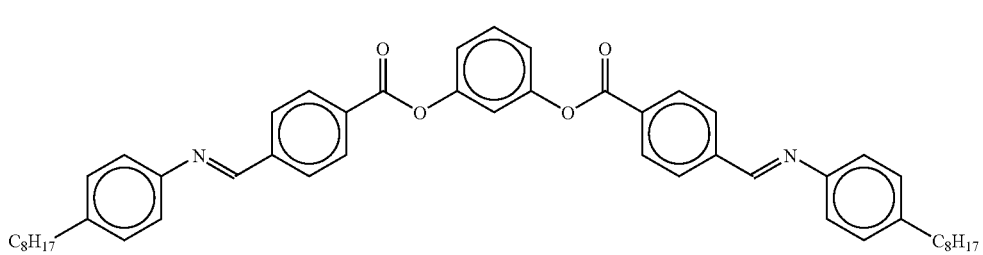

(11)

Further, still another material exhibiting a cholesteric blue phase may be, for example, a mixture material made of ZLI-2293 (mixed liquid crystal, Merck Co. Ltd)=67.1 wt %, MHPOBC (4-(1-methylheptyloxycarbonyl) phenyl-4'-octyl-carboxybiphenyl-4-carboxylate, linear liquid crystal, see the following structural formula (23))=15 wt %, and MLC-6248 (chiral agent, Merck Co. Ltd)=17.9 wt %. This mixture material exhibits a cholesteric blue phase at a temperature range of 83.6° C. to 87.9° C. As with the case above, different suitable materials may be prepared also in this case by changing the foregoing mixture ratios. For example, a material made of ZLI-2293=69.7 wt %, MHPOBC=15 wt %, and MLC-6248 (chiral agent)=15.3 wt % exhibits a cholesteric blue phase at a temperature range of 87.8° C. to 88.4° C.

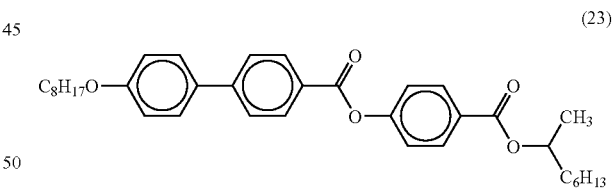

(23)

Note that, the mixture of ZLI-2293 and MLC-6248 did not exhibit a cholesteric blue phase; however, by addition of the banana-shaped (curved) liquid crystal P8PIMB or the linear liquid crystal MHPOBC, the mixture exhibited a cholesteric blue phase.

Further, in the foregoing example, a lasemic body is used as a linear liquid crystal; however it may instead be, for example, a chiral body. Further, in the case of using a linear liquid crystal, one having a contragradient structure (each layer faces different direction), such as a linear liquid crystal MHPOBC is particular preferable.

Further, linear liquid crystal is a general name in the chemical structural formula denoting a liquid crystal molecule that appears to be substantially linear oblong shape.

This may be tacit understanding, but the actual configuration of the linear liquid crystal does not always exist within one plane, but may be bent.

Further, the banana-shaped (curved) liquid crystal is a general name in the chemical structural formula denoting a liquid crystal molecule having a curving portion, and this is not limited to P8PIMB. For example, the curving portion in the chemical structural formula may be a benzene ring such as a phenylene group, otherwise, it may be one coupled by a naphthalene ring, a methylene chain or the like. The following structural formulas (12) through (15) denote example compounds of the banana-shaped liquid crystal.

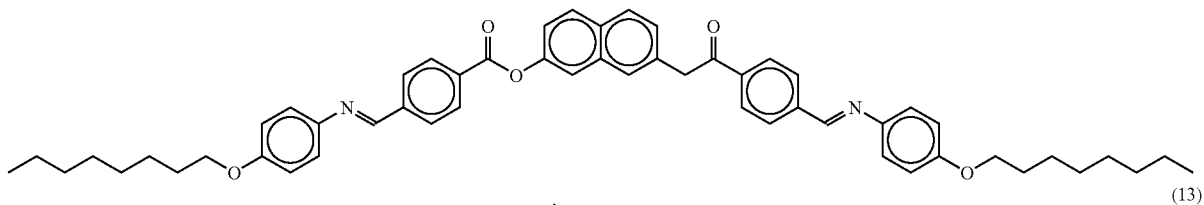

(12)

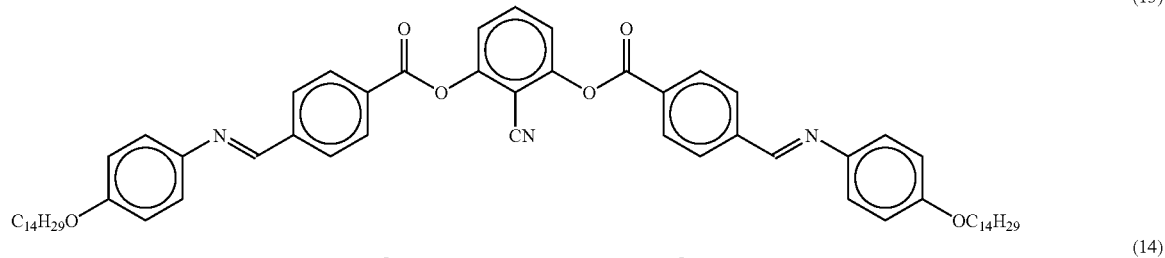

(13)

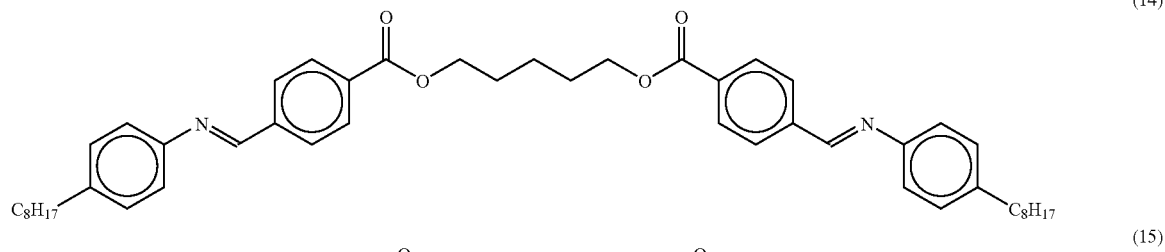

(14)

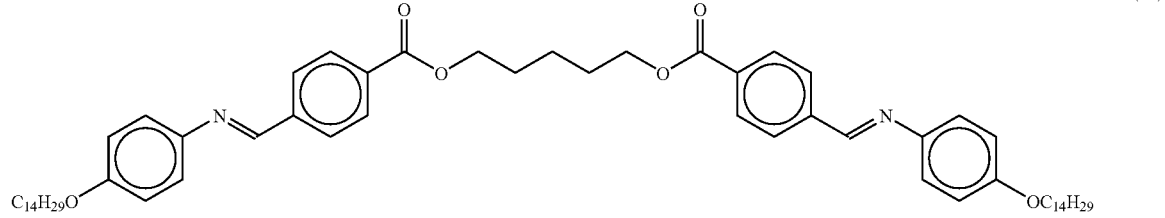

(15)

Further, the banana-shaped (curved) liquid crystal material may comprise an azo group. The compound denoted by the structural formula (16) below is an example of the banana-shaped (curved) liquid crystal.

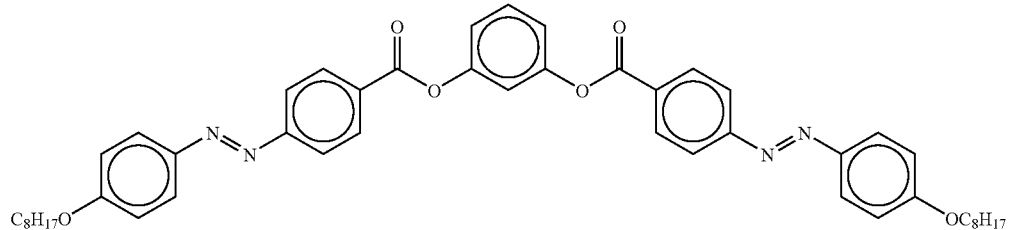

(16)

Further, in the foregoing example, the banana-shaped (curved) liquid crystal material has a horizontally symmetrical chemical structure in the bonding portion, but it may have a horizontally asymmetrical chemical structure in the bonding (curving) portion. The compound denoted by the structural formula (17) below is an example of the banana-shaped (curved) liquid crystal.

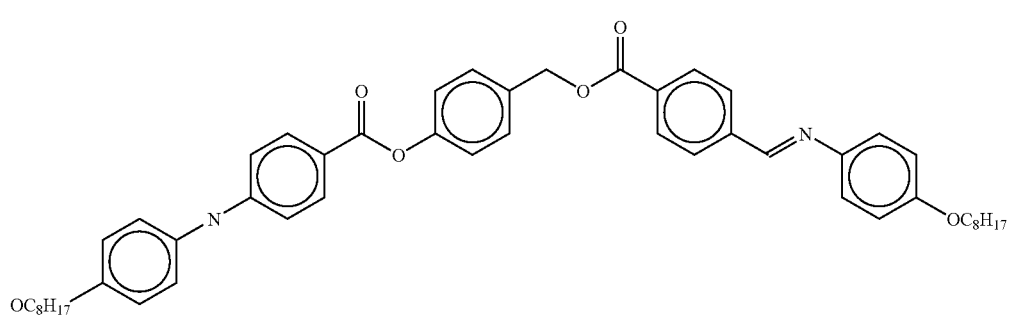

(17)

Further, though the banana-shaped (curved) liquid crystal molecules in the foregoing example do not comprise a chiral carbon, it may comprise one or more chiral carbon(s). The compound denoted by the structural formula (18) below is an example of the banana-shaped (curved) liquid crystal.

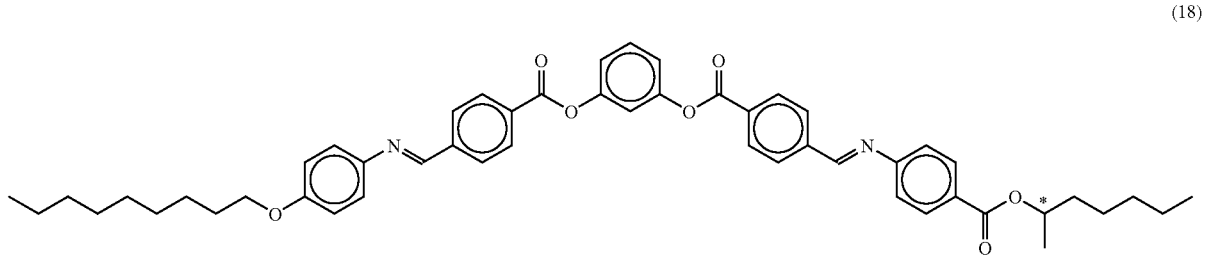

(18)

Further, as described, the cholesteric blue phase applicable to the present invention has a defective order smaller than the optical wavelength, so that the material is substantially transparent in the optical wavelength region, and is substantially optically isotropic. Here, "the material is substantially optically isotropic" means the following condition: the cholesteric blue phase shows the optical isotropy except for a coloring by a helical pitch. Note that, the cholesteric blue phase shows a color reflecting a helical pitch of the liquid crystal. Note that, a phenomenon of selectively reflecting light having the wavelength reflecting the helical pitch is called a selective reflection. When the wavelength band of the selective reflection is not in the visible range, the color is not shown (the color is not recognized by human eyes). When the wavelength band of the selective reflection is in the visible range, the color corresponding to the wavelength is shown.

Here, when the selective reflection wavelength range or the helical pitch is equal to or greater than 400 nm, the cholesteric blue phase (blue phase) displays a color corresponding to the helical pitch. More specifically, visible light is reflected, and the reflection produces color recognizable by human. Therefore, for example, when the display element of the present invention is equipped with full-color display function and mounted to a TV or the like, reflection peak is not preferably in a visible range.

Note that, the selective reflection wavelength also depends on the incident angle to the helical axis of the medium. Therefore, when the structure of the medium is not one-dimensional but, for example, three-dimensional as with the cholesteric blue phase, the incident angle to the light helical axis has distribution, meaning that the width of the selective reflection wavelength also has distribution.

In this view, it is preferable that the blue phase has the selective reflection wavelength range or the helical pitch not more than visible range, i.e., not more than 400 nm. If the blue phase has the selective reflection wavelength range or the helical pitch not more than 400 nm, the displayed color explained above becomes invisible by human.

Further, according to the CIE (Commission Internationale de l' Eclairage), it is determined that the wavelength unrecognizable for human eyes is 380 nm or less. Therefore, it is further preferable that the blue phase has the selective reflection wavelength range or the helical pitch $\leq 380$ nm. In this case, it is possible to securely prevent such a displayed color from being visible by human.

Further, the color on display depends on not only the helical pitch and the incident angle but also the average refractive index of the medium. The light of the displayed color here mainly has wavelength $\lambda=nP$, and the wavelength width $\Delta\lambda=P\Delta n$. Here, n denotes the average refractive index, and P denotes the helical pitch. Further, $\Delta n$ denotes anisotropy of refractive index.

$\Delta n$ differs depending on the material, but when a liquid crystal material is used as a material sealed in the material layer 3, since a general liquid crystal material has average refractive index=approximately 1.5, and $\Delta n$=approximately 0.1, the helical pitch P has to be P=400/1.5=267 nm to make the display color invisible when λ=400. Further, Δλ is 26.7 according to 0.1×267. More specifically, to make the color invisible by human, the helical pitch of the medium has to be not more than 253 nm, this is obtained by subtracting 13.4 nm, a half of 26.7 nm, from 267 nm. Accordingly, to prevent the display of color mentioned above, the helical pitch of the medium is preferably not more than 253 nm.

Further, in the foregoing example, λ is set to 400 nm in the formula λ=nP; however, when λ is set to 380 nm, that is the unrecognizable wavelength for human eyes according to the CIE (Commission Internationale de l' Eclairage), the helical pitch for making the color invisible becomes equal to or less than 240 nm. That is, by setting the helical pitch of the medium to 240 nm or less, it is possible to securely prevent such a displayed color from being visible by human.

For example, a sample prepared with a mixture of JC1041 (mixture liquid crystal, Chisso Co. Ltd)=50.0 wt %, 5CB (4-cyano-4'-pentyl biphenyl, Nematic liquid crystal)=38.5 wt %, and ZLI-4572 (chiral dopent, Merck Co. Ltd)=11.5 wt % causes phase transition from liquid isotropy to optical isotropy at 53° C. or a lower temperature; however, since it has a helical pitch=approximately 220 nm, that is equal to or less than the visible range, the color was not displayed.

Further, another sample was prepared with the foregoing sample=87.1%, TMPTA (trimethylolpropane triacrylate, Aldrich)=5.4 wt %, RM257=7.1 wt %, and DMPA (2,2-dimethoxy-2-phenyl-acetophenone)=0.4 wt %; the sample was kept at a temperature near the cholesteric—cholesteric blue phase transition temperature to polymerize the photopolymerizable monomer by ultra violet irradiation. The sample has a wider temperature range for exhibiting a cholesteric blue phase than the foregoing mixture sample.

Other samples were prepared with the compounds denoted by the following structural formulas (24) through (28) with the addition ratios on the right (i.e., the compounds of formulas (24) through (28) are mixed respectively at amounts of 17.5 wt %, 17.5 wt %, 17.5 wt %, 17.5 wt %, and 30 wt %). These samples caused phase transition from isotropic phase to blue phase approximately 20° C. or a lower temperature, but since it has a helical pitch equal to or smaller than the visible range, the color was not displayed.

great alignment difference between adjacent molecules, and therefore the medium exhibiting the cholesteric blue phase needs to have a chiral property to produce a great twisted structure. Then, to express a great twisted structure, it is preferable that a chiral agent is added to the medium as with the foregoing medium example. The ideal concentration of the chiral agent depends on the torsion ability of the chiral agent, but a preferable concentration may be 8 wt % or 4 mol %. When a polymer network (obtained by photopolymerization of photosensitive monomer) is used to enlarge the temperature range exhibiting the cholesteric blue phase, the chiral agent in an amount of equal to or greater than 8 wt % or 4 mol % increases the temperature range of cholesteric blue phase to approximately 1° C. or more. On the other hand, the chiral agent less than 8 wt % or 4 mol % reduces the temperature range of cholesteric blue phase, thereby causing some difficulties in temperature control.

Further, the concentration of the chiral agent is preferably at or greater than 11.5 wt %. With the chiral agent with a concentration equal to or more than 11.5 wt %, the helical pitch becomes approximately 220 nm, and the color was not displayed.

Further, it is more preferable that the concentration of the chiral agent is at or greater than 15 wt %. When a banana-shaped (curved) liquid crystal or a linear liquid crystal having a contragradient structure is added to express the cholesteric blue phase, the chiral agent with a concentration equal to or greater than 15 wt % increases the temperature range of cholesteric blue phase to approximately 1° C. or more. When using a chiral agent in which the concentration is further increased to 17.9 wt %, the temperature range of the cholesteric blue phase is further enlarged.

Further, it is further preferable that the concentration of the chiral agent is at or more than 30 wt %. The compounds denoted by the structural formulas (24) through (28) are mixed respectively at the ratios on the right (the concentration of the chiral agent denoted by the formula (28) is 30 wt %), the cholesteric blue phase has a helical pitch equal to or less that the visible range, and therefore color was not displayed. This is assumably because the large amount of chiral agent causes decrease in helical pitch.

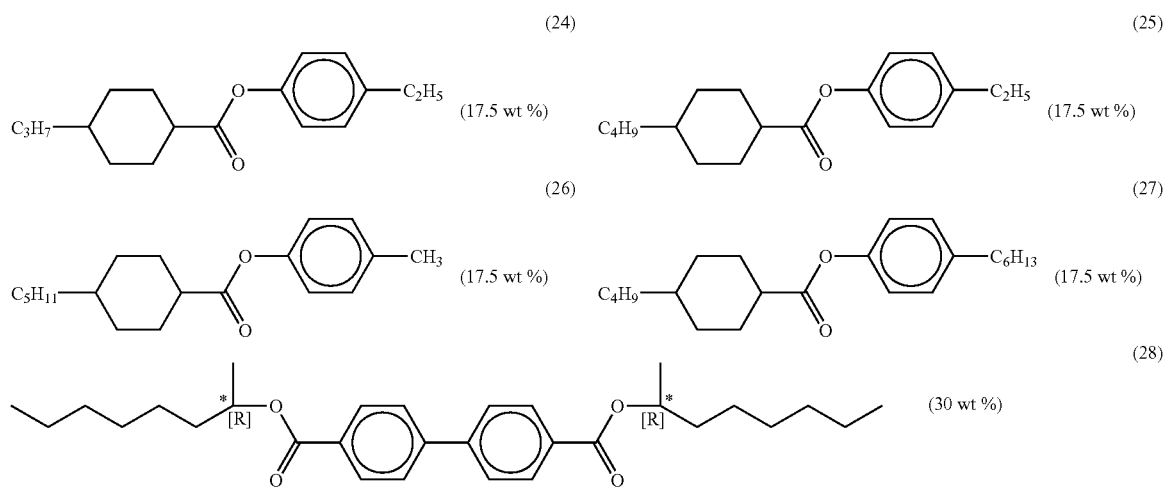

As described, the cholesteric blue phase suitable for the present invention has a defective order smaller than the optical wavelength. The defective structure is caused by Since the cholesteric blue phase displays a color corresponding to the helical pitch, when the display element of the present invention is equipped with full-color display function and mounted to a TV or the like, reflection peak is not preferably in a visible range. Further, when the concentration of the chiral agent was decreased to be less than 30 wt %, the temperature range of the cholesteric blue phase was reduced.

However, when an excessive amount of chiral agent is added, the liquid crystal property of the entire material layer 3 decreases. Insufficient liquid crystal property brings about a decrease in degree of generation of the optical anisotropy upon field application, thereby decreasing function of the display element. Further, the decrease in the liquid crystal property also causes a decrease in stability of the cholesteric blue phase, which interferes the enlargement of temperature range of the cholesteric blue phase. The upper limit of the addition amount of the chiral agent can be decided according to the foregoing view, that was figured out as 80 wt % by the inventors of the present invention. More specifically, the concentration of the chiral agent is preferably not more than 80 wt %.

Further, in the present embodiment, the chiral agent is not limited to the foregoing mixture agent of ZLI-457 and MLC-6248 used in the example above. For example, a commodity, such as S811 (E, Merck Co. Ltd) may be used. Further, an axial asymmetry chiral agent may also be used. The axial asymmetry chiral agent may be an axial asymmetry binaphthyl derivative (see the compound (29) below), for example.

(when there is a liquid crystal property), the compound (29) may be used as a medium sealed in the material layer 3. Further, the compound (29) may also be used as a chiral agent.

As described, a chiral agent with a higher concentration is preferred, as it eases expression of the cholesteric blue phase, and the helical pitch of the cholesteric blue phase is reduced.

Note that, in the foregoing example, the effect of the addition of chiral agent to the cholesteric blue phase was explained; however, the effect of the addition of chiral agent in not limited only to the cholesteric blue phase, but also useful for a medium exhibiting other liquid crystal phases, such as a smectic blue phase or a Nematic phase etc.

With the addition of chiral agent, the torsion ability (Helical Twisting Power) of the chiral agent is efficiently used to cause proximity interaction (short-range-order) among molecules. More specifically, the molecules of a medium, that is optically isotropic when no field is applied, are form small groups (clusters) in response to field application. Therefore, with the addition of chiral agent, it is possible to enlarge the temperature range for expressing optical isotropy, even for a medium originally expresses optical isotropy only in a small temperature range.

Further, in a medium includes a chiral agent, optical rotation occurs in the incident light due to a single direction-

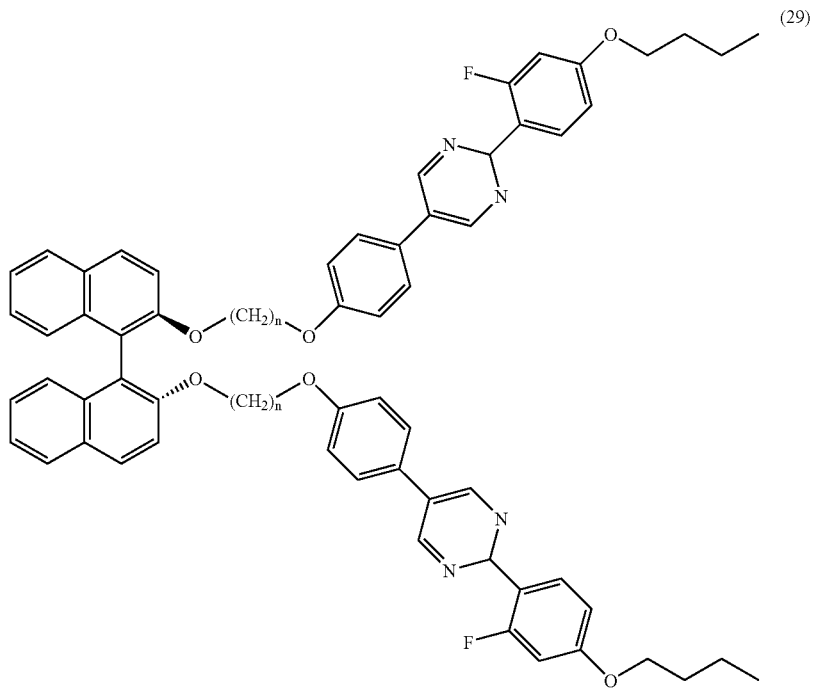

(29)

where n is an integer from 4 to 14.

Note that, the compound (29) solely exhibits a blue phase in some cases when n is an odd number. For example, when n=7, the compound exhibits a blue phase at a temperature range from approximately 103° C. to 94° C. Further, the compound exhibits a blue phase when n=9 or 11 (however, the temperature range of the blue phase in the case where n=9 or 11 is smaller than the range when n=7). Therefore, when the compound (29) solely exhibits the blue phase twist according to the voluntary twisted direction of the chiral agent, thereby allowing efficient extract of the light.

MEDIUM EXAMPLE 8

The medium sealed in the material layer 3 may be a medium made of molecules exhibiting a smectic blue phase ($BP_{sm}$).

As with the cholesteric blue phase, a smectic blue phase has a highly-symmetrical structure. Further, the smectic blue phase has an order (orderly structure, alignment order) smaller than the optical wavelength, and therefore is substantially transparent in the optical wavelength range, and is changed in degree of alignment order in response to the field application, thereby expressing an optical anisotropy (changing in degree of optical anisotropy). That is, the smectic blue phase is substantially optically isotropic, and when a field is applied, the molecules are attracted to the electric filed direction, thus causing distortion in the lattice structure. As a result, an optical anisotropy is expressed in the material layer 3. Therefore, the medium made of a smectic blue phase may be adopted for the medium sealed in the material layer 3 of the display element of the present embodiment.

Note that, one of the examples of the material exhibiting a smectic blue phase may be FH/FH/HH-14BTMHC described in "*Structural Investigations on Smectic Blue Phases*" Eric Grelet and three other researchers, PHYSICAL REVIEW LETTERS, *The American Physical Society*, 23 Apr. 2001, VOLUME 86, NUMBER 17, p.3791-3794. This material exhibits $BP_{sm3}$ phase at a temperature range 74.4° C. to 73.2° C., exhibits $BP_{sm2}$ phase at a temperature range 73.2° C. to 72.3° C., and exhibits $BP_{sm1}$ phase at a temperature range 72.3° C. to 72.10° C.

Further, as with the case of using a cholesteric blue phase, it is preferable in the use of a smectic blue phase that the blue phase has the selective reflection wavelength range or the helical pitch is not more than 400 nm, more preferably not more than 380 nm. Further, the helical pitch is preferably not more than 253 nm, more preferably not more than 240 nm.

Further, the medium used for the material 3 of the display element of the present invention has at least an orderly structure (alignment order) smaller than the optical wavelength and is changed in degree of optical anisotropy in response to field application. As long as it has this characteristic, for example, a material having a similar phase to the smectic blue phase or the cholesteric blue phase may be used. The following compounds (30) through (31) are examples of the material having a similar phase to the smectic blue phase or the cholesteric blue phase.

having the orderly structure (alignment order) smaller than the optical wavelength at a temperature range from 132° C. to 120° C.

Further, in the material layer (medium sealed in the dielectric layer 3) exhibiting a Nematic phase, when the refractive index anisotropy at 550 nm=$\Delta n$, and the dielectric constant anisotropy at 1 kHz=$\Delta \epsilon$, $\Delta n \times \Delta \epsilon$ preferably becomes 2.6 or greater.

Here, the refractive anisotropy ($\Delta n$) is expressed as: $\Delta n = ne - no$ where ne expresses refractive index (abnormal light refractive index) of the major axis direction (direction of components of the polarization of light wave), and no expresses refractive index (normal light refractive index) of the perpendicular direction to the major axis of the ellipsoid (direction of components of the polarization of light wave). More specifically, in the present invention, the refractive index anisotropy ($\Delta n$) denotes the birefringence expressed as $\Delta n = ne - no$ (ne: abnormal light refractive index, no: normal light refractive index).

Further, the dielectric constant anisotropy (change in dielectric constant) ($\Delta \epsilon$) denotes anisotropy of dielectric constant, and is expressed as $\Delta \epsilon = \epsilon e - \epsilon o$ where $\epsilon e$ denotes dielectric constant in the major axis direction of liquid crystal molecule, and $\epsilon o$ denotes dielectric constant in the minor axis direction of the liquid crystal molecule.

Next, the following explains a measurement result of driving voltage for the display element of the present embodiment in which the liquid crystal fine particle dispersion system described in Medium Example 5 above is sealed in the material layer 3.

The foregoing compound (2) is used as a solvent. In this dielectric material (liquid crystal fine particle dispersion system, $\Delta n \times \Delta \epsilon$ was found as 2.2. Further, the thickness of the material layer 3, and distance between pectination electrodes 4 and 5 are adjusted to 10 μm and 3.31 μm, respectively. Note that, the refractive index anisotropy $\Delta n$ was measured by an Abbe refractometer (ATAGO Co. Ltd. "4T") at a wavelength=550 nm, and the dielectric constant anisotropy $\Delta \epsilon$ was measured by an impedance analyzer (Toyo Corporation "SI1260") at a frequency of 1 kHz.

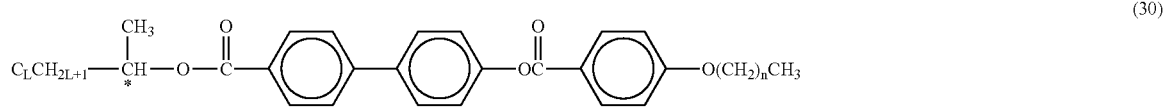

(30)

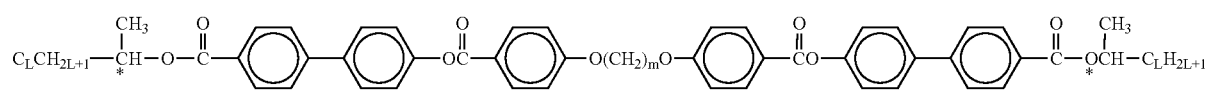

(31)

where L denotes one of integers 2-10, m denotes one of integers 2-14, and n denotes one of integers 0-6.

Note that, when the compound (39) and the compound (31) are mixed, they are preferably mixed according to the relation: 2×(n+1)=m. Further, the ratios of the compounds (39) and (31) may be changed accordingly. For example, when the same amounts of compounds (30) and (31) are mixed when L=6, m=6, n=2, the resulting mixture exhibits the phase (orderly structure (alignment order) smaller than the optical wavelength) similar to the smectic blue phase at a temperature range from 143° C. to 130° C. Further, when the compounds (30) and (31) are mixed at a ratio of 30:70 when L=6, m=6, n=2, the resulting mixture exhibits a phase Transmittance of the display element of the present embodiment thus created is measured at varied driving voltages. The maximum transmittance was obtained at a driving voltage of 26V (see FIG. 16).

Incidentally, according to "Handbook of Liquid Crystals", Vol.1, p.484-485, Wiley-VCH, 1998, the birefringence $\Delta n$ (E) generated by application of field is expressed as: $\Delta n(E) = \lambda BE^2$ where $\lambda$ denotes wavelength of light, B denotes Kerr constant, and E denotes strength of the applied field.

Further, with the change in birefringence, the transmittance T changes as follows: $T = \sin^2(\pi \times \Delta n(E) \times d/\lambda) = \sin^2(\pi BE^2 d)$. Here, d denotes thickness of the material layer 3.

Therefore, according to this formula, the transmittance becomes maximum when $\pi BE^2 d=\pi/2$.

Further, the relation: $\Delta B=\Delta n(E)/\lambda E^2=\Delta nQ(E)/\lambda E^2$ is found according to the foregoing formula. Here, Q (E) denotes alignment order parameter.

Further, [Handbook of Liquid Crystals ], Vol.1, p.484-485, Wiley-VCH, 1998 describes the relation: $Q \propto \Delta \epsilon \times E^2$.

Therefore, the driving voltage V for obtaining the maximum transmittance is expressed as: $V=ES=S \times sqrt(1/(2 \times B \times d) \propto S \times sqrt(1/(\Delta n \times \Delta \epsilon) \times d)$ where S denotes the distance between the pectination electrodes 4 and 5.

Figure 16:
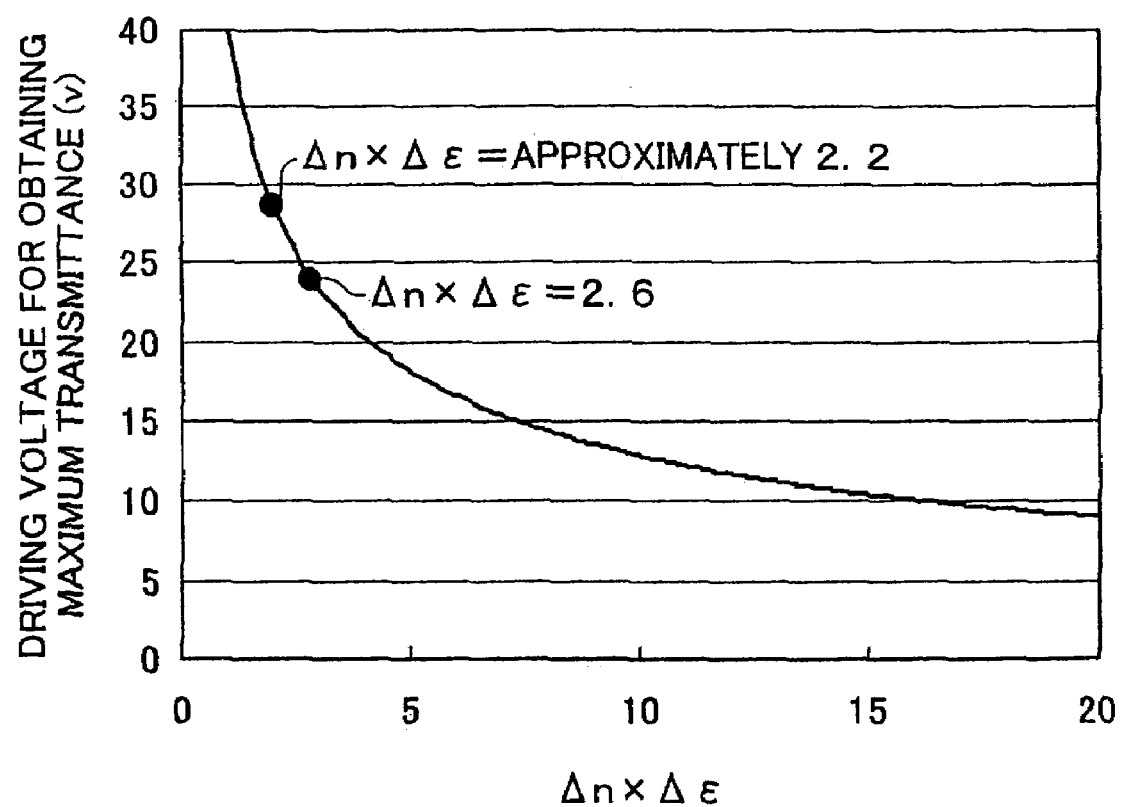
FIG. 16 shows the relation between $\Delta n \times \Delta \epsilon$ and the voltage value (V (V)) for obtaining the maximum transmittance, which relation is figured out according to the voltage-transmittance characteristic of the display element comprising the foregoing material, and the formula showing the relation of the driving voltage and $\Delta n \times \Delta \epsilon$.

According to the result above, FIG. 16 shows the relation between $\Delta n \times \Delta \epsilon$ and the voltage value (V (V)) for obtaining the maximum transmittance, which relation is figured out according to the voltage-transmittance characteristic of the display element comprising the foregoing material, and the formula showing the relation of the driving voltage and $\Delta n \times \Delta \epsilon$.

As shown in FIG. 16, when the dielectric material satisfying $\Delta n$ (refractive index anisotropy)$\times \Delta \epsilon$(dielectric constant anisotropy)=not less than 2.6 is used, and the thickness of the material layer 3 and distance between pectination electrodes 4 and 5 are adjusted to 10 μm and 3.3 μm, respectively, the maximum transmittance was obtained by a driving voltage=24V.

When the display element of the present embodiment is adopted for an active-matrix display device, a switching element (TFT element) is provided for ON/OFF control of a field supplied to the pectination electrodes 4 and 5. Then, a gate electrode having optimal thickness and quality is provided in the switching element (TFT), and the withstand voltage to be applied to the gate voltage was measured, which was found as 63V. Accordingly, the maximum voltage value allowed to be supplied to the material layer 3 was found as 48 Vpp by subtracting the voltage (10V) when the gate voltage has a low potential (when the gate voltage is ON) and the voltage (−5V) when the gate voltage has a low potential (when the gate voltage is OFF) from the withstand voltage (63−10−5=48 Vpp (peak-to-peak)). As the effective value (rms: root-mean-square), this maximum value is expressed as: ±24V.

Accordingly, when the thickness of the material layer 3 and distance between pectination electrodes 4 and 5 are adjusted to 10 μm and 3.3 μm, respectively, the maximum transmittance can be obtained by using the dielectric material satisfying $\Delta n$ (refractive index anisotropy)$\times \Delta \epsilon$(dielectric constant anisotropy)=not less than 2.6.

Note that, the following compound (32) is an example of the dielectric material satisfying $\Delta n$ (refractive index anisotropy)$\times \Delta \epsilon$(dielectric constant anisotropy)=not less than 2.6.

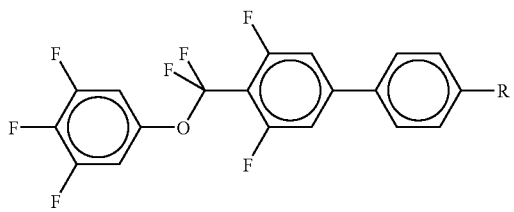

(32)

where R expresses an alkyl group. In this compound (32), $\Delta \epsilon$=approximately 25, $\Delta n$=approximately 0.15, and $\Delta n \times \Delta \epsilon$=3.75.

Further, in the display element of the present embodiment having pectination electrodes, reduction of the driving voltage for obtaining the maximum transmittance can be attained by decreasing the distance between those pectination electrodes. However, in consideration of manufacturing accuracy, process margin, process cost etc., there is a limit for reduction of the distance between the pectination electrodes.

Further, in the display element of the present embodiment having the pectination electrodes, further reduction of the driving voltage for obtaining the maximum transmittance can be attained by increasing the thickness of the dielectric layer 3. However, an increase in thickness of the material layer 3 is not necessarily completely proportional to an increase in thickness contributing the field application. Therefore, an increase in thickness of the dielectric later 3 from 10 μm is not always effective for reduction of the driving voltage.

Further, among the medium examples 1 through 8 described in the present embodiments, the medium(s) having the negative dielectric anisotropy may be used as the display element of Fourth Embodiment described below.

Further, the display element of the present embodiment may be expressed as a display element that at least has the following three arrangements: (i) the field is applied along the direction parallel to the surfaces of the substrates (horizontal field application), (ii) the medium sealed in the material layer 3 is a positive type liquid crystal (use of positive type liquid crystal), (iii) the alignment films formed on the two substrates are rubbed in parallel directions to each other (parallel rubbing), and (iv) an alignment auxiliary material is formed on the material layer 3 for promoting alignment of molecules (polymer fixing).

Further, the medium of the present invention is not limited to those described in Mediums Examples above. For example, a medium having a large orderly structure, which is not likely to be suitable for the present invention, is however adaptable to the display element of the present invention by compulsively forming microdomains by the alignment auxiliary material. For example, by forming an alignment auxiliary material (micro structure) in the medium with the described polymer network, gelatinizer, or micropore film, the optically isotropic condition may be created even in a Nematic phase or a cholesteric phase.

One example of the polymer network may be a micro polymer network that is formed from 5CB, comprising an acrylate monomer exhibiting the isotropic phase, through ultra violet irradiation. Then, after such formation of a polymer network, temperature is decreased to induce a Nematic phase, that however results in greatly defective alignment because of the micro polymer network. More specifically, if the polymer network is formed with a scale smaller than optical wavelength, an optically isotropic Nematic phase is exhibited instead of general Nematic alignment with a single axis alignment. Further, when the optical isotropy is incomplete, thus causing slight light diffusion, a chiral agent may be added in advance. On this account, it is possible to produce a twisted structure in the microdomain formed in the polymer network, thereby reducing optical isotropy of the microdomain. Consequently, light diffusion can be reduced.

Fourth Embodiment

Yet another embodiment of the present invention is described below with reference to Figures. For ease of explanation, materials having the equivalent functions as those shown in the drawings pertaining to the foregoing First Embodiment will be given the same reference symbols, and explanation thereof will be omitted here.

Figure 17:
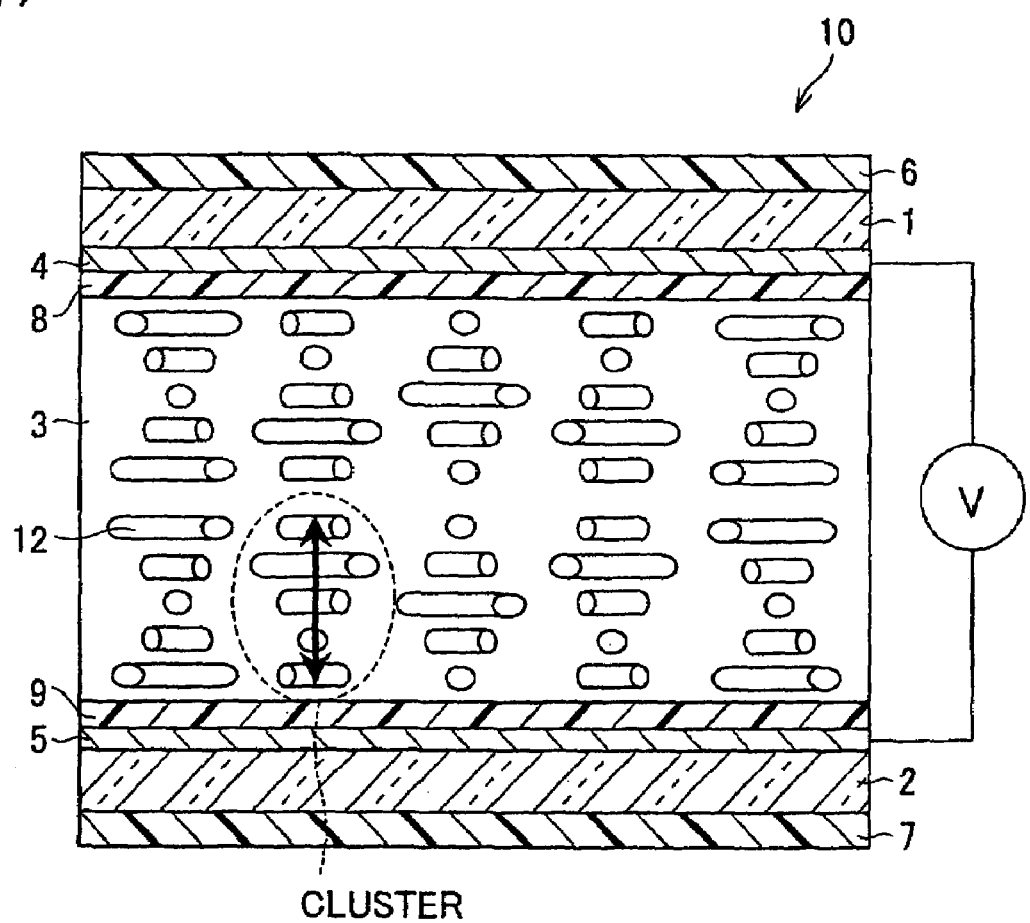
FIG. 17 is a cross-sectional view illustrating a schematic structure of a display element according to still another embodiment of the present invention.

The display element according to the present embodiment has the same structure as that of First Embodiment except that a different kind of medium is sealed in the material layer 3, and a chiral agent is added to the medium. FIG. 17 is a cross-sectional view illustrating a display element 10 of the present embodiment. Note that, the alignment auxiliary material 11 is omitted from the figure.

Note that, in the present embodiment, the alignment films 8 and 9 are each formed form a JALS-1048 (polyimide), a product of JSR Co. Ltd. Further, the gap between the two substrates of the display element according to the present embodiment, that is the thickness of the material layer 3, was set to 1.3 μm.

The material layer 3 includes a medium made of a negative-type liquid crystal mixture. FIG. 17 shows an alignment condition of a liquid crystal molecule 12 which the negative-type liquid crystal mixture comprises. The negative-type liquid crystal mixture can be made of, for example, the liquid crystal materials (33) and (34) below.

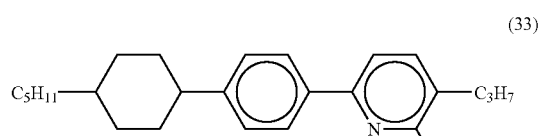

(33)

$\Delta n = 0.155, \Delta \varepsilon = -4.0$

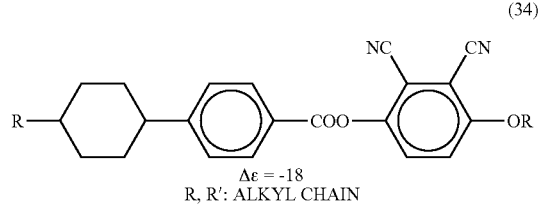

(34)

$\Delta \varepsilon = -18$
R, R': ALKYL CHAIN

In the state of Nematic phase, the negative-type liquid crystal material has a refractive index anisotropy $\Delta n=0.14$, a dielectric constant anisotropy $\Delta n=0.14$. The Nematic-isotropic phase transition temperature $(T_{ni})$ is 62° C.

Further, in the present embodiment, a chiral agent is added to the liquid crystal material. With its torsion ability (Helical Twisting Power), the chiral agent causes coupling of the liquid crystal molecules which the liquid crystal material comprises, thus forming a cholesteric phase having a twisted (helical) structure in which the angle of major axis of the molecule differs for each of the planes where the liquid crystal molecules are aligned. In the present embodiment, the chiral agent was S811 (E. Merck Co. Ltd) that is denoted by the structural formula (35) below.

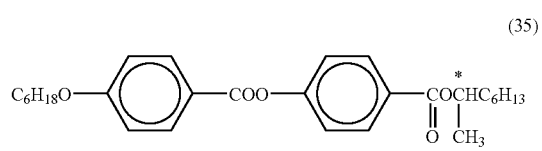

(35)

The mixture (chiral-agent-contained liquid crystal material) of the chiral agent S811 and the negative-type liquid crystal material was prepared by adjusting the concentration c of the chiral agent S811 to 30 wt %. Here, the Nematic-isotropic phase transition temperature $(T_{ni})$ of the mixture of the chiral agent S811 and the negative-type liquid crystal material was measured, which was found as 38° C. Since the transition temperature of the negative-type liquid crystal material alone was 62° C., it appears that the addition of chiral agent caused some kind of a decrease of coagulation point. In this case, the material layer 3 exhibits a cholesteric liquid crystal phase (chiral Nematic liquid crystal phase). Further, the voluntary torsion ability (natural chiral pitch) p was estimated for the chiral-agent-contained liquid crystal material injected in a cuneate cell through extrapolation, and found as 0.59 μm, that is near the wavelength of visible light. Here, the chiral (helical) pitch p and the chiral concentration c have the following relation denoted by the formula 1.

$$p=1/Ac \qquad (\text{Formula 1})$$

where A is a proportionally constant, that is an index denoting the torsion ability of a chiral agent called HTP (Helical Twisting Power). Accordingly, as the chital addition amount increases, the chiral pitch decreases. Further, the value of A differs depending on the type of the chiral agent and liquid crystal material (host liquid crystal material) to be mixed with.

Further, the display element 10 of the present embodiment was kept at a temperature near above $T_{ni}$, ($T=T_{ni}+0.1K$ in this example), by an external heating device (not shown), and then, a field was applied to the display element in the substrate normal direction (vertical-direction field). Since the material layer 3 includes a negative-type liquid crystal material and a chiral agent, and a horizontal alignment film is provided on the substrate boundary as shown in FIG. 17, the liquid crystal molecules of the display element 10 form clusters (small groups of molecules) with a twisted structure having either of the rightward twist or a leftward twist by application of a relatively low voltage. Further, it was found that the size of each cluster is close to the chiral (helical) pitch.

As described, in the display element 10 of the present embodiment, the twisted structure having either of the rightward twist or a leftward twist is expressed by a relatively low voltage. This is presumably because the display element 10 includes a horizontal alignment film that is formed in advance on the substrate boundary. As shown in the schematic view in FIG. 18, the material layer 3 exhibits optical isotropy in the bulk region when no field is applied, but the molecules on the substrate surface are aligned or adhered by the alignment control force of the horizontal alignment films 8 and 9 that is applied in the substrate in-plane direction. The molecule layer on the boundary is so thin compared to the cell thickness that it has no influence on the optical characteristic of the cell. Further, as shown in the figure, when a field is applied, the molecule layer aligned/adhered to the boundary cause the molecules inside the cell to be aligned in the substrate in-plane direction; and the twisted structure is expressed due to chirality of the chiral agent. Accordingly, the display element of the present embodiment expresses an optical anisotropy by a relatively low voltage.

The display element of the present embodiment is basically composed with a structure using a plate transparent electrode that is supplied with a vertical-direction field (substrate normal direction field); however, an Inter-digital electrode structure using a horizontal-direction field can also be driven by a lower voltage that that used for the structure without a chiral agent. Note that, in this case, the threshold voltage for expressing an optical isotropy and the driving voltage are not the same as those for the cell supplied with a field in a substrate normal direction as with the display element 10 of the present embodiment. However, the inventors etc. of the present invention found that the relative size or quality of the two structures with and without a chiral agent is the same as in the display element 10.

Further, temperature and threshold value (voltage for obtaining the maximum transmittance=5%) were measured for a comparison display element formed in the same structure as that of the display element 10 of the present embodiment however no addition of a chiral agent. As a result, there was no temperature range where the threshold becomes flat with respect to the change in temperature. On the other hand, in the display element 10 of the present embodiment, the threshold was substantially flat in the temperature range near above the phase transition point, that was approximately 0.5K. That is, in the display element 10 of the present embodiment, addition of the large amount (30 wt %) of chiral agent achieves enlargement of temperature range, thereby effectively expressing an optical anisotropy in the medium by field application, which exhibits the optical isotropy when no field is applied.

This indicates that, in the optical isotropic medium, there are regions (cluster) where the torsion ability of the chiral agents becomes effective in response to field application, the existence of the cluster with respect to an increase in temperature is stable, thus expressing an optical anisotropy at a wider temperature range.

Further, it was also found that such a temperature range with a flat threshold is enlarged with an increase of addition amount of the chiral agent, and that the lower limit of the concentration of the chiral agent to enlarge the temperature range was 30 wt %. Further, the liquid crystal material in which a large amount of chiral agent is added may exhibit a cholesteric blue phase as described, e.g., by S. Chandrasekhar, "The Physics of Liquid Crystals", published by YOSHIOKA SHOTEN, 1995, p.330, 2nd original edition, translated by Hatsuo Kimura and Mamoru Yamashita.

Figure 19:
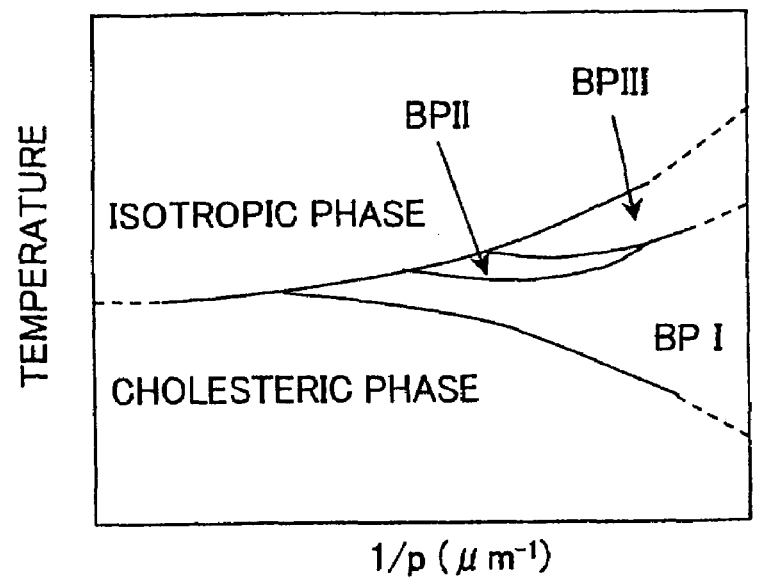
FIG. 19(a) is a graph showing a change in phase condition with respect to the chiral pitch and the temperature for a cholesteric blue phase.
FIG. 19(b) is an explanatory view illustrating a Double Twist Cylinder (DTC) structure formed in a cholesteric blue phase.
Figure 19:
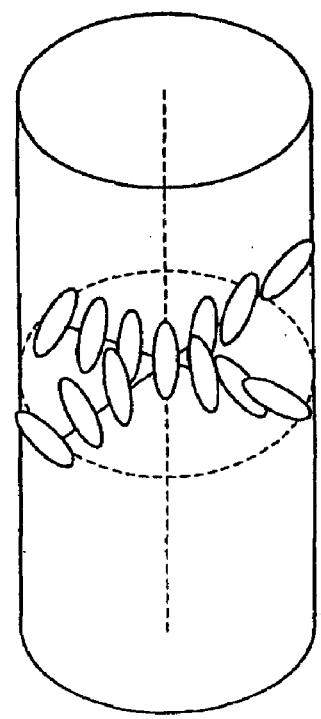

FIGS. 19(*a*) and 19(*b*) are views for explaining a cholesteric blue phase, FIG. 19(*a*) is a graph showing a change in phase with respect to the chiral pitch and the temperature, and FIG. 19(*b*) is an explanatory view showing a Double Twist Cylinder (DTC) structure formed in the cholesteric blue phase.

As shown in FIG. 19(*a*), the cholesteric blue phase is expressed as an intermediate phase between the isotropic phase (isotropic phase) and the cholesteric phase. The expression is greatly related to a chiral agent, and a cholesteric blue phase is expressed when the chiral pitch p is decreased from the condition for exhibiting an isotropic phase and go lower than a certain critical pitch.

Academic analysis of blue phase has been extensively attempted, but much is still unknown about the blue phase. Further, it is said that there are some different kinds of the cholesteric blue phase, that are called BPI, BPII and BPIII in order from lower to higher temperature. In the cholesteric blue phase, due to the proximal torsion ability of the chiral agent, there is a tube-like structure called a Double Twist Cylinder (DTC) in the region under influence of the torsion ability of the chiral agent (see FIG. 19(*b*)). This tube-like structure is generated by antagonism between the torsion ability of the chiral agent and the continuous elastic property of the liquid crystal molecules for making continuous alignment. The outside of this tube-like structure has no influence of the torsion ability of the chiral agent, and therefore has alignment defect (Disclination). Further, some X-ray analysis has revealed that the tube-like structure has a three-dimensional period structure such as a body-centered cubic structure (see the center figure in FIG. 15 showing the position of Disclination) or a face-centered cubic structure.

In the present embodiment, no minute analysis was carried out for the phase structure of the display element 10, but it may be assumed that the element exhibits one of the cholesteric blue phases described in the foregoing documents. This blue phase is expressed in a certain temperature range, which indicates that a certain optical characteristic (for example, consistencies of the threshold or the voltage for obtaining the maximum transmittance) is expressed in that temperature range. The display element of the present embodiment at least needs the described optical characteristic at a wider temperature range, and it is also allowable if the characteristic is caused by a cholesteric blue phase. More specifically, the medium sealed in the material later 3 may exhibit a cholesteric blue phase or a smectic blue phase exhibiting the foregoing smectic phase. Further, the optical characteristic may be caused by the formation of clusters induced by the addition of a large amount of chiral agent, as mentioned above.

According to these facts, the display element 10 of the present embodiment can be driven by a low voltage, and also achieves efficient use of light, thus performing bright display. Further, for the display element 10 according to the present embodiment, i.e., for the medium made of a mixture of the chiral agent S811 and the negative-type liquid crystal material, when the concentration of the chiral agent is at least 30 wt %, the element can be driven by a low voltage and achieves efficient use of light, thus performing bright display. This is because, in the display element 10 according to the present embodiment, the concentration of the chiral agent, 30 wt % or greater, makes the chiral pitch to be in the visible wavelength or less. Therefore, for the medium made of the mixture of the chiral agent S811 and the negative-type liquid crystal material, it was concluded that the concentration of the chiral agent of at least 30 wt % is most appropriate; however, a more important point here is the chiral (helical) pitch of the final chiral-agent-contained liquid crystal equal to or less than the wavelength range of visible light. With this arrangement, even with other mediums than the medium made of the mixture of the chiral agent S811 and the negative-type liquid crystal material, it is possible to create a display element that can be driven by a low voltage and achieves efficient use of light, as with the display element described in the present embodiment.

Next, the inventors of the present invention researched for the reason why the display element 10 of the present embodiment extracts light. The liquid crystal material etc. comprising a large amount of chiral agent, such as the one used for the medium in the display element 10 of the present embodiment, is generally called an optical active material (for example, see "The Dictionary of Physics", edited by the Dictionary of Physics Editors Commission, 1992, Baifukan, p.631).

FIG. 20 is an explanatory view schematically showing the mechanism of the optical activity. In this explanation, as shown in the figure, a linear polarized light was used. The linear polarized light can be divided into a right circular polarized light and a left circular polarized light that are equal in phase and amplitude. When these circular polarized lights are incident on the optical active material, the refractive index of the optical active material differs in the right and left circular polarized lights due to its specific crystal structure or the twisted (helix) structure. Note that, in FIG. 20, for simplicity, the refractive index of the right circular polarized light is expressed as $n_+$ and the refractive index of the left circular polarized light is expressed as $n_-$. As shown in the figure, when the circular polarized lights are emitted from the optical active material, a difference occurs between the phases of the right circular polarized light and the left circular polarized light by an amount according to the difference between the refractive indices of $n_+$ and $n_-$, the thickness d of the optical active material etc. Further, synthesis of the right circular polarized light and the left circular polarized light creates a linear polarized light again, however the polarization orientation is turned in the resulting light by a certain angle from that of the linear polarized light upon radiation. Accordingly, by placing the upper and lower polarizers 6 and 7 to be orthogonal to each other (cross nicols configuration), as with the display element 10 of the present embodiment, it allows light to transmit through. The inventors thus found the light extracting mechanism of the display element 10 of the present embodiment. Note that, a example of the optical active material may be, for example, sucrose, camphoric aqueous solution, crystal parallel flat plate cut by a line perpendicular to the light axis, a metallic chelating complex compound, an organic compound having a chiral carbon, a biopolymer having a helix structure, a cholesteric liquid crystal, Rochelle salt, a crystal with a helical structure such as serene, tellurium etc., tartaric acid, and glucose solution.

Further, in addition to the negative-type liquid crystal mixture, appropriate amounts of a photopolymerizable monomer (polymerizable compound) and a polymerization initiator are added to the material layer 3 of the display element 10 of the present embodiment. The display element 10 in this condition is then subjected to ultra violet (UV) light irradiation in the state where the liquid crystal mixture exhibits a Nematic phase, thereby forming a polymer chain (alignment auxiliary material) 11 in the cell.

In this case, since the UV irradiation is performed with the liquid crystal mixture exhibiting a Nematic phase, the liquid crystal molecules, that are aligned along the alignment direction of the alignment films 8 and 9, are all twisted into inside the cell in accordance with torsion direction of the chiral agent and are fixed in the twisted state. More specifically, the polymer chain 11 is formed into a certain-sized three-dimensional wall shape that surrounds the twisted liquid crystal molecules. Here, the size of the region surrounded by the polymer chain 11 is determined depending on the amount of the photopolymerized monomer added in the layer or the irradiation energy of UV light; however, to prevent a decrease in contrast due to light diffusion caused by mismatching of the refractive index of the polymer, and the refractive index of the liquid crystal molecule, the size of the capsule is preferably equal to or less than the wavelength of visible light.

As described, the alignment of the medium sealed in the material layer 3 is fixed in the Nematic phase state, and then the resulting medium is heated at a temperature for expressing the isotropic phase, that is near above the Nematic-isotropic phase transition temperature ($T_{ni}$ point) and within the temperature range for driving the display device 10 of the present embodiment. Consequently, the liquid crystal in each capsule is turned into an optical isotropic phase. A display element having not been through the foregoing fixing process has a very small temperature range for expressing an optical anisotropy (for example, about 1K) when a field is applied. However, as with the display element 10 of the present embodiment, a display element having a capsule structure or a network structure using a polymer ensures a certain effect of the wall of the polymer (anchoring effect of the polymer wall) even when the liquid crystal molecules are exhibiting an isotropic phase, thereby enlarging the temperature range. Therefore, it is possible to create a display element that can be driven in a wider temperature range.

Note that, as described, the alignment auxiliary material (fixing auxiliary material) for fixing the alignment condition of the medium sealed in the material layer 3 may be any one of the alignment auxiliary materials described in First through Third Embodiments. Further, the manufacturing method of the display element 10 according to the present embodiment may be performed in substantially the same manner as that described in First Embodiment.

Further, the medium sealed in the display element 10 of the present embodiment is not limited to the medium described above.

Further, as an alternative of the medium comprising a chiral agent at a proportion of 30 wt % or more, a material system comprising the Nematic liquid crystal E8, a product of BDH Co. Ltd. denoted by the following structural formula (36) that is mixed with a chiral agent CB15 denoted by the following structural formula (37) at a proportion of 42.5 wt %. The chiral pitch of the material system is 0.53 μm, that is within the wavelength range of visible light, that exhibits a cholesteric blue phase.

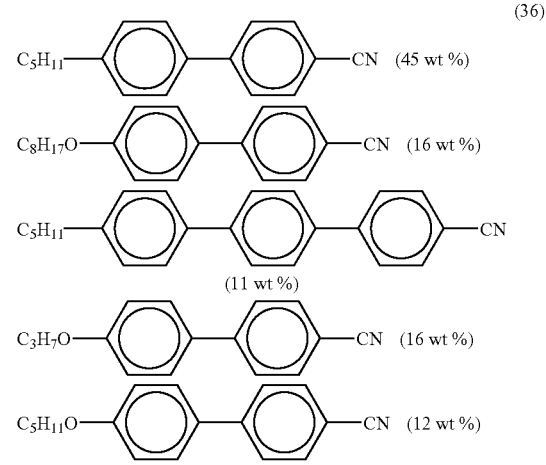

E8: Mixture of the Foregoing Five Kinds of Liquid Crystal

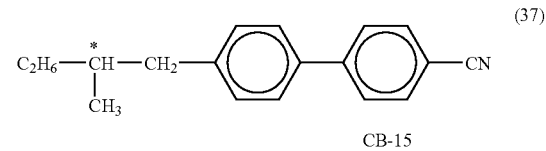

Further, the foregoing explanation mainly deals with a system in which a chiral material (chiral agent) is added to the liquid crystal material as the host material; however, the present invention is not limited to this structure, but the medium may have a chirality itself (chiral material). Further, the medium may be a banana-shaped (curved) liquid crystal material, which does not comprise an asymmetrical carbon atom (the molecules are not chiral), but becomes a chiral system due to the anisotropy from the molecule shape and the packing structure. The banana-shaped (curved) liquid crystal may be P8PIMB (see the structural formula (11) below), for example.

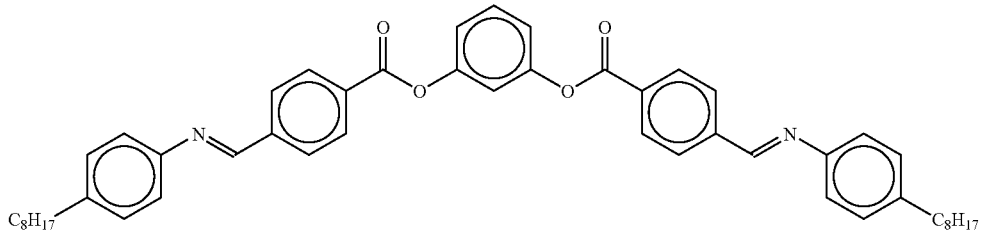

(11)

Further, the banana-shaped (curved) liquid crystal material is not limited to P8PIMB, but may be one having a curving portion (in the chemical structural formula) of a benzene ring such as phenylene group or the like; otherwise, it may be one coupled by a naphthalene ring, a methylene chain or the like. The compounds denoted by the structural formulas (12) through (15) below are examples of the banana-shaped (curved) liquid crystal.

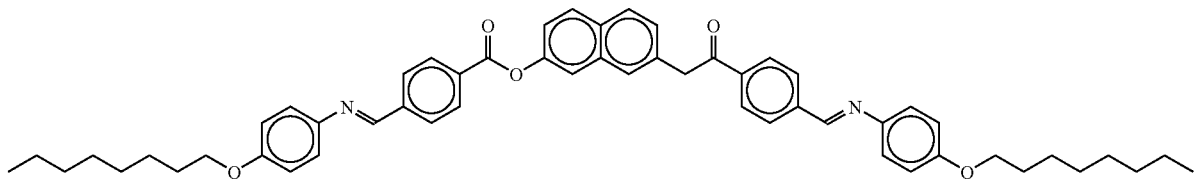

(12)

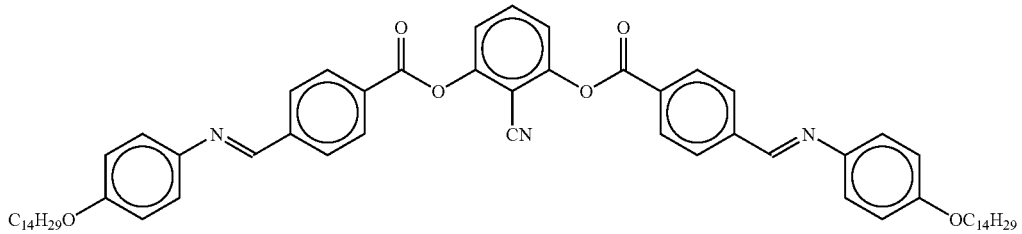

(13)

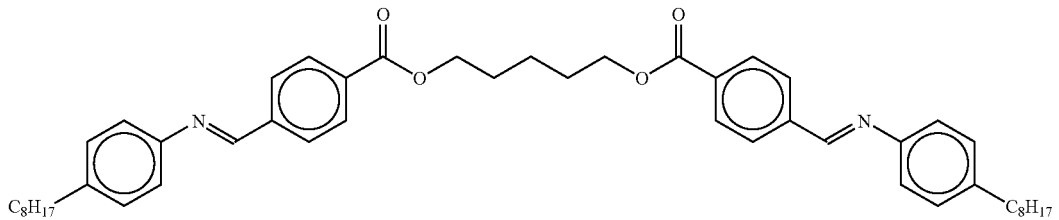

(14)

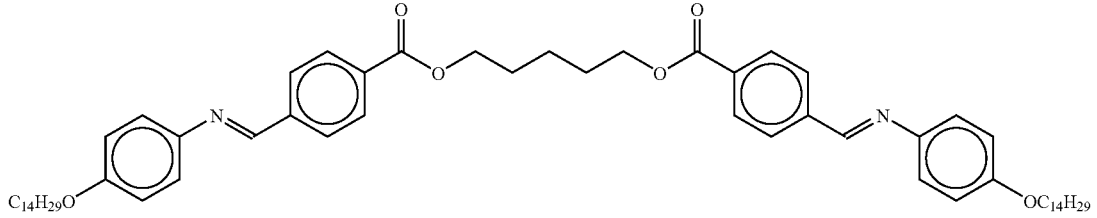

(15)

Further, the banana-shaped (curved) liquid crystal material may comprise an azo group. The compound denoted by the structural formula (16) below is an example of the banana-shaped (curved) liquid crystal.

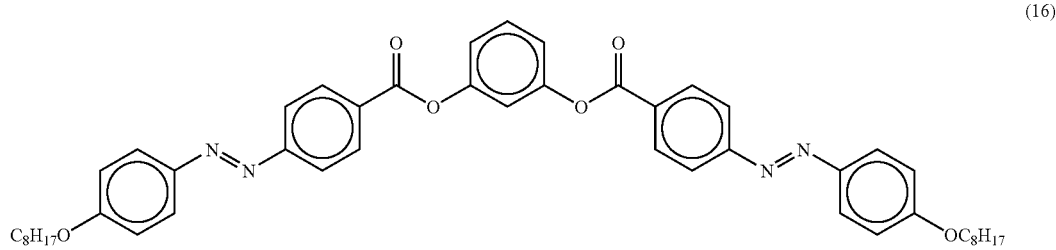

(16)

Further, the foregoing banana-shaped (curved) liquid crystal material has a horizontally symmetrical chemical structure in the bonding portion, but may instead have a horizontally asymmetrical chemical structure in the bonding (curving) portion. The compound denoted by the structural formula (17) below is an example of the banana-shaped (curved) liquid crystal.

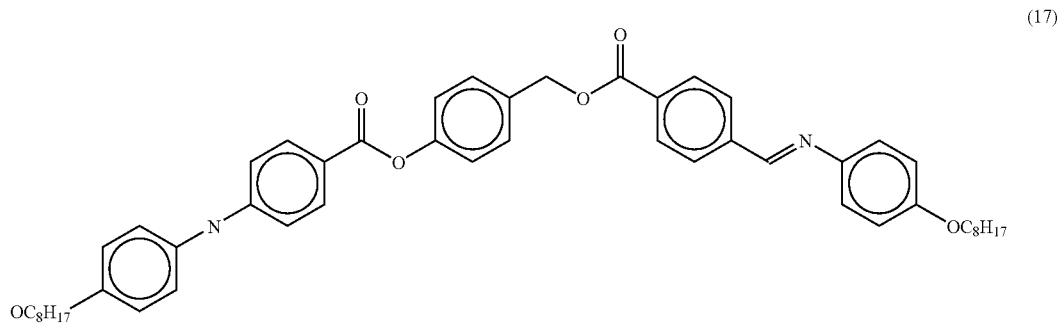

(17)

Further, though the foregoing banana-shaped (curved) liquid crystal molecules do not comprise a chiral carbon, it may comprise one or more chiral carbon(s). The compound denoted by the structural formula (18) below is an example of the banana-shaped (curved) liquid crystal.

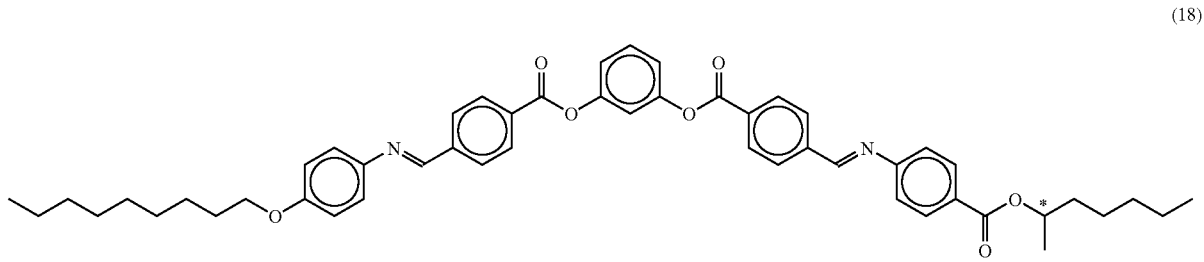

(18)

Further, the display element of the present embodiment may be expressed as a display element that at least has the following three arrangements: (i) the field is applied along the substrate normal direction (vertical field application), (ii) the medium sealed in the material layer 3 is a negative type liquid crystal, (iii) the alignment films are formed on the respective surfaces of the two substrates, and either of (iv) an alignment auxiliary material is formed on the material layer 3 for promoting alignment of molecules (polymer fixing) when a field is applied, or (v) the material layer 3 is kept in a small region.

Otherwise, the display element of the present embodiment may be expressed as a display element having the following two arrangements: (i) the field is applied along the substrate normal direction (vertical field application), (ii) the medium sealed in the material layer 3 is a negative type liquid crystal comprising a chiral material.

Fifth Embodiment

Still another embodiment of the present invention is described below with reference to Figures. For ease of explanation, materials having the equivalent functions as those shown in the drawings pertaining to the foregoing Embodiments will be given the same reference symbols, and explanation thereof will be omitted here.

The display element according to the present embodiment has the same structure as that of the display element 30 of Third Embodiment except for the medium sealed in the material layer 3, and the gap between the substrates 1 and 2.

More specifically, in the display element of the present embodiment, a medium made of a transparent material 4'-n-alkoxy-3'-nitrobiphenyl-4-carboxylic acids (ANBC-22), that is mixed with an organic fine particles with a concentration of 0.05 wt %-0.1 wt %, is used as the medium sealed in the material layer 3. ANBC-22 is denoted by the following chemical structural formula (21), where n=22.

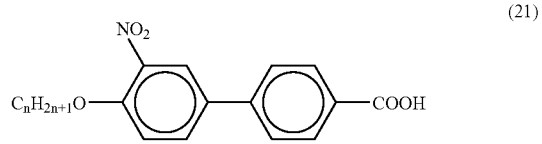

(21)

Further, the substrates 1 and 2 are each made of a glass substrate, and the gap therebetween comprises some beads dispersed so that the gap has a 4 µm thickness. That is, the thickness of the material layer 3 is adjusted to 4 µm.

The pectination electrodes 4a and 5a are transparent electrodes made of ITO. Further, polyimide alignment films having been rubbed are formed on the inner surfaces (opposed surfaces). The rubbing was performed in the same direction as that in Third Embodiment, that is shown in FIG. 14. Note that, the rubbing direction is not limited to this, but the rubbing is preferably performed in consideration of making the medium sealed in the dielectric layer 3 to be in a light state when the medium is exhibiting a smectic C phase; typically, it is preferable that the rubbing direction creates an 45° angle with the axis of the polarizer. Note that, the alignment film on the substrate 1 is formed by covering the pectination electrodes 4a and 5a.

As shown in FIG. 14, the polarizers 6 and 7 are provided on the other sides of the substrates 1 and 2, i.e., the other sides then the opposed surfaces. Here, the polarizers 6 and 7 are bonded so that their absorption axes are orthogonal to each other, and the directions to which the pectination portions of the pectination electrodes 4a and 5a extend and the absorption axes of the polarizers 6 and 7 respectively make 45° angles.

The display element thus obtained exhibits a smectic C phase at a temperature less than the smectic C phase-cubic phase transition temperature. Note that, the smectic C phase expresses an optical anisotropy when no field is applied.

The display element thus prepared is kept at a temperature near above the smectic C phase-cubic phase transition temperature (that is, at a temperature ranging from the phase transition temperature to −10K of the phase transition temperature) by using an external heating device, so as to allow the element to change in transmittance, that was caused by field application (application of an alternating field of approximately 50V (frequency was larger than 0, up to several hundreds kHz) between the pectination electrodes 4a and 5a. More specifically, the smectic C phase (light state), that had exhibited an optical anisotropy when no field is supplied, was caused to exhibit an isotropic cubic phase (dark state) by field application. That is, the display element exhibits optical anisotropy when no field is applied, and exhibits optical isotropy when a field is applied. Note that, here, the refractive index ellipsoid changes from an ellipsoid into a sphere.

Further, the respective angles created by the absorption axes of the polarizers and the pectination electrodes are not limited to 45°, and the display was successfully carried out at varied angles from 0° to 90°. This is because the medium is in a light state when no field is applied, more specifically, this condition of light state is achieved by the relation of the rubbing directions of the alignment films and the absorption axes of the deflector plates.

Further, this display element creates the dark state by the field induction phase transition into the optical isotropy of the medium due to field application, and therefore, it is only required that the absorption axes of the polarizers are orthogonal to each other, and the relation between the absorption axes of the polarizers and the directions of the pectination electrodes does not contribute to the display.

Therefore, the alignment treatment (rubbing treatment) is not always required, and display may also be performed by an amorphous alignment state (random alignment state).

Further, the effect achieved by the foregoing arrangement in which one of the substrates includes the pectination electrodes 4a and 5a can be obtained by an arrangement in which the substrates 1 and 2 are each provided with an electrode and an electric filed is applied in the substrate normal direction. In other words, substantially the same effect can be obtained by field application in the horizontal direction with respect to the substrate surface, and also by field application in the normal substrate direction.

As described, the medium sealed in the material layer 3 may be a medium that exhibits optical anisotropy and loses the optical anisotropy in response to field application, thereby exhibiting optical isotropy.

Further, the alignment orderly structure upon field application of the molecules which the medium (medium made of the foregoing mixture material) sealed in the material layer 3 comprises may be fixed by forming a large number of small regions (microdomains) in the material layer 3 by an alignment auxiliary material. Further, a polymerizable monomer (e.g., photopolymerizable monomer, such as acrylate-type monomer), or a polymerizable monomer with a polymerization initiator may be added to the medium sealed in the material layer 3 to cause polymerization. More specifically, the optically isotropic orderly structure upon field application may be fixed by the polymer (alignment auxiliary material). Further, the orderly structure of optical anisotropy upon field application may be fixed by the alignment auxiliary material, such as fine particles, porous structure material, hydrogen bonding-material or the like.

Further, the present embodiment uses the mixture material of ANBC-22 and the organic-type fine particles; however, the present invention is not limited to this medium. A similar effect to that achieved by the use of the foregoing mixture material can be obtained by any mediums that exhibits optical anisotropy when no voltage is applied and loses the optical anisotropy in response to field application, thereby exhibiting optical isotropy. Further, the medium sealed in the material layer 3 at least needs to be a medium that exhibits optical anisotropy and loses the optical anisotropy in response to field application, thereby exhibiting optical isotropy. Thus, it does not always have to be a mixture material.

Further, the medium used in the material layer 3 of the display element of the present embodiment may have a positive dielectric anisotropy or a negative dielectric anisotropy. Any one of the described mediums in Embodiments may be adopted. When a medium with a positive dielectric anisotropy is used, the driving needs to be performed with a field substantially in parallel with the substrate. For example, the driving may be performed by a field in an oblique direction of the substrate, or by a vertical field. In this case, the two opposed substrates (substrates 1 and 2) are each provided with an electrode, and a field is applied to the material layer 3 by applying a field between the two electrodes.

Further, the shape., the material, the number of electrodes, the position may be changed according to the condition in all cases of applying a field in the parallel direction of the substrate surface, or applying it in the vertical direction or an oblique direction with respect to the substrate surface. For example, in terms of aperture ratio, it is preferable that field application is performed by a transparent electrode in the vertical direction to the substrate surface.

The display device of the present invention is characterized by including one of the foregoing display elements. More specifically, the display device includes a display element that changes in degree of optical isotropy in response to voltage application. For example, in the case of display element that exhibits optical isotropy when no field is applied, and exhibits optical anisotropy when a field is applied, the refractive index ellipsoid changes from a sphere to an ellipsoid. On the contrary, in the case of display element that exhibits optical anisotropy when no field is applied, and exhibits optical isotropy when a field is applied, the refractive index ellipsoid changes from an ellipsoid into a sphere. On this account, it is possible to realize a display device that performs display with lower driving voltage, which also can be driven in a wider temperature range.

Further, in the foregoing embodiments, the change in degree of optical anisotropy of the medium is mainly induced by application of field; however, the present invention is not limited to this structure. For example, the change in degree of optical anisotropy may be changed by application of other external field than electric filed, that is to say, the degree may be changed according to whether an external field is applied or not. In other words, the present invention may be a display element comprising: a pair of substrates, at least one of which is transparent; a material layer, provided between the substrates, to which an external field (field) is applied in order to perform display operation, the material layer including (a) a medium whose optical anisotropy degree is changeable by field (field) application, and (b) an alignment auxiliary material. With this arrangement, it is possible to realize a display element that can be driven by a low level field.

For example, a magnetic field may be applied instead of a field. In this case, due to the magnetic anisotropy of the medium, the optical anisotropy of the medium is changed according to whether a magnetic field is applied or not. In this view, the medium preferably have a great magnetic susceptibility.

In the case of organic molecules, contribution to magnetic susceptibility almost entirely depends on diamagnetic susceptibility, and therefore, the absolute value increases due to circular movement of n electrons that is induced by the change in magnetic field. Therefore, when the molecule comprises an aromatic ring, the absolute value of the magnetic susceptibility increases when the aromatic ring is aligned in the perpendicular direction to the magnetic field. In this case, the absolute value of magnetic susceptibility in the horizontal direction of the aromatic ring is smaller than that in the vertical direction, and therefore the anisotropy of magnetic susceptibility increases. Therefore, it is preferable to use a medium with molecules having a ring-structure such as a six-membered ring.

Further, to increase optical anisotropy of magnetic susceptibility, it is preferable to align the electron spins in the medium. By incorporating electron spins of radicals of N, O, NO etc. in the molecules, stable spinning is ensured in the molecules. Such a parallel alignment of the spins may be realized by stacking the conjugating molecules on a plane, for example. One of suitable examples is a discotic liquid crystal whose column is made up of the central core portions stacked on each other.

Further, light can be used as the external field for changing the degree of optical anisotropy of the medium. In this case, the wavelength of light as an external field is not specified. However, for example, the change in degree of optical anisotropy of medium may be induced by irradiation of light of 532 nm emitted from a Nd: YAG laser.

The medium used in this case is not limited but any medium that causes a change in optical anisotropy by light irradiation. For example, a similar medium to that of the foregoing medium examples using a field may be used. One suitable example is the pentylcyanobiphenyl (5CB).

Further, when light is used as an external field, it is preferable that the medium comprises a small amount of dye. Addition of a small amount of dye increases a change in degree of optical anisotropy than the medium not comprising dye. Note that, the content of dye in the medium is preferably not less than 0.01 wt % and not more than 5%. This is because, dye in an amount of less than 0.01 wt % hardly contribute a change in degree of optical anisotropy, and dye in an amount of more than 5% absorbs the excitation light.

For example, to be used as a medium, pentylcyanobiphenyl (5CB) may be used without any processing, and also may be mixed with dye. This dye does not have to be particular kinds but preferably one with an absorption band including the wavelength of excitation light. One example may be 1AAQ (1-amino-anthroquinone (product of Aldorich) see the chemical structural formula below).

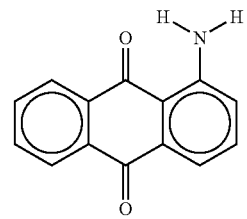

By mixing 0.03% of 1AAQ to the pentylcyanobiphenyl (5CB), a change in degree of optical anisotropy induced by light excitation becomes 10 times the change in the 5CB before 1AAQ is mixed.

Further, in the foregoing display element, the means for generating the optical anisotropy may be field, magnetic field, light. Among these, the field is particularly preferred in terms of designing of display element, and driving control.

Accordingly, the display element may include field applying means such as an electrode or magnetic field applying means such as an electromagnet that function as external field applying means. Further, field applying means is particularly preferred for this external field applying means in terms of designing of display element, and driving control.

Note that the external field applying means of the present invention is not particularly limited to the foregoing example but may be any means for changing the degree of the optical anisotropy of the medium depending on whether or not the external field is applied. For example, the external field applying means may be the field applying means (such as an electrode or the like) and magnetic field applying means (such as an electromagnet or the like), a laser device, light radiating means (excitation light generating means) such as the above-mentioned Nd:YAG laser and the like.

Therefore, in the present invention, the external field applying means may be either included in the display element or provided separately from the display element.

That is, a display device according to the present invention may comprise the display element including the external field applying means, or may separately comprise the display element and the external field applying means. In other words, the display device of the present invention may be made up of a display element, and external field applying means for applying an external field to a medium of the display element.

Further, the medium sealed in the material layer 3 may be any medium that causes a change in degree of optical anisotropy by application of an external field. Therefore, in the display element of the present invention, the medium changeable in optical anisotropy may be a medium that is changed in orderly structure (alignment order) in response to application of an external field, thereby changing its degree of optical anisotropy.

For example, the medium may be a medium that is optically isotropic when no external field is applied, but becomes optically anisotropic by application of external field. More specifically, the medium may be one having an orderly structure smaller than optical wavelength when no external field is applied, which orderly structure is changed by application of external field, that further changes degree of optical anisotropy of the medium. In this case, the refractive index ellipsoid has a round shape when no external field is applied, and becomes elliptical by application of external field.

Further, the medium may be a medium that is optically anisotropic when no external field is applied, but becomes optically isotropic by application of external field. More specifically, the medium may be one having an orderly structure exhibiting optical anisotropy when no external field is applied, which orderly structure is changed by application of external field, thereby exhibiting optical isotropy. In this case, the refractive index ellipsoid is elliptical when no external field is applied, and becomes round by application of external field.

Further, the medium may be a medium that is optically isotropic when no external field is applied, but is changed in degree of optically isotropy by application of external field. More specifically, the medium may be one having an orderly structure exhibiting optical isotropy when no external field is applied, which orderly structure is changed by application of external field, thereby changing degree of optical isotropy. In this case, the refractive index ellipsoid is changed in ratio between the major axis and the minor axis (the ellipsoid may be substantially round).

The display element of the present invention may be arranged so that an external field is applied to a medium held between the substrates, at least one of which is transparent, so as to perform display operation, wherein the orderly structure of the medium is changed by external field application, thereby changing the degree of optical anisotropy of the medium.

Note that, in the present invention, to change in the degree of the optical anisotropy of the medium by and according to external field applied on the medium indicates that, as described above, is to change the refractive index ellipsoid by and according to the external field applied on the medium. In the aforementioned arrangement in which the medium is optically isotropic when no external field is applied and the degree of its optical anisotropy is changeable by and according to the external field applied thereon, that is, in the arrangement in which the optical anisotropy of the medium is generated when the external field is applied, the shape of the refractive index ellipsoid is changed from the spherical shape to the ellipsoidal shape by and according to the external field applied thereon. On the other hand, in the arrangement in which the medium is optically isotropic when no external field is applied thereon, but becomes optically isotropic when the external field is applied, the shape of the refractive index ellipsoid is changed from the ellipsoidal shape to the spherical shape by and according to the external field applied thereon. Moreover, in the arrangement in which the medium is optical anisotropic when no external field is applied and the degree of its optical anisotropy becomes higher or lower by and according to the external field application, compared with the degree of its optical anisotropy attained when no external field is applied, a major axial length or a minor axial length of the refractive index ellipsoid is changed (extended or shortened) whereby a ratio between the major axial length and the minor axial length of the refractive index ellipsoid is changed between before and after the external field application (as a result, or example, curvature is changed). For example, in case where the degree of the optical anisotropy becomes higher when the external field is applied, the external field application causes the ellipsoid to have a larger ratio of its major axial length over its minor axial direction compared with the ratio attained when no external field is applied. In case where the degree of the optical anisotropy becomes lower when the external field is applied, the external field application causes the ellipsoid to have a smaller ratio of its major axial length over its minor axial direction compared with the ratio attained when no external field is applied (that is, the ratio gets closer to 1; the ratio in this case may be such a ratio with which the ellipsoid becomes substantially spherical).

In this case, unlike the conventional liquid crystal display element using the change in an alignment direction of liquid crystal molecules, viscosity peculiar to liquid crystal does not greatly influence the response speed, so that it is possible to realize higher response speed than that of the conventional liquid crystal display element.

Further, in this case, the medium has only to be kept at such a temperature that the medium shows a predetermined orderly structure when an external field is applied or when no external field is applied (a state in which the application of the external field distorts the orderly structure so that its optical anisotropy varies), so that it is easy to control the temperature. That is, according to the display device like Tokukai 2001-249363 which is based/on a conventional electric optical effect using electron deviation in polar molecules which is caused by the field application, its driving temperature range is limited to a vicinity of a liquid crystal phase transition point (for example, a temperature range of approximately 0.1K), so that very precise temperature control is required. In contrast, according to the foregoing arrangement, the medium has only to be kept at such a temperature that the medium shows a predetermined orderly structure when an external field is applied or when no external field is applied, so that it is easy to control the temperature.

Further, as the medium used in the display element of the present invention, any medium can be used as long as it is a medium whose degree of optical anisotropy varies by applying an external field, and such medium does not necessarily have to be a medium showing Kerr effect, i.e., a medium whose refractive index varies in proportion to square of the field.

In order to solve the foregoing problems, a display element of the present invention comprises a pair of substrates, at least one of which is transparent; a material layer between the substrates; and an electrode for applying a field on the material layer, in order to perform display operation, the material layer including (a) a medium whose optical anisotropy degree is changeable by field application, and (b) an alignment auxiliary material.

It is to be noted that the filed only needs to be able to change the degree of optical anisotropy of the medium and is not particularly limited but may be a field, a magnetic field, or light.

Further, the alignment auxiliary material functions to stabilize or expedite the alignment of the molecules in the bulk region. As long as the alignment auxiliary material has such an effect, the shape of the alignment auxiliary material is not to be particularly limited. Therefore, the alignment auxiliary material does not need to cover each small domain almost entirely, like a material described in the foregoing Japanese Laid-Open Patent Application Tokukaihei 11-183937, which divides a liquid crystal material into small domains.

The foregoing Japanese Laid-Open Patent Application Tokukaihei 11-183937 describes that the small domains may not necessarily be divided completely independently. However, in the technique of the foregoing Japanese Laid-Open Patent Application Tokukaihei 11-183937, the average diameter of each small domain inevitably becomes too large to exhibit optical isotropy unless each of the small domains is independently divided like a microcapsule in which each small domain of the liquid crystal material is almost entirely covered with the material which divides the liquid crystal material into the small domains. That is, according to the technique of the foregoing Japanese Laid-Open Patent Application Tokukaihei 11-183937, each small domain needs to be covered almost entirely.

Further, the material described in the foregoing Japanese Laid-Open Patent Application Tokukaihei 11-183937, which divides a liquid crystal into small domains is aimed only at suppressing the temperature dependency of Kerr constant. On the contrary, the alignment auxiliary material of the present invention is aimed at stabilizing and expediting the alignment of molecules at the time of change in degree of optical anisotropy in a medium. Therefore, the foregoing Japanese Laid-Open Patent Application Tokukaihei 11-183937 does not teach at all anything like the alignment auxiliary material of the present invention.

That is, when molecules (e.g., liquid crystal molecules) or an aggregation of molecules which a medium comprises are aligned along the alignment auxiliary material, the alignment direction thereof reflects the structure of the alignment auxiliary material to some extent. For example, when the alignment auxiliary material has a uniaxial alignment direction, the alignment of the molecules or the aggregation of the molecules which the medium comprises exhibits a uniaxial tendency to some extent. Meanwhile, the foregoing Japanese Laid-Open Patent Application Tokukaihei 11-183937 describes a spherical microdomain in which liquid crystal molecules aligned in the same direction when no voltage is applied or when a voltage is applied. Moreover, the microdomain is formed to reduce temperature dependency and therefore is not to stabilize or expedite the alignment of molecules or that of the aggregation of molecules at the time of changing the degree of optical anisotropy.

With this arrangement, the alignment auxiliary material, stabilizing or expediting the alignment of the molecules in the bulk region, helps the change in degree of optical anisotropy of the material layer that occurs in response to field application. On this account, the intensity of an external filed applied for display operation by the display element can be reduced.

The material layer is made of a medium that is changed in degree of optical anisotropy of the material layer according to whether an external field is applied or not. Here, the change in degree of optical anisotropy means a change in shape of refractive index ellipsoid. In other words, the display element of the present invention uses the change in shape of ellipsoid, that occurs in response to application of a field, to realize varied display states.

On the other hand, a conventional liquid crystal display element applies a field to a medium for display. In response to application of a field, the conventional liquid crystal display element causes no change in shape of refractive index ellipsoid but causes a change in direction of major axis of the ellipsoid. Specifically, the conventional display element uses the change in direction of major axis of ellipsoid, that occurs in response to application of a field, to realize varied display states. Accordingly, the display element of the present invention greatly differs in display principle from the conventional display element.

Thus, because the conventional liquid crystal display element utilizes the change in the alignment direction of liquid crystal molecules, the viscosity inherent in the liquid crystal has greatly affected the response speed. On the contrary, according to the foregoing arrangement, the change in degree of optical anisotropy in a medium is used for display. Therefore, according to the foregoing arrangement, unlike the conventional liquid crystal display element, there is little defect of the viscosity inherent in the liquid crystal that affects the response speed, thereby realizing high-speed response. Further, with this advantage of high-speed response, the display element according to the present embodiment is suitable for a display device using a field sequential color method or the like.

Further, a conventional liquid crystal display element utilizing an electro-optical effect suffers from a drawback in that the driving temperature range is limited to temperatures near the liquid crystal phase transition point, thereby requiring extremely highly precise temperature control. On the other hand, according to the foregoing arrangement, the medium only needs to be kept at a temperature at which optical anisotropy is changed in response to field application, thereby easing temperature control.

Further, the conventional liquid crystal display element utilizing the electro-optical effect suffers from a drawback in that it has advantages like a high-speed response property and a wide viewing angle property but also has a very high driving voltage. On the other hand, according to the foregoing arrangement, the alignment auxiliary material functions to stabilize or expedite the alignment of the molecules in the bulk region. This makes it possible for a smaller field to change the degree of optical anisotropy, thereby realizing a display element which can be driven by application of an external field at a practical level and which is provided with a high-speed response property and a wider viewing angle.

Further, in contrast to the conventional liquid crystal display element which changes the alignment of the liquid crystal molecules for performing display, the foregoing arrangement uses the change in degree of optical anisotropy in a medium for display, thereby realizing a wider viewing angle.

The alignment auxiliary material may promote change in the optical anisotropy degree in response to field application. On this account, the intensity of the field required for display operation can be reduced.

Further, the alignment auxiliary material may stabilize an orderly structure of the medium when the medium is optically isotropic. On this account, an orderly structure of the medium when the medium is exhibiting optical isotropy or optical anisotropy is stabilized, thereby reducing the intensity of the field required for display operation.

Further, the alignment auxiliary material may have a structural anisotropy. With this arrangement, the change in alignment direction of the molecules can be promoted by intermolecular interaction by the alignment auxiliary material. Therefore, provision of the alignment auxiliary material having the structural anisotropy is preferable for promotion of change in degree of optical anisotropy in response to field application.

Further, the foregoing display element may be arranged so that the material layer comprises a medium exhibiting a liquid crystal property, which medium is sealed therein; and the alignment auxiliary material is formed in the medium when the medium is in a liquid crystal phase.

With this arrangement, the alignment auxiliary material has more molecules aligned along the alignment direction of the molecules which the medium exhibiting a liquid crystal phase comprises, than the molecules aligned in other directions. Therefore, with the alignment auxiliary material, the molecules which the medium comprises are encouraged to be aligned in the same alignment direction as that in the liquid crystal phase. On this account, the change in degree of optical anisotropy in response to field application may be more securely promoted.

Further, the alignment auxiliary material may be optically isotropic when an external field is applied or when no field is applied.

With this arrangement, the alignment auxiliary material is isotropic at least when an external field is applied or when no field is applied, the transmittance under field application or under no field application does not decrease, thereby carrying out high-quality display.

Further, the, alignment auxiliary material may divide the material layer into a plurality of microdomains, and fixes an orientational orderly structure of the molecules which the medium comprises.

With this arrangement, the alignment order structure of the molecules which the medium sealed in the material layer comprises may be fixed by forming many microdomains (microdomains) in the material layer by the alignment auxiliary material. On this account, the material layer is caused to be optically isotropic either when no field is applied, or when a field is applied. Further, it is possible to obtain a wider temperature range of the material layer for exhibiting optical isotropy. On this account, this structure achieved enlargement of temperature range allowing low-intensity field driving even for a medium that has been incapable of low-intensity field driving at a practical temperature range, thereby significantly improving utility.

The display element of the present invention may comprise a pair of substrates, at least one of which is transparent; and a material layer between the substrates and may apply an external field on the material layer, in order to perform display operation, the material layer including (a) a medium whose optical anisotropy degree is changeable by field application, and (b) a hydrogen-bonded cluster.

With this arrangement, the change in degree of optical anisotropy by field application may be promoted by the hydrogen-bonding material.

The display element of the present invention may comprises a pair of substrates, at least one of which is transparent; and a material layer between the substrates and may apply an external field on the material layer, in order to perform display operation, the material layer including (a) a medium whose optical anisotropy degree is changeable by field application, and (b) particulates.

Further, in a system in which fine particles are dispersed in the material layer, the molecules which a medium comprises are aligned under influence of the boundaries of the fine particles. Accordingly, in the system with the dispersed fine particles, the dispersion ensures stable alignment condition of the dielectric materials, thereby promoting the change in degree of optical isotropy by field application.

The particulates may have an average particle diameter of 0.2 µm or less. With these fine particles whose average diameter is not more than 0.2 µm, stable particle dispersion is ensured in the material layer, thereby preventing aggregation of the fine particles or separation of the phase even after a long time. Therefore, it securely avoids possible defects from the fine particles, such as partial uneven concentration due to precipitation of fine particles, that may result in unevenness in display.

Further, the particulate content is in a range of from 0.05 wt % to 20 wt % with respect to a sum of weight of the particulates and the medium in the material layer. By adjusting the particle content in the material layer to 0.05 wt % to 20 wt %, aggregation of the fine particles may be suppressed.

The display element of the present invention may comprise a pair of substrates, at least one of which is transparent; and a material layer between the substrates and may apply an external field on the material layer, in order to perform display operation, the material layer including (a) a medium whose optical anisotropy degree is changeable by field application, and (b) a polymer formed by polymerization of a polymerizable compound.

The polymer content may be in a range from 0.05 wt % to 15 wt % with respect to a sum of weight of the medium comprising the polymer and the material layer. By adjusting the polymer content in the material layer to 0.05 wt % to 15 wt %, the change in degree of optical anisotropy by filed application can be expedited. When the polymer content is less than 0.05 wt %, the function as an alignment auxiliary material (exhibits a weak alignment controlling force) decreases. Also, when the polymer content is more than 15 wt %, a larger amount of external field needs to be applied on the alignment auxiliary material, thereby increasing the intensity of the field required for driving.

Further, the polymer (alignment auxiliary material) may be any one of a chain polymer, a reticular polymer, and a ring polymer. Further, the polymer may be structurally isotropic. With this arrangement, the change in alignment direction of the molecules can be promoted by intermolecular interaction by the polymer (alignment auxiliary material), or the alignment of the molecules in the bulk region can be stabilized. Therefore, provision of the polymer (alignment auxiliary material) having the structural anisotropy is preferable for promotion of change in degree of optical anisotropy in response to field application.

Further, the foregoing display element may be arranged so that the material layer comprises a medium exhibiting a liquid crystal phase; and the polymer is polymerized in the medium when the medium is in a liquid crystal phase.

With this arrangement, the polymer (alignment auxiliary material) has more molecules aligned along the alignment direction of the molecules which the medium exhibiting a liquid crystal phase comprises, than the molecules aligned in other directions. Therefore, with the polymer (alignment auxiliary material), the molecules which the medium comprises are encouraged to be aligned in the same alignment direction as that in the liquid crystal phase in response to field application. On this account, the change in degree of optical anisotropy in response to field application may be more securely promoted.

Further, it is preferable that the polymer is optically isotropic when an external field is applied or when no field is applied.

With this arrangement, the polymer is isotropic at least when an external field is applied or when no field is applied, the transmittance the medium under field application or under no field application does not decrease, thereby carrying out high-quality display.

Further, the polymer may divide the material layer into a plurality of microdomains, and fixes an orientational orderly structure of the molecules which the medium comprises.

With this arrangement, the alignment order structure of the molecules which the medium sealed in the material layer comprises may be fixed by forming many microdomains (microdomains) in the material layer by the polymer. On this account, the material layer is caused to be optically isotropic either when no field is applied, or when an external field is applied. Further, it is possible to obtain a wider temperature range of the material layer for exhibiting optical isotropy. On this account, this structure achieved enlargement of temperature range allowing low-intensity field driving even for a medium that has been incapable of low-intensity field driving at a practical temperature range, thereby significantly improving utility.

The display element of the present invention may comprise a pair of substrates, at least one of which is transparent; and a material layer between the substrates, and may apply an external field on the material layer, in order to perform display operation, the material layer including (a) a medium whose optical anisotropy degree is changeable by field application, and (b) a porous structure material.

With this arrangement, the change in degree of optical isotropy by field application is promoted.

Further, the porous structure material may be a porous structure material or a microporous film. The microporous film here refers to a film having pores with a diameter of equal to or less than ¼ of wavelength of visible light.

With this arrangement, the alignment orderly structure of molecules which the medium sealed in the material layer comprises is fixed, thereby promoting the change in degree of optical anisotropy by field application.

Further, the porous structure material may be structurally isotropic.

With this arrangement, the alignment orderly structure of molecules which the medium sealed in the material layer comprises is fixed, thereby promoting the change in degree of optical anisotropy by field application.

Further, it is preferable that the porous structure material is optically isotropic when an external field is applied or when no field is applied.

With this arrangement, the porous structure material is isotropic at least when an external field is applied or when no field is applied, the transmittance of the medium under field application or under no field application does not decrease, thereby carrying out high-quality display.

The foregoing display elements may be arranged so that the optical anisotropy degree is changed by changing orientational direction of molecules which the medium comprises. With this arrangement, the alignment auxiliary material, the hydrogen-bonded cluster, the fine particles, the polymer, or the porous structure material encourages the change in alignment direction of molecules which the medium comprises, thereby promoting the change in degree of optical anisotropy. On this account, the intensity of the field for display operation by the display element can be reduced.

Further, it is preferable that the medium is arranged so that the degree of optical anisotropy can be changed in response to field application. That is, it is preferable that a field is used as an external field for changing the degree of optical anisotropy in terms of designing of display element, and easy control of driving.

Further, when a field is used as an external field, the foregoing display element may be arranged so that the medium of the material layer has a refractive index that is changeable proportionally to square of a field applied thereon.

This display element in which the material layer has a refractive index that is changeable proportionally to square of a field applied thereon has advantage of high-speed responding. Accordingly, the foregoing structure provides a display element with a high-speed responding characteristic. Further, with this advantage of high-speed response, the display element according to the present embodiment is suitable for a display device using an external field sequential color method or the like.

Further, when a field is used as an external field, the foregoing display element may be arranged so that a medium of the material layer comprises a polar molecule. With this arrangement, polarization of the polar molecule is expressed in response to voltage application. Further, here, the alignment auxiliary material, hydrogen bonding material, fine particles, polymer, or porous structure material promotes the alignment of the polar molecule. On this account, the degree of optical anisotropy may be changed by a low-intensity field, thereby decreasing the intensity of the field required for driving.

Further, the medium is optically isotropic when an external field is applied or when no field is applied.

With this arrangement, in the display element that is optically isotropic when an external field is applied or when no field is applied, one of the alignment auxiliary material, the hydrogen-bonded cluster, the fine particles, the polymer, and the porous structure material promotes change in degree of optical anisotropy by change in field. On this account, the degree of optical anisotropy is changed by a low-intensity field, and the intensity of the field required for display operation by the display element can be reduced.

Further, the molecules which the medium comprises may form an orderly structure when an external field is applied or when no field is applied, the orderly structure being smaller than optical wavelength and being changeable by field application.

Further, the medium may have a selective reflection wavelength band or a helical pitch of the molecules not more than 400 nm.

When the selective reflection wavelength range or the helical pitch is equal to or greater than 400 nm, a color corresponding to the helical pitch may be displayed. This phenomenon of selectively reflecting light having the wavelength reflecting the helical pitch is called a selective reflection. In this case, by setting the selective reflection wavelength or the helical pitch of the medium to be not more than 400 nm, the dispel of color may be avoided.

Further, the medium may have an orderly structure having a cubic symmetry. Further, the medium may be made of a material that exhibits a cubic phase or a smectic D phase. Further, the medium may be made of a liquid crystal micro emulsion. Further, the medium may be made of a lyotropic liquid crystal that exhibits a micelle phase, a reverse micelle phase, a sponge phase or a cubic phase. Further, the medium may be made of a dendrimer. Further, the medium may be made of a material that exhibits a cholesteric blue phase. Further, the medium may be made of a material that exhibits a smectic blue phase.

With any of the foregoing arrangements, the orderly structure of the molecules which the medium sealed in the material layer comprises is distorted by field application, thereby changing optical anisotropy of the medium. Therefore, it is possible to realize varied display states depending on whether a field is applied or not.

Further, in any of the foregoing arrangements, the display element carries out display by using change in degree of optical anisotropy of molecules which the medium comprises. Therefore, there is little defect of the particular viscosity of the liquid crystal that affects the response speed, thereby realizing high-speed response. With this advantage of high-speed response, the display element according to any of the foregoing arrangements is suitable for a display device using a field sequential color method or the like.

Further, such torsion generated in the orderly structure of molecules in response to field application has a little influence of temperature, and therefore, it allows easy temperature control. Further, in the foregoing arrangement, display operation is carried out by using a change in degree of optical anisotropy that is caused by torsion of the orderly structure of the medium. On this account, the structure realizes a wider viewing angle than that of a display element that carries out display by rotating the alignment direction of liquid crystal molecules.

Further, when a field is used as a field, the material layer may comprise a medium that exhibits a negative type Nematic liquid crystal phase. Further, when a field is used as a field, the material layer may comprise a medium that exhibits a positive type Nematic liquid crystal phase.

With any one of the foregoing structures, the degree of optical anisotropy of the medium may be changed by field application.

The foregoing display element may comprise an alignment film on at least one of the substrates, for aligning molecules which the medium, comprises along a desired direction.

With this arrangement, it is possible to specify the alignment direction of molecules in the vicinity of the boundary of the alignment film and the material layer to a desired direction. Further, with this arrangement, it is possible to align the molecules which the medium comprises in a desired direction while the medium is exhibiting a liquid crystal phase. Therefore, the alignment auxiliary material or the polymer may be formed so that more molecules are aligned in the desired direction than the molecules aligned in other directions. On this account, with the alignment auxiliary material or the polymer, the alignment of the molecules of the medium are controlled to be oriented to a desired direction when a field is applied, thereby securely and appropriately promoting change in degree of optical anisotropy when a field is applied.

Further, the alignment film may be a horizontal alignment film. This arrangement allows use of a material conventionally used for a liquid crystal display element and highly compatible with a liquid crystal material. Further, in contrast to a vertical alignment film, the horizontal alignment film gives strong alignment controlling force to the liquid crystal molecules in the substrate in-plane direction, thereby promoting change in degree of optical anisotropy upon field application.

Further, the alignment film has been subjected to rubbing process or light radiation. With this arrangement, it is possible to specify the alignment direction of molecules in the vicinity of the boundary of the alignment film and the material layer to a desired direction. Further, with this arrangement, it is possible to align the molecules, which the medium comprises, in a desired direction while the medium is exhibiting a liquid crystal phase. Furthermore, this arrangement ensures a stronger alignment controlling force of the alignment film.

Further, the foregoing display element may be arranged so that both of the substrates are provided with the alignment films, which have been so rubbed that they have different rubbing directions from each other.

With this arrangement, the molecules which the medium comprises are aligned in a twisted structure when a field is applied. More specifically, the molecules are aligned so that their major axis are aligned in a direction parallel to the substrate surface and the molecules are sequentially twisted from the side of one substrate to the side of another, when a voltage is applied. On this account, the coloring phenomenon due to wavelength dispersion of the medium is reduced.

Further, the electrode may be provided to allow itself to generate a field along a normal direction of the substrates.

With this arrangement, change in degree of optical anisotropy is promoted not only in the vicinity of the boundary of the substrates and the material layer but also in a region away from the substrates, thereby decreasing the intensity of the field required for driving.

Further, in a structure of generating a field in the substrate in-plane direction of the substrates, it may be arranged so that the switching element, the color filter, and the light-shading film are provided on one of the substrates, and a polymer produced through light irradiation is formed on the material layer.

With this arrangement, the switching element, the color filter, and the light-shading film are formed only on one of the substrates. In this case, by polymerizing the polymerizable compound by light irradiation from the other substrate, a wider area of the material layer will be exposed to the light. Therefore, it is also possible to avoid the unreacted polymerized monomer or polymerization initiator, thereby preventing deterioration in reliability. Further, since only one of the substrates has a light-shading film, aperture ratio can be increased.

Further, the foregoing display element may be arranged so that the substrate that faces the substrate on which the switching element, the color filter, and the light-shading film are provided, is transparent, and the electrode provided on this substrate is transparent. On this account, light used for irradiation can be reduced. In this case, the portion on the electrode may also be subjected to UV light irradiation even when light is incident from the substrate on which the electrode is formed, thus increasing aperture of the display element. Further, it is also possible to reduce the unreacted polymer, thereby preventing deterioration in reliability, such as a decrease in voltage retention.

Further, the electrode may be provided on at least one of the substrates, for generating a field along a direction parallel to a surface of the substrate.

With this arrangement, change in degree of optical anisotropy is promoted not only in the vicinity of the boundary of the substrates and the material layer but also in a region away from the substrates, thereby decreasing the intensity of the field required for driving.

Further, the foregoing display element may be arrange-d so that the material layer comprises a polymer formed by polymerization caused by light radiation; and the electrode is transparent. On this account, light used for irradiation can be reduced. In this case, the portion on the electrode may also be subjected to UV light irradiation even when light is incident from the substrate on which the electrode is formed, thus increasing aperture of the display element. Further, it is also possible to reduce the unreacted polymer, thereby preventing deterioration in reliability, such as a decrease in voltage retention.

Further, the foregoing display element may be arranged so that the material layer comprises a polymer formed by polymerization caused by light radiation; and the electrode is provided on the substrate on which the switching element, the color filter, and the light-shading film are provided. On this account, light used for irradiation can be reduced. With this arrangement, the switching element, the color filter, and the light-shading film are formed on one of the substrates. In this case, by polymerizing the polymerizable compound by light irradiation from the other substrate, a wider area of the material layer will be exposed to the light. Therefore, it is also possible to avoid the unreacted polymerized monomer or polymerization initiator, thereby preventing deterioration in reliability. Further, since only one of the substrates has a light-shading film, aperture ratio can be increased.

Further, the foregoing display element may be arranged so that the substrate that faces the substrate on which the switching element, the color filter, and the light-shading film are provided, is transparent. On this account, light used for irradiation can be further reduced.

Further, a medium of the material layer may comprise a chiral agent. Further, the medium of the material layer may be chiral. Further, the medium may be a banana-shaped (curved) liquid crystal material, which does not comprise an asymmetrical carbon atom (the molecules are not chiral), but becomes a chiral system due to the anisotropy from the molecule shape and the packing structure.

Further, in this structure, the molecules which the medium comprises can be aligned according to only one of the rightward twisted structure or the leftward twisted structure. In this case, unlike the case of having multidomains made up of bidirectional (rightward twist and leftward twist) twisted structure, it is possible to prevent the problem of decrease of transmittance, thereby improving transmittance.

Further, the foregoing display element may be arranged so that when optical anisotropy occurs, molecules which the medium comprises are orientated to make a chiral structure twisted in one direction.

With this arrangement, the molecules of the medium in the dielectric layer are aligned in a twisted structure with either a rightward twist or a leftward twist, that is, having only one chiral configuration (R configuration or S configuration). Therefore, the display element has a certain optical activity even when the twisted structures have different alignment directions without orientational correlativity between themselves. Because of this, the material layer has a large optical activity as a whole. Thus, the voltage for obtaining the maximum transmittance in the display element can be reduced to the practical level.

Further, in this structure, the material layer has one of the alignment auxiliary material, the hydrogen-bonded cluster, the fine particles, the polymer, and the porous structure material that encourage change in degree of optical anisotropy when a field is applied, which supports the alignment of molecules in the medium, thereby more efficiently changing the degree of optical anisotropy. On this account, the display element may be driven by a low-intensity field, and realizing bright display with efficient use of light.

Further, the medium of the material layer may comprise a chiral agent by addition concentration of 8 wt % or more. Further, the material layer may comprise a medium mixed with a chiral agent with a chiral pitch=the visible wavelength or less.

On this account, it is possible to realize a display element that can be driven by a low-intensity field, and also achieves efficient use of light, thus performing bright display.

Further, the alignment auxiliary material, the hydrogen-bonded cluster, the fine particles, the polymer, or the porous structure material may divide the medium in the material layer into a plurality of microdomains.

With this arrangement, the molecules of the medium are kept in a small domain. Therefore, the alignment state of a medium in each small domain can be fixed, so that change in degree of optical anisotropy can be expressed at a wider temperature range in response to field application.

Further, the microdomain may have a dimension equal to or smaller than visible optical wavelength.

With this arrangement in which the size of the microdomain is equal to or smaller than wavelength of visible light, it is possible to prevent a decrease in contrast due to light diffusion caused by mismatching of the refractive index of the alignment auxiliary material, the hydrogen-bonding material, the fine particles, the polymer, or the porous structure material that divides the material layer into microdomains, and the refractive index of the medium, thus realizing a high-contrast display element.

In order to solve the foregoing problems, the display device of the present invention comprises one of the foregoing display elements.

With this arrangement, the display element exhibits optical isotropy when a field is applied, and can be brought into operation by a low-intensity field. Therefore, it is possible to realize a display device that requires a low-intensity field for display.

In order to solve the foregoing problems, the manufacturing method of the display element of the present invention is a manufacturing method of a display element that comprises a pair of substrates, at least one of which is transparent, and a material layer between the substrates and applies an external field on the material layer in order to perform display operation, the method comprising the steps of: forming the material layer between the substrates by sealing a medium therebetween, the medium being changed in optical anisotropy degree when a field is applied; forming a liquid crystal phase in the medium of the material layer; and forming an alignment auxiliary material in the medium while the medium is in the liquid crystal phase.

With this arrangement, the alignment auxiliary material has more molecules aligned along the alignment direction of the molecules which the medium exhibiting a liquid crystal phase comprises, than the molecules aligned in other directions. Therefore, it is possible to realize a display element provided with the alignment auxiliary material capable of encouraging the molecules, which the medium comprises, to be aligned in the same alignment direction as that in the liquid crystal phase when a field is applied. On this account, it is possible to manufacture a display element that exhibits change in degree of optical anisotropy when a field is applied, and can be driven by a low-intensity field.

Further, according to the foregoing manufacturing method, the degree of optical anisotropy is changed by a low-intensity field. On this account, it is possible to realize a display device that achieves high-response and wide viewing angle, and can be driven by a practical field intensity.

Further, the manufacturing method for the display element of the present invention is a manufacturing method of a display element that includes a pair of substrates, at least one of which is transparent, and a material layer between the substrates and applies an external field on the material layer in order to perform display operation, the method comprising the step of: adding a hydrogen bonding material to a medium which is changed in optical anisotropy degree when a field is applied.

With this arrangement, it is possible to manufacture a display element that causes the hydrogen bonding material to promote a change in alignment direction of the molecules which the medium comprises by an external field. Therefore, it is possible to realize a display element that exhibits change in degree of optical anisotropy when a field is applied, and can be driven by a low-intensity field.

Further, the manufacturing method of the display device of the present invention is a manufacturing method of a display device that comprises method for manufacturing a display element including a pair of substrates, at least one of which is transparent, and a material layer between the substrates and applying an external field on the material layer in order to perform display operation, the method comprising the step of: adding fine particles to a medium which is changed in optical anisotropy degree when a field is applied.

With the foregoing method, it is possible to manufacture a display element which causes the fine particles to promote a change of alignment direction of molecules which the medium comprises when a field is supplied, or fix the alignment of the molecules in the bulk region. Therefore, the display element exhibits change in degree of optical anisotropy when a field is applied, and can be driven by a low-intensity field.

Further, the manufacturing method of the display device of the present invention is a manufacturing method of a display device that includes a pair of substrates, at least one of which is transparent, and a material layer between the substrates and applies an external field on the material layer in order to perform display operation, the method comprising the step of: forming a porous structure material in a medium which is changed in optical anisotropy degree when a field is applied.

With the foregoing method, it is possible to manufacture a display element which causes the porous structure material to promote a change of alignment direction of molecules which the medium comprises when a voltage is supplied, or fix the alignment of the molecules in the bulk region. Therefore, the display element exhibits change in degree of optical anisotropy when a field is applied, and can be driven by a low-intensity field.

Further, the manufacturing method of the display device of the present invention is a manufacturing method of a display device that includes a pair of substrates, at least one of which is transparent, and a material layer between the substrates and applies an external field on the material layer in order to perform display operation, the method comprising the steps of: adding a polymerizable compound to a medium which is changed in optical anisotropy degree when a field is applied; sealing the medium between the substrates in order to form the material layer; and polymerizing the polymerizable compound in the medium.

With the foregoing method, it is possible to manufacture a display element which causes the polymer to promote a change of alignment direction of molecules which the medium comprises when a voltage is supplied, or fix the alignment of the molecules in the bulk region. Therefore, the display element exhibits change in degree of optical anisotropy when a field is applied, and can be driven by a low-intensity field.

Further, as described, when the alignment auxiliary material is formed in the medium exhibiting a liquid crystal phase, the alignment auxiliary material may be formed in such a manner that a polymerizable compound is added to the medium, and in the alignment auxiliary material forming step, the alignment auxiliary material is formed by polymerizing the polymerizable compound.

Further, the polymer may be produced in such a manner with a compound polymerizable by light radiation that the steps of polymerizing is carried out by radiating light onto the polymerizable compound. Alternately, the polymerizable compound is polymerizable by heat application; and the steps of polymerizing is carried out by heating the polymerizable compound.

With these methods, the polymerization of the compound may be easily performed.

Further, the method above may be carried out in such a manner that the polymerizable compound has a functional group that enables the polymerizable compound to be polymerized by radiation of light, and a functional group that enables the polymerizable compound to be polymerized by heat application; and the steps of polymerizing is carried out by radiation light and applying heat.

In the foregoing method, it is likely that at least one of the functional groups, the functional group that causes polymerization by light irradiation or the functional group that causes polymerization by heat, is reacted and polymerized. Therefore, the unreacted portion can be reduced, thereby carrying out sufficient polymerization.

Further, the foregoing method may further comprises the steps of: causing the medium to be in a liquid crystal phase in the material layer, and the step of polymerizing being carried out when the medium is in the liquid crystal phase.

In this case, it is possible to easily form the polymer in the medium expressing a liquid crystal phase.

Further, the medium may comprise a polymerization initiator for promoting the polymerization of the polymerizable compound. On this account, the polymerizable compound may be rapidly polymerized.

Further, in the step of causing the medium to be in the liquid crystal phase, the liquid crystal phase may be generated by keeping the material layer at a temperature lower than temperatures at which the display element is to perform display operation. Further, in the step of causing the medium to be in the liquid crystal phase, the liquid crystal phase may be generated by applying a voltage to the material layer.

With any one of the foregoing manufacturing methods, a liquid crystal phase can be easily and securely expressed in the medium. Note that, when an electrical filed is used as the means for causing the medium to express optical anisotropy and also a voltage is applied to the medium to cause the medium to exhibit a liquid crystal phase, it is preferable that the voltage used for liquid crystal phase expression is greater than a voltage for causing the medium to express the optical anisotropy.

Further, the foregoing method may comprise a step of forming on at least one of the substrates an alignment film for making molecules, which the medium sealed in the material layer comprises, to be aligned in a desired direction.

Further, the foregoing method may be arranged so that the medium (a) is chiral, (b) comprises a chiral agent, or (c) has a twisted chiral structure in which molecules which the medium comprises are orientated in one direction when the medium exhibits optical anisotropy, the method comprising the additional steps of forming or adding an alignment auxiliary material in the medium; and forming an alignment film on at least one of the substrates, for aligning molecules which the medium comprises along a desired direction.

With this method, the molecules which the medium comprises may be aligned in a desired direction when the medium is exhibiting a liquid crystal phase. Therefore, the alignment auxiliary material or the polymer can be so made as to have more molecules aligned along the desired direction, than the molecules aligned in other directions. Therefore, with the alignment auxiliary material or the polymer, it is possible to manufacture a display element in which the molecules which the medium comprises are encouraged to be aligned in the desired direction when a field is applied or when no field is applied. On this account, it is possible to realize a display element that appropriately and securely promotes change in degree of optical anisotropy when a field is applied.

Further, in the case of using a compound polymerizable by light irradiation, the foregoing method may be arranged so that, a switching element, a color filter, and a light-shading film are provided only on one of the substrates, and the other one of the substrates is a transparent substrate; and the step of polymerizing is carried out by radiating light through the transparent substrate in order to polymerize the polymerizable compound.

With this method, the switching element, the color filter, and the light-shading film are formed on one of the substrates, and the counter substrate is made of a transparent substrate. In this case, by polymerizing the polymerizable compound by light irradiation from the other substrate, a wider area of the material layer will be exposed to the light. Therefore, it is also possible to avoid the unreacted polymerized monomer or polymerization initiator, thereby preventing deterioration in reliability. Further, since only one of the substrates has a light-shading film, aperture ratio can be increased.

The liquid crystal display device of the present invention can be widely used for an image display apparatus such as a television, a monitor etc., an OA (Office Automation) apparatus such as a word processor, a personal computer etc., or an image display device provided in an information terminal such as a video cassette recorder, a digital camera, or a mobile phone.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A display element, comprising:
a pair of substrates, at least one of which is transparent; and
a material layer between the substrates,
the display element performing display operation by applying an external field to the material layer, and
the material layer including (a) a medium whose optical anisotropy degree is changeable by external field application, and (b) an alignment auxiliary material.

2. A display element as set forth in claim 1, wherein:
the alignment auxiliary material promotes change in the optical anisotropy degree.

3. A display element as set forth in claim 1, wherein:
the alignment auxiliary material stabilizes an orderly structure of the medium.

4. A display element as set forth in claim 1, wherein:
the alignment auxiliary material has a structural anisotropy.

5. A display element as set forth in claim 1, wherein:
the medium of the material layer is liquid crystalline; and
the alignment auxiliary material is formed in the medium when the medium is in a liquid crystal phase.

6. A display element as set forth in claim 5, comprising:
an alignment film on at least one of the substrates for aligning molecules of the medium along a desired direction.

7. A display element as set forth in claim 6, wherein:
the alignment film is made of a horizontal alignment film.

8. A display element as set forth in claim 6, wherein:
the alignment film has been subjected to rubbing process or light radiation.

9. A display element as set forth in claim 1, wherein:
the alignment auxiliary material is optically isotropic when an external field is applied or when no external field is applied.

10. A display element as set forth in claim 1, wherein:
the alignment auxiliary material divides the material layer into a plurality of microdomains, and fixes an orientational orderly structure of the molecules which the medium comprises.

11. A display element as set forth in claim 10, wherein:
the microdomains have a dimension equal to or smaller than wavelength of visible light.

12. A display element as set forth in claim 1, wherein:
the optical anisotropy degree is changed by changing an orientational direction of molecules that the medium comprises.

13. A display element as set forth in claim 1, wherein:
the medium is changeable in degree of optical anisotropy by application of a field.

14. A display element as set forth in claim 13, wherein:
the medium of the material layer has a refractive index that is changeable proportionally to square of the field applied thereon.

15. A display element as set forth in claim 13, wherein:
the medium of the material layer comprises a polar molecule.

16. A display element as set forth in claim 13, wherein:
the medium of the material layer exhibits a negative type Nematic liquid crystal phase.

17. A display element as set forth in claim 13, wherein:

the medium of the material layer exhibits a positive type Nematic liquid crystal phase.

18. A display element as set forth in claim 13, comprising:
at least a pair of electrodes for generating a field along a normal direction of the substrates.

19. A display element as set forth in claim 18, comprising:
a switching element, a color filter, and a light-shading film, on one of the substrates,
the material layer comprising a polymer formed by polymerization caused by light radiation.

20. A display element as set forth in claim 19, wherein:
the substrate that faces the substrate on which the switching element, the color filter, and the light-shading film are provided, is transparent, and an electrode provided on this substrate is transparent.

21. A display element as set forth in claim 13, comprising:
at least a pair of electrodes for generating a field along a direction parallel to a surface of at least one of the substrates.

22. A display element as set forth in claim 21, wherein:
the material layer comprises a polymer formed by polymerization caused by light radiation; and
the pair of electrodes is transparent.

23. A display element as set forth in claim 22, wherein:
the material layer comprises a polymer formed by polymerization caused by light radiation; and
the pair of electrodes is provided on the substrate on which the switching element, the color filter, and the light-shading film are provided.

24. A display element as set forth in claim 23, wherein:
the substrate that faces the substrate on which the switching element, the color filter, and the light-shading film are provided, is transparent.

25. A display element as set forth in claim 1, wherein:
the medium is optically isotropic when the external field is applied or when no external field is applied.

26. A display element as set forth in claim 1, wherein:
molecules which the medium comprises form an orderly structure when the external field is applied or when no external field is applied, the orderly structure being smaller than a wavelength of light and being changeable by external field application.

27. A display element as set forth in claim 1, wherein:
a selective reflection wavelength band or a helical pitch of the molecules is not more than 400 nm.

28. A display element as set forth in claim 1, wherein:
the medium has an orderly structure having a cubic symmetry.

29. A display element as set forth in claim 28, wherein:
the medium is a material that exhibits a cubic phase or a smectic D phase.

30. A display element as set forth in claim 1, wherein:
the medium is made of a liquid crystal micro emulsion.

31. A display element as set forth in claim 1, wherein:
the medium is made of a lyotropic liquid crystal that exhibits a micelle phase, a reverse micelle phase, a sponge phase or a cubic phase.

32. A display element as set forth in claim 1, wherein:
the medium is a liquid crystal fine particle dispersed system that exhibits a micelle phase, a reverse micelle phase, a sponge phase or a cubic phase.

33. A display element as set forth in claim 1, wherein:
the medium is made of a dendrimer.

34. A display element as set forth in claim 1, wherein:
the medium is a material that exhibits a cholesteric blue phase.

35. A display element as set forth in claim 1, wherein:
the medium is made of a material that exhibits a smectic blue phase.

36. A display element as set forth in claim 1, wherein:
both of the substrates are provided with alignment films, which have been so rubbed that they have different rubbing directions from each other.

37. A display element as set forth in claim 1, wherein:
a medium of the material layer comprises a chiral agent.

38. A display element as set forth in claim 37, wherein:
the medium of the material layer comprises a chiral agent by addition concentration of 8 wt % or more.

39. A display element as set forth in claim 1, wherein:
the medium of the material layer is chiral.

40. A display element as set forth in claim 1, wherein:
when optical anisotropy occurs, molecules which the medium comprises are orientated to make a twisted structure that is twisted in one direction and having only one chiral configuration.

41. A display element as set forth in claim 1, wherein:
the alignment auxiliary material is made of a hydrogen-bonding material.

42. A display element as set forth in claim 1, wherein:
the alignment auxiliary material is made of fine particles.

43. A display element as set forth in claim 1, wherein:
the alignment auxiliary material is a polymer.

44. A display element as set forth in claim 1, wherein:
the alignment auxiliary material is a porous structure material.

45. A display element, comprising:
a pair of substrates, at least one of which is transparent; and
a material layer between the substrates,
the display element performing display operation by applying an external field to the material layer, and
the material layer including a medium whose optical anisotropy degree is changeable by external field application,
the material layer containing a hydrogen-bonding material.

46. A display element as set forth in claim 45, wherein:
the medium is changeable in degree of optical anisotropy by application of a field.

47. A display element as set forth in claim 45, wherein:
the medium is optically isotropic when the external field is applied or when no external field is applied.

48. A display element as set forth in claim 45, wherein:
molecules which the medium comprises form an orderly structure when the external field is applied or when no external field is applied, the orderly structure being smaller than a wavelength of light and being changeable by external field application.

49. A display element as set forth in claim 45, wherein:
a selective reflection wavelength band or a helical pitch of the molecules is not more than 400 nm.

50. A display element as set forth in claim 45, wherein:
the medium has an orderly structure having a cubic symmetry.

51. A display element as set forth in claim 50, wherein:
the medium is a material that exhibits a cubic phase or a smectic D phase.

52. A display element as set forth in claim 45, wherein:
the medium is made of a liquid crystal micro emulsion.

53. A display element as set forth in claim 45, wherein:
the medium is made of a lyotropic liquid crystal that exhibits a micelle phase, a reverse micelle phase, a sponge phase or a cubic phase.

54. A display element as set forth in claim 45, wherein:
the medium is a liquid crystal fine particle dispersed system that exhibits a micelle phase, a reverse micelle phase, a sponge phase or a cubic phase.

55. A display element as set forth in claim 45, wherein:
the medium is made of a dendrimer.

56. A display element as set forth in claim 45, wherein:
the medium is a material that exhibits a cholesteric blue phase.

57. A display element as set forth in claim 45, wherein:
the medium is made of a material that exhibits a smectic blue phase.

58. A display element as set forth in claim 45, wherein:
both of the substrates are provided with alignment films, which have been so rubbed that they have different rubbing directions from each other.

59. A display element as set forth in claim 45, wherein:
a medium of the material layer comprises a chiral agent.

60. A display element as set forth in claim 45, wherein:
the medium of the material layer is chiral.

61. A display element as set forth in claim 45, wherein:
when optical anisotropy occurs, molecules which the medium comprises are orientated to make a twisted structure that is twisted in one direction and having only one chiral configuration.

62. A display element, comprising:
a pair of substrates, at least one of which is transparent; and
a material layer between the substrates,
the display element performing display operation by applying an external field to the material layer,
the material layer including a medium whose optical anisotropy degree is changeable by external field application, and
the material layer containing fine particles.

63. A display element as set forth in claim 62, wherein:
the fine particles have an average particle diameter of 0.2 µm or less.

64. A display element as set forth in claim 62, wherein:
a content of fine particles is in a range of 0.05 wt % to 20 wt % with respect to a sum of weight of the fine particles and the medium in the material layer.

65. A display element as set forth in claim 62, wherein:
the medium is changeable in degree of optical anisotropy by application of a field.

66. A display element as set forth in claim 62, wherein:
the medium is optically isotropic when the external field is applied or when no external field is applied.

67. A display element as set forth in claim 62, wherein:
molecules which the medium comprises form an orderly structure when the external field is applied or when no external field is applied, the orderly structure being smaller than a wavelength of light and being changeable by external field application.

68. A display element as set forth in claim 62, wherein:
a selective reflection wavelength band or a helical pitch of the molecules is not more than 400 nm.

69. A display element as set forth in claim 62, wherein:
the medium has an orderly structure having a cubic symmetry.

70. A display element as set forth in claim 69, wherein:
the medium is a material that exhibits a cubic phase or a smectic D phase.

71. A display element as set forth in claim 62, wherein:
the medium is made of a liquid crystal micro emulsion.

72. A display element as set forth in claim 62, wherein:
the medium is made of a lyotropic liquid crystal that exhibits a micelle phase, a reverse micelle phase, a sponge phase or a cubic phase.

73. A display element as set forth in claim 62, wherein:
the medium is a liquid crystal fine particle dispersed system that exhibits a micelle phase, a reverse micelle phase, a sponge phase or a cubic phase.

74. A display element as set forth in claim 62, wherein:
the medium is made of a dendrimer.

75. A display element as set forth in claim 62, wherein:
the medium is a material that exhibits a cholesteric blue phase.

76. A display element as set forth in claim 62, wherein:
the medium is made of a material that exhibits a smectic blue phase.

77. A display element as set forth in claim 62, wherein:
both of the substrates are provided with alignment films, which have been so rubbed that they have different rubbing directions from each other.

78. A display element as set forth in claim 62, wherein:
a medium of the material layer comprises a chiral agent.

79. A display element as set forth in claim 62, wherein:
the medium of the material layer is chiral.

80. A display element as set forth in claim 62, wherein:
when optical anisotropy occurs, molecules which the medium comprises are orientated to make a twisted structure that is twisted in one direction and having only one chiral configuration.

81. A display element, comprising:
a pair of substrates, at least one of which is transparent; and
a material layer between the substrates,
the display element performing display operation by applying an external field to the material layer, and the material layer including (a) a medium whose optical anisotropy degree is changeable by external field application,
the material layer being a polymer.

82. A display element as set forth in claim 81, wherein:
a content of the polymer is not less that 0.05 wt % but not more than 15 wt % with respect to a gross weight of a medium that comprises the polymer and the material layer.

83. A display element as set forth in claim 81, wherein:
the polymer is a macromolecule.

84. A display element as set forth in claim 83, wherein:
the macromolecule is any one of a chain polymer, a reticular polymer, and a ring polymer.

85. A display element as set forth in claim 81, wherein:
the polymer has a structural anisotropy.

86. A display element as set forth in claim 81, wherein:
the medium of the material layer is liquid crystalline; and the polymer is formed in the medium by polymerization when the medium is in a liquid crystal phase.

87. A display element as set forth in claim 86, comprising:
an alignment film on at least one of the substrates for aligning molecules of the medium along a desired direction.

88. A display element as set forth in claim 87, wherein:
the alignment film is made of a horizontal alignment film.

89. A display element as set forth in claim 87, wherein:
the alignment film has been subjected to rubbing process or light radiation.

90. A display element as set forth in claim 81, wherein:
the polymer is optically isotropic when the external field is applied or when no external field is applied.

91. A display element as set forth in claim 81, wherein: the polymer divides the material layer into a plurality of microdomains, and fixes an orientational orderly structure of the molecules that the medium comprises.

92. A display element as set forth in claim 81, wherein: the medium is changeable in degree of optical anisotropy by application of a field.

93. A display element as set forth in claim 81, wherein: the medium is optically isotropic when the external field is applied or when no external field is applied.

94. A display element as set forth in claim 81, wherein: molecules which the medium comprises form an orderly structure when the external field is applied or when no external field is applied, the orderly structure being smaller than a wavelength of light and being changeable by external field application.

95. A display element as set forth in claim 81, wherein: a selective reflection wavelength band or a helical pitch of the molecules is not more than 400 nm.

96. A display element as set forth in claim 81, wherein: the medium has an orderly structure having a cubic symmetry.

97. A display element as set forth in claim 96, wherein: the medium is a material that exhibits a cubic phase or a smectic D phase.

98. A display element as set forth in claim 81, wherein: the medium is made of a liquid crystal micro emulsion.

99. A display element as set forth in claim 81, wherein: the medium is made of a lyotropic liquid crystal that exhibits a micelle phase, a reverse micelle phase, a sponge phase or a cubic phase.

100. A display element as set forth in claim 81, wherein: the medium is a liquid crystal fine particle dispersed system that exhibits a micelle phase, a reverse micelle phase, a sponge phase or a cubic phase.

101. A display element as set forth in claim 81, wherein: the medium is made of a dendrimer.

102. A display element as set forth in claim 81, wherein: the medium is a material that exhibits a cholesteric blue phase.

103. A display element as set forth in claim 81, wherein: the medium is made of a material that exhibits a smectic blue phase.

104. A display element as set forth in claim 81, wherein: both of the substrates are provided with alignment films, which have been so rubbed that they have different rubbing directions from each other.

105. A display element as set forth in claim 81, wherein: a medium of the material layer comprises a chiral agent.

106. A display element as set forth in claim 81, wherein: the medium of the material layer is chiral.

107. A display element as set forth in claim 81, wherein: when optical anisotropy occurs, molecules which the medium comprises are orientated to make a twisted structure that is twisted in one direction and having only one chiral configuration.

108. A display element, comprising:
a pair of substrates, at least one of which is transparent; and
a material layer between the substrates,
the display element performing display operation by applying an external field to the material layer, and the material layer including a medium whose optical anisotropy degree is changeable by external field application,
the material layer being a porous structure material.

109. A display element as set forth in claim 108, wherein: the porous structure material is made of a porous inorganic material.

110. A display element as set forth in claim 108, wherein: the porous structure material is a microporous film.

111. A display element as set forth in claim 108, wherein: the porous structure material has a structural anisotropy.

112. A display element as set forth in claim 108, wherein: the porous structure material is optically isotropic when the external field is applied or when no external field is applied.

113. A display element as set forth in claim 108, wherein: the medium is changeable in degree of optical anisotropy by application of a field.

114. A display element as set forth in claim 108, wherein: the medium is optically isotropic when the external field is applied or when no external field is applied.

115. A display element as set forth in claim 108, wherein: molecules which the medium comprises form an orderly structure when the external field is applied or when no external field is applied, the orderly structure being smaller than a wavelength of light and being changeable by external field application.

116. A display element as set forth in claim 108, wherein: a selective reflection wavelength band or a helical pitch of the molecules is not more than 400 nm.

117. A display element as set forth in claim 108, wherein: the medium has an orderly structure having a cubic symmetry.

118. A display element as set forth in claim 117, wherein: the medium is a material that exhibits a cubic phase or a smectic D phase.

119. A display element as set forth in claim 108, wherein: the medium is made of a liquid crystal micro emulsion.

120. A display element as set forth in claim 108, wherein: the medium is made of a lyotropic liquid crystal that exhibits a micelle phase, a reverse micelle phase, a sponge phase or a cubic phase.

121. A display element as set forth in claim 108, wherein: the medium is a liquid crystal fine particle dispersed system that exhibits a micelle phase, a reverse micelle phase, a sponge phase or a cubic phase.

122. A display element as set forth in claim 108, wherein: the medium is made of a dendrimer.

123. A display element as set forth in claim 108, wherein: the medium is a material that exhibits a cholesteric blue phase.

124. A display element as set forth in claim 108, wherein: the medium is made of a material that exhibits a smectic blue phase.

125. A display element as set forth in claim 108, wherein: both of the substrates are provided with alignment films, which have been so rubbed that they have different rubbing directions from each other.

126. A display element as set forth in claim 108, wherein: a medium of the material layer comprises a chiral agent.

127. A display element as set forth in claim 108, wherein: the medium of the material layer is chiral.

128. A display element as set forth in claim 108, wherein: when optical anisotropy occurs, molecules which the medium comprises are orientated to make a twisted structure that is twisted in one direction and having only one chiral configuration.

129. A display device including a display element,
said display element comprising:
a pair of substrates, at least one of which is transparent; and a material layer between the substrates, the display element performing display operation by applying an external field on the material layer, and the material layer including (a) a medium whose optical anisotropy degree is changeable by external field application, and (b) an alignment auxiliary material.

130. A method for manufacturing a display element, comprising the steps of:

sealing a medium in the material layer, the medium being changed in optical anisotropy degree by an external field applied thereon;

forming a liquid crystal phase in the medium of the material layer; and forming an alignment auxiliary material in the material layer while the medium is in the liquid crystal phase, the display element including:

a pair of substrates, at least one of which is transparent; and a material layer between the substrates, the display element performing display operation by applying an external field on the material layer, and the material layer including (a) the medium whose optical anisotropy degree is changeable by external field application, and (b) an alignment auxiliary material.

131. A method as set forth in claim 130, wherein in the step of causing the medium to exhibit a liquid crystal phase, the liquid crystal phase is generated by keeping the material layer at a temperature lower than temperatures at which the display element performs display operation.

132. A method as set forth in claim 130, wherein in the step of causing the medium to exhibit a liquid crystal phase, the liquid crystal phase is generated in the medium by applying a field.

133. A method as set forth in claim 130, the method comprising the steps of:

forming the material layer between the substrates by sealing a medium therebetween, the medium being (a) chiral, (b) comprises a chiral agent, or (c) has a twisted structure that is twisted in one direction and having only one chiral configuration when optical isotropy of molecules which the medium comprises is expressed; and forming an alignment film on at least one of the substrates (1, 2), for aligning the molecules which the medium comprises along a desired direction.

134. A method for manufacturing a display element, comprising the step of:

adding a hydrogen-bonding material to a medium which is changed in optical anisotropy degree by an external field applied thereon, the display element including:

a pair of substrates, at least one of which is transparent; and a material layer between the substrates the display element performing display operation by an external field applied to the material layer.

135. A method for manufacturing a display element, comprising the step of:

adding fine particles to a medium which is changed in optical anisotropy degree by an external field applied thereon, the display element including:

a pair of substrates, at least one of which is transparent; and a material layer between the substrates, the display element performing display operation by applying the external field to the material layer.

136. A method for manufacturing a display element, comprising the step of:

forming a porous structure material in a medium which is changed in optical anisotropy degree by an external field applied thereon, the display element including:

a pair of substrates, at least one of which is transparent; and a material layer between the substrates, the display element performing display operation by applying the external field to the material layer.

137. A method for manufacturing a display element comprising the steps of:

adding a polymerizable compound to a medium which is changed in optical anisotropy degree by an external field applied thereon;

sealing the medium between a pair of substrates in order to form a material layer; and polymerizing the polymerizable compound in the medium, the display element including:

the pair of substrates, at least one of which is transparent; and the material layer between the substrates, the display element performing display operation by applying the external field to the material layer.

138. A method as set forth in claim 137, wherein:

the polymerizable compound is polymerizable by light radiation; and the step of polymerizing is carried out by light irradiation onto the polymerizable compound.

139. A method as set forth in claim 138, wherein:

a switching element, a color filter, and a light-shading film are provided on only one of the substrates, and the other one of the substrates is a transparent substrate; and the step of polymerizing is carried out by light irradiation through the transparent substrate in order to polymerize the polymerizable compound.

140. A method as set forth in claim 137, wherein:

the polymerizable compound is polymerizable by heat application; and the step of polymerizing is carried out by heating the polymerizable compound.

141. A method as set forth in claim 137, wherein:

the polymerizable compound has a functional group that enables the polymerizable compound to be polymerized by radiation of light, and a functional group that enables the polymerizable compound to be polymerized by heat application; and the step of polymerizing is carried out by light irradiation and heat application.

142. A method as set forth in claim 141, wherein:

a switching element, a color filter, and a light-shading film are provided on only one of the substrates, and the other one of the substrates is a transparent substrate; and the step of polymerizing is carried out by light irradiation through the transparent substrate in order to polymerize the polymerizable compound.

143. A method as set forth in claim 137, further comprising the steps of:

causing the medium to exhibit a liquid crystal phase in the material layer, and the step of polymerizing being carried out when the medium is in the liquid crystal phase.

144. A method as set forth in claim 143, wherein
in the step of causing the medium to exhibit a liquid crystal phase,
the liquid crystal phase is generated by keeping the material layer at a temperature lower than temperatures at which the display element performs display operation.

145. A method as set forth in claim 143, wherein
in the step of causing the medium to exhibit a liquid crystal phase,
the liquid crystal phase is generated in the medium by applying a field.

146. A method as set forth in claim 143, the method comprising the steps of:
forming the material layer between the substrates by sealing a medium therebetween, the medium being (a) chiral, (b) comprises a chiral agent, or (c) has a twisted structure that is twisted in one direction and having only one chiral configuration when optical isotropy of molecules which the medium comprises is expressed; and
forming an alignment film on at least one of the substrates (1, 2), for aligning the molecules which the medium comprises along a desired direction.

147. A method as set forth in claim 137, wherein:
the medium comprises a polymerization initiator for promoting the polymerization of the polymerizable compound.

\* \* \* \* \*